United States Patent
Chintan Shah et al.

(10) Patent No.: US 12,445,839 B2
(45) Date of Patent: Oct. 14, 2025

(54) DETERMINING AUTHENTICATION STATUS INFORMATION OF AN O-RAN RADIO UNIT

(71) Applicant: RAKUTEN SYMPHONY, INC., Tokyo (JP)

(72) Inventors: Paromita Chintan Shah, Karnataka (IN); Nagendra Shridhar Bykampadi, Karnataka (IN); Krishna Pramod Adharapurapu, Karnataka (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/575,466

(22) PCT Filed: Oct. 31, 2023

(86) PCT No.: PCT/US2023/036334
§ 371 (c)(1),
(2) Date: Dec. 29, 2023

(87) PCT Pub. No.: WO2025/005949
PCT Pub. Date: Jan. 2, 2025

(65) Prior Publication Data
US 2025/0080979 A1    Mar. 6, 2025

(30) Foreign Application Priority Data

Jun. 27, 2023 (WO) ............... PCT/US2023/026301
Jun. 27, 2023 (WO) ............... PCT/US2023/026303

(51) Int. Cl.
*H04W 12/06* (2021.01)

(52) U.S. Cl.
CPC .............................. *H04W 12/06* (2013.01)

(58) Field of Classification Search
CPC ................................................. H04W 12/06
See application file for complete search history.

(56) References Cited

U.S. PATENT DOCUMENTS

| 8,443,187 B1 | 5/2013 | Orr |
| 10,721,230 B2 | 7/2020 | Wei |

(Continued)

FOREIGN PATENT DOCUMENTS

WO    2019/038038 A1    2/2019

OTHER PUBLICATIONS

J. Preuß Mattsson, et al. "EAP-TLS 1.3: Using the Extensible Authentication Protocol with TLS 1.3", IETF, Feb. 2022, pp. 1-31 (31 pages), Accessed via the Internet: http://www.rfc-editor.org/rfc/rfc9190.pdf.

(Continued)

*Primary Examiner* — Clayton R Williams
(74) *Attorney, Agent, or Firm* — Sughrue Mion, PLLC

(57) ABSTRACT

Provided are features for determining authentication status information of an Open Radio Access Network (O-RAN) Radio Unit (O-RU). According to embodiments, an O-RU controller may be configured to: obtain a Media Access Control (MAC) address of an O-RU; determine, based on the MAC address of the O-RU, an authentication status of the O-RU; based on determining that the O-RU has been authenticated, establish a channel binding with the O-RU; and based on determining that the O-RU has not been authenticated, isolate the O-RU from further communications with the O-RU controller.

20 Claims, 33 Drawing Sheets

(56) References Cited

U.S. PATENT DOCUMENTS

| | | | |
|---|---|---|---|
| 11,659,388 B2 | 5/2023 | Dashputra et al. | |
| 2009/0064293 A1 | 3/2009 | Li et al. | |
| 2022/0345896 A1* | 10/2022 | Ahmed | H04W 24/02 |
| 2023/0021194 A1* | 1/2023 | Grayson | H04W 68/02 |
| 2023/0137465 A1 | 5/2023 | Lo et al. | |
| 2024/0214807 A1* | 6/2024 | Rivera | H04L 9/3247 |

OTHER PUBLICATIONS

Rakuten Symphony, "The Definitive Guide To Open RAN Security", Oct. 2022, pp. 1-28 (28 pages total), Accessed via the Internet: https://assets.website-files.com/6317e170a9eabbe0fbbf4519/63582c8cec69a24b2bcde588_221025-Security-Handbook.pdf?_fsi=0bdMIK2o.

Siwar Ben Hadj Said, "Contextual Connectivity in Multi-Access Architectures", HAL open science, 2015 (204 pages total), Accessed via the Internet: https://hal.science/tel-01206251/document.

\* cited by examiner

FIG. 11A

| Entity A | | |
|---|---|---|
| Learned From | Supplicant | Trust Level |
| M5 | M2 | Indirect |
| M4 | M11 | Direct |

FIG. 11B

| Entity A | | | |
|---|---|---|---|
| Authenticated Port | Role | Source MAC | Destination MAC |
| AuP4 | Authenticator | M4 | M11 |
| SuP5 | Supplicant | M5 | M3 |
| AuP1 | Authenticator | M1 | M12 |
| AuP3 | Authenticator | M3 | M5 |
| SuP2 | Supplicant | M2 | M6 |

FIG. 11C

| Entity A | | |
|---|---|---|
| Learned From | Supplicant | Trust Level |
| M5 | M2 | Indirect |
| M5 | M12 | Indirect |
| M5 | M7 | Indirect |
| M4 | M11 | Direct |

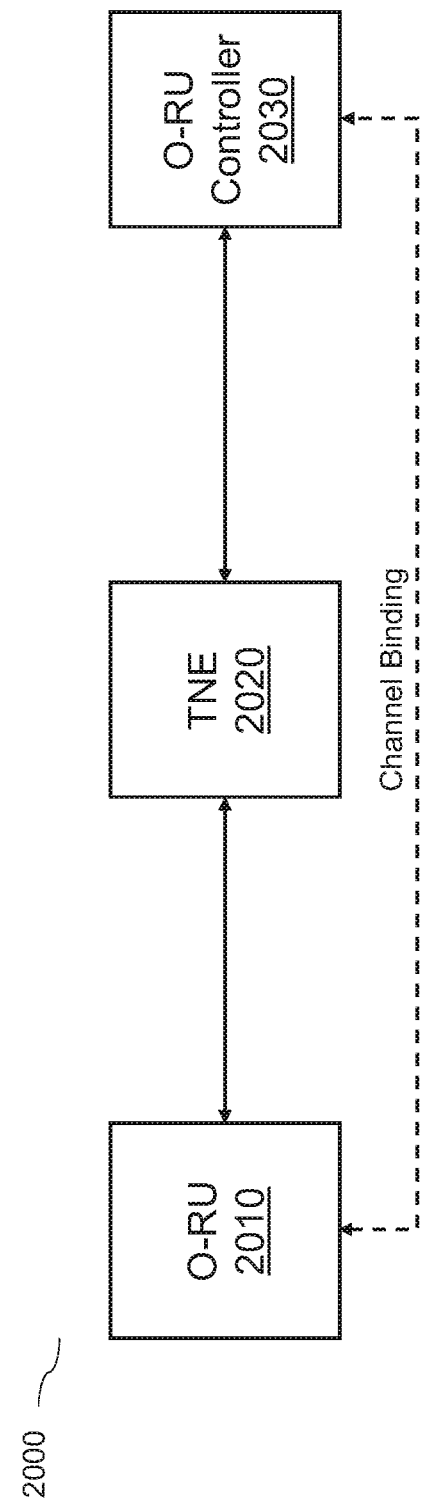

2310

O-RU 2110

| Learned From | Supplicant | Trust Level |
|---|---|---|
| M20 | M23 | Indirect |
| M20 | M26 | Indirect |
| M20 | M30 | Indirect |
| M20 | M27 | Indirect |

2320

O-RU 2120

| Learned From | Supplicant | Trust Level |
|---|---|---|
| M30 | M27 | Indirect |
| M30 | M23 | Indirect |
| M30 | M26 | Indirect |
| M30 | M20 | Indirect |

2330

TNE 2140

| Learned From | Supplicant | Trust Level |
|---|---|---|
| M21 | M20 | Direct |
| M23 | M26 | Indirect |
| M23 | M30 | Indirect |
| M23 | M27 | Indirect |

2340

TNE 2150

| Learned From | Supplicant | Trust Level |
|---|---|---|
| M24 | M23 | Direct |
| M25 | M26 | Direct |
| M24 | M27 | Indirect |
| M25 | M20 | Indirect |
| M25 | M30 | Indirect |

2350

TNE 2160

| Learned From | Supplicant | Trust Level |
|---|---|---|
| M28 | M26 | Indirect |
| M28 | M27 | Indirect |
| M29 | M30 | Direct |
| M28 | M23 | Indirect |
| M28 | M20 | Indirect |

2360

O-RU Controller 2130

| Learned From | Supplicant | Trust Level |
|---|---|---|
| M26 | M23 | Indirect |
| M26 | M20 | Indirect |
| M27 | M30 | Indirect |

FIG. 23

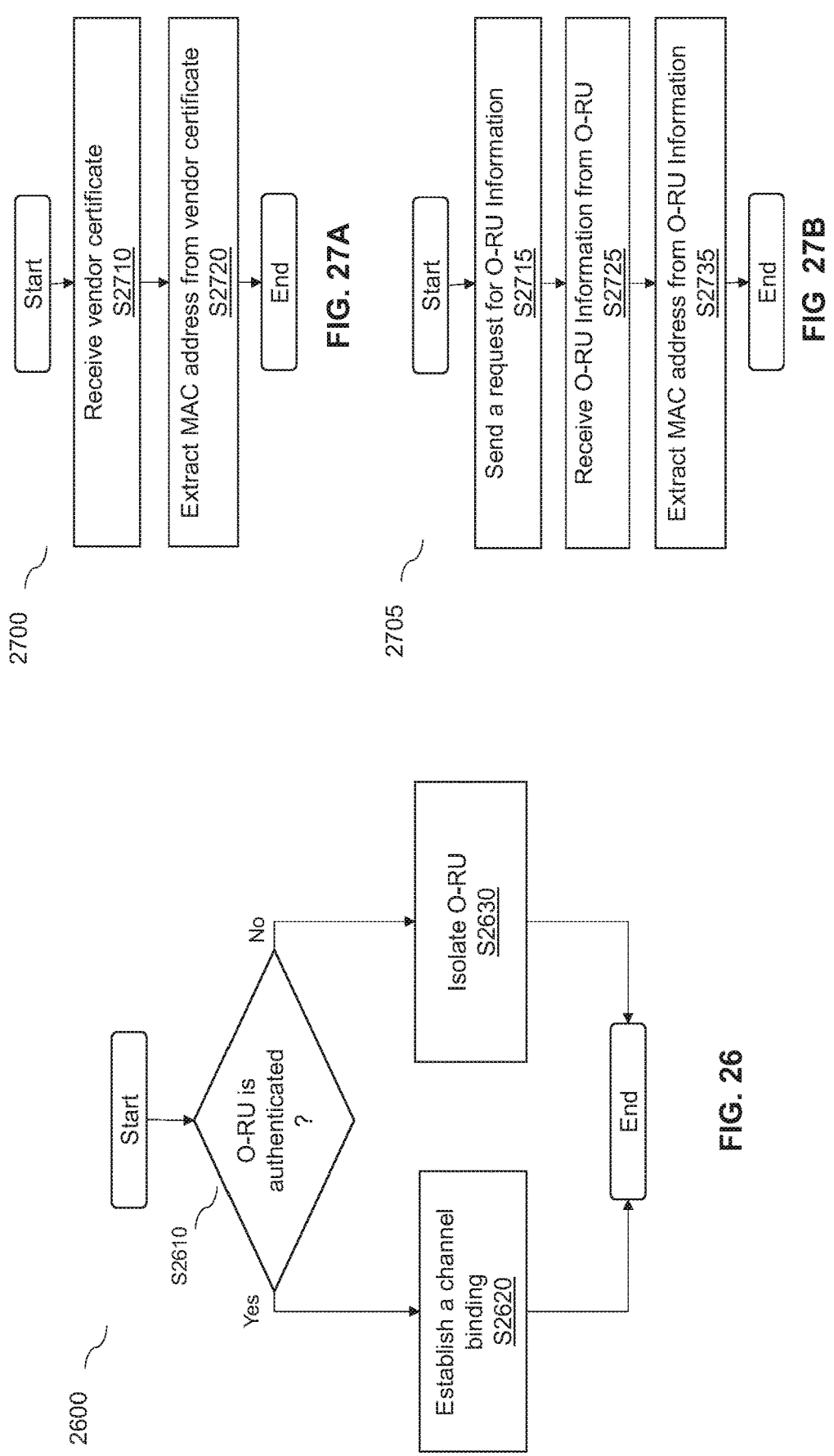

DETERMINING AUTHENTICATION STATUS INFORMATION OF AN O-RAN RADIO UNIT

CROSS REFERENCE TO RELATED APPLICATIONS

This application is a National Stage of International Application No. PCT/US2023/036334 filed on Oct. 31, 2023, claims priority to, and incorporates by reference the entirety of the disclosures of, each of the following applications: (a) PCT patent application PCT/US2023/026301, entitled "SYSTEM AND METHOD FOR ADVERTISING SUPPLICANTS IN A NETWORK", filed on Jun. 27, 2023, and (b) PCT patent application PCT/US2023/026303, entitled "SYSTEM AND METHOD FOR ESTABLISHING A TOPOLOGY FOR ADVERTISING SUPPLICANTS IN A NETWORK", filed on Jun. 27, 2023.

TECHNICAL FIELD

Systems, devices, methods, and computer programs consistent with example embodiments of the present disclosure relate to a telecommunication network, and more specifically, relate to enabling a network entity to determine authentication status information of an Open RAN (O-RAN) Radio Unit (O-RU) in a telecommunication network.

BACKGROUND

A Radio Access Network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor-specific. Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based, containerized or cloud-native, etc.), or could be in physical hardware form (e.g., non-VM based).

An open fronthaul network of a telecommunications system may be based on the O-RAN architecture. The open fronthaul network may include an O-RAN Radio Unit (O-RU) and an O-RU controller (e.g., an O-RAN Distributed Unit (O-DU), a Service Management and Orchestrator (SMO), etc.). The O-RU controller may provide services or controls to the O-RU, such as establishing a secured communication session, providing information for Network Protocol Configuration (NETCONF), and the like. Multiple O-RUs may be communicatively coupled to one O-RU controller via one or more transport network elements (TNEs), such as router(s), switch(es), and the like. The elements in the open fronthaul network (e.g., O-RUs, TNEs, O-RU controller, etc.) may be collectively referred to as "network entities" herein.

FIG. 1 illustrates a block diagram of an example of a generalized system architecture 100 of an open fronthaul network in the related art. As illustrated in FIG. 1, network entities of the open fronthaul network may include an O-RU 110, a TNE 120, and an O-RU controller 130. The O-RU 110 may be communicatively coupled to the O-RU controller 130 via the TNE 120. The communication among the network entities 110, 120, and 130 may include point-to-point LAN segments/communications.

The network entities may employ an IEEE 802.1x Port-based Network Access Control (PNAC) authentication process (may be referred to as "802.1x process" herein) in order to regulate access to the network, as well as guard against transmission and reception by unidentified or unauthorized parties, and consequent network disruption, theft of service, or data loss. In this regard, the network entities may have a role of either an authenticator or a supplicant. Data traffic is allowed to pass between network entities only if said network entities are authenticated via the 802.1x process. During the 802.1x process, a first network entity (e.g., an O-RU) may be a supplicant which initiates the 802.1x process and a second network entity (e.g., a TNE) may be an authenticator which controls access of the first network entity to an authentication server that performs the 802.1x process on the first network entity. The 802.1x process may include one or more Extensible Authentication Protocol (EAP)-based processes, such as EAP-Transport Layer Security (EAP-TLS) processes, and the like.

In the related art, authentication status information of a network entity (e.g., information on whether or not the network entity has been authenticated, information defining a trust level between the network entity and another network entity, etc.) is kept locally within the network entities involved in the 802.1x process (e.g., the O-RU, the TNE, etc.) and is not shared with other network entities (e.g., the O-RU controller, etc.) that are not involved in the 802.1x process. Instead, the trust is enforced only with the next hop network entity, and other network entities are assumed to be trustworthy if they are chained to or connected to the authenticated and/or authorized network entity.

The above approach for authentication of network entities in the related art may have at least the following shortcomings. The information regarding authenticated network entities is kept locally and network entities may simply be assumed to be trustworthy by being connected to an authenticated network entity. This, however, does not satisfy the Zero Trust Model, which requires every network entity attempting to access the open fronthaul network to be thoroughly authenticated before being granted access, without inherently trusting any network entity. In the related art, there is no mechanism for a single network entity in the open fronthaul network to have a comprehensive view of all the authenticated network entities within the network.

Further, there is no clearly defined technique or network topology for advertising information regarding authenticated network entities in the open fronthaul network in order to enable network entities to view the authentication status information of other network entities. There is also no clearly defined implementation of a centralized service in the open fronthaul network, nor a technique for regularly updating network elements to adapt to changes in the open fronthaul network.

Furthermore, when one or more TNEs (e.g., Ethernet switches, etc.) are permitted or included between the O-RU controller and remote sites hosting the O-RUs, the O-RU controller would inherently or implicitly trust all O-RUs by assuming that all O-RUs are trustworthy and allow communication to all O-RUs during start-up and installation, without the knowledge of the authentication/authorization status of the O-RUs. This, again, does not satisfy the Zero Trust Model, and the O-RU controller cannot guarantee that an O-RU is not spoofed before starting to provide services thereon. As a result, the network entities of the open haul network are exposed to potential security risks.

SUMMARY

Example embodiments of the present disclosure provide apparatuses, methods, and the like, for effectively and efficiently determining authentication status information of an O-RU. Specifically, example embodiments of the present disclosure define security mechanisms or approaches for enabling an O-RU controller to determine the authentication status information of the O-RU (e.g., whether or not the O-RU has been authenticated), and the O-RU controller may decide whether to establish a channel binding with the O-RU or to isolate the O-RU based thereon, without implicitly or inherently trusting all O-RUs connected thereto. Ultimately, the security of the open fronthaul network may be enhanced, and the communications among one or more O-RUs and the O-RU controller may be securely established while complying with the principle of Zero Trust Model.

According to embodiments, an Open Radio Access Network (O-RAN) Radio Unit (O-RU) controller may be configured to: obtain a Media Access Control (MAC) address of an O-RU; determine, based on the MAC address of the O-RU, an authentication status of the O-RU; based on determining that the O-RU has been authenticated, establish a channel binding with the O-RU; and based on determining that the O-RU has not been authenticated, isolate the O-RU from further communications with the O-RU controller.

According to embodiments, a method implemented by an Open Radio Access Network (O-RAN) Radio Unit (O-RU) controller, may include: obtaining a Media Access Control (MAC) address of an O-RU; determining, based on the MAC address of the O-RU, an authentication status of the O-RU; based on determining that the O-RU has been authenticated, establishing a channel binding with the O-RU; and based on determining that the O-RU has not been authenticated, isolating the O-RU from further communications with the O-RU controller.

According to embodiments, a non-transitory computer-readable recording medium may have recorded thereon instructions executable by an Open Radio Access Network (O-RAN) Radio Unit (O-RU) controller to cause the O-RU controller to perform a method including: obtaining a Media Access Control (MAC) address of an O-RU; determining, based on the MAC address of the O-RU, an authentication status of the O-RU; based on determining that the O-RU has been authenticated, establishing a channel binding with the O-RU; and based on determining that the O-RU has not been authenticated, isolating the O-RU from further communications with the O-RU controller.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 11A illustrates an example of a trust list for a network entity, according to one or more embodiments;

FIG. 11B illustrates an example of an updated authentication list for the network entity, according to one or more embodiments;

FIG. 11C illustrates an example of an updated trust list for the network entity, according to one or more embodiments;

FIG. 20 illustrates a block diagram of an example system architecture of an open fronthaul network, according to one or more embodiments;

FIG. 23 illustrates other examples of trusted datastore associated with the network entities in FIG. 21, according to one or more embodiments;

FIG. 26 illustrates a flow diagram of an example method for managing a communication with an O-RU, according to one or more embodiments;

FIG. 27A illustrates a flow diagram of an example method for obtaining MAC address of an O-RU, according to one or more embodiments FIG. 27B illustrates a flow diagram of another example method for obtaining MAC address of an O-RU, according to one or more embodiments;

DETAILED DESCRIPTION

Figure 1:
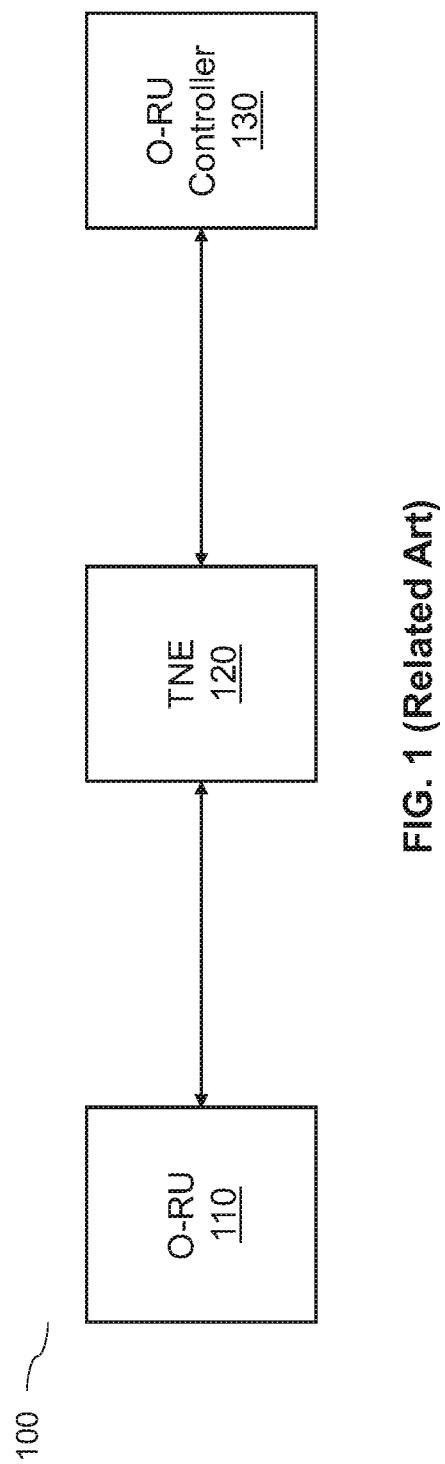
FIG. 1 illustrates a block diagram of an example of a generalized system architecture of an open fronthaul network in the related art.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

Systems, methods, devices, and the like, provided in the example embodiments of the present disclosure enable network entities to view authenticated network entities (e.g., authenticated supplicants) in the network. Specifically, example embodiments of the present disclosure enable network entities to view authenticated network entities (e.g., authenticated supplicants) in the network, which in turn enables the development of a data store of information on authenticated network entities, thus building a comprehensive view of all the authenticated network entities (e.g., authenticated supplicants) and defining an explicit level of trust.

Moreover, systems, methods, devices, and the like, provided in the example embodiments of the present disclosure advertise authenticated network entities for enabling network entities to view authenticated network entities (e.g., authenticated supplicants) in a telecommunication network. Specifically, example embodiments of the present disclosure build a comprehensive topological overview of all trusted authenticated network entities based on the data sent by each agent deployed in the network entities. Accordingly, example embodiments of the present disclosure define a network topology for effectively and efficiently advertise the information of the authenticated network entities.

Furthermore, systems, methods, devices, and the like, provided in the example embodiments of the present disclosure allow effective and efficient determination of the authentication status information of an O-RU. Specifically, example embodiments of the present disclosure define security mechanisms or approaches for enabling an O-RU controller to determine the authentication status information of the O-RU (e.g., information indicating whether or not the O-RU has been authenticated via an authentication process like the 802.1x process), and the O-RU controller may decide whether to establish a channel binding with the O-RU or to isolate the O-RU based thereon, without implicitly or inherently trusting all O-RUs connected thereto. In this way, the security of the open fronthaul network may be enhanced, and the communications among one or more O-RUs and the O-RU controller may be securely established while complying with the principle of Zero Trust Model.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

Figure 2:
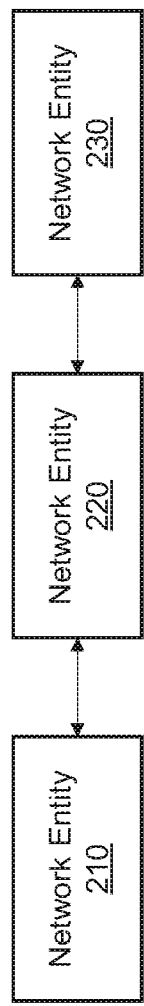
FIG. 2 illustrates a block diagram of an example system configuration in a peer-to-peer configuration, according to one or more embodiments.

FIG. 2 illustrates a block diagram of an example system configuration 200 in a peer-to-peer configuration, according to one or more embodiments. As illustrated in FIG. 2, system configuration 200 may include a plurality of network entities (e.g., Network Entity 210, Network Entity 220, and Network Entity 230) that are communicatively coupled to each other in the peer-to-peer configuration. One or more of the plurality of network entities may be configured to view and/or to advertise information of authenticated network entity(s), such as information of authenticated supplicant(s), in the peer-to-peer configuration. Further, the one or more of the plurality of network entities may be configured to determine authentication status information (e.g., 802.1x authentication status) of at least one O-RU and to manage a communication with the O-RU based thereon, in the peer-to-peer configuration.

Each of the plurality of network entities 210, 220, and 230 may include an apparatus, a system, a platform, a module, or the like, which may be configured to perform one or more operations or actions in a network. According to embodiments, the plurality of network entities 210, 220, and 230 may include entities such as one or more RAN elements (e.g., an O-RU, an O-DU, an O-RAN Centralized Unit (O-CU), etc.), one or more TNEs, an SMO, and the like.

According to embodiments, each of the plurality of network entities 210, 220, and 230, may deploy an agent. Each of the agents may include a software or an entity having a predefined set of instructions. Each of the agents may also be autonomous and may operate independently or in collaboration with other agents deployed in other network entities. Each of the agents may also be set up with information regarding other agents deployed in network entities that are directly connected to their respective network entities, either through manual configuration during bootstrapping or through automated techniques. According to embodiments, each of the agents may be able to support one or more Hypertext Transfer Protocol (HTTP) operations, such as GET, POST, PUT, DELETE, and the like, for communicating and exchanging information with each other.

According to embodiments, each of the agents may be configured to communicate directly with each other in the peer-to-peer configuration. In this case, each of the agents may be configured to establish mutual authentication with each other. In particular, an agent may be configured to establish its identity to another agent by presenting a valid authentication credential such as a digital certificate, and/or by presenting an application programming interface (API) key. Such mutual authentication between agents may improve security of communication between the plurality of network entities, and may allow said agents to communicate via a secured connection. According to embodiments, mutual authentication between the agents may be established after respective network entities are authenticated with each other.

According to embodiments, each of the agents may be configured to perform functions related to one or more trusted datastores, such as creating, updating, obtaining, viewing, and advertising the one or more trusted datastores (e.g., authentication list, trust list, etc.).

Figure 3A:
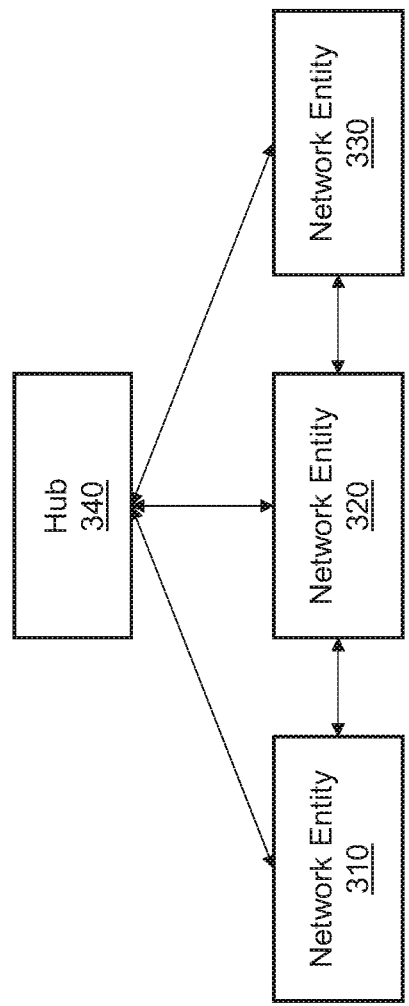
FIG. 3A illustrates a block diagram of an example system configuration in a hub-and-spoke configuration.

FIG. 3A illustrates a block diagram of an example system configuration 300 in a hub-and-spoke configuration, according to one or more embodiments. As illustrated in FIG. 3A, system configuration 300 may include a plurality of network entities (e.g., Network Entity 310, Network Entity 320, and Network Entity 330) that are communicatively coupled to each other, and a hub 340 that is communicatively coupled to each of the plurality of network entities 310, 320, and 330 in a hub-and-spoke configuration. One or more of the network entities 310, 320, and 330 in FIG. 3A may be similar to one or more of the network entities 210, 220, and 230 in FIG. 2. The hub 340 may include an apparatus, a system, a platform, a module, or the like, which may be configured to perform one or more operations or actions for managing information of authenticated network entities in a network. For instance, as further described below, the hub 340 may be configured to advertise the information of one or more authenticated network entities.

One or more of the plurality of network entities may be configured to view and/or to advertise information of authenticated network entity(s), such as information of authenticated supplicants, in the hub-and-spoke configuration. Further, the one or more of the plurality of network entities may be configured to determine authentication status information of at least one O-RU and to manage a communication with the O-RU based thereon, in the hub-and-spoke configuration.

Figure 3B:
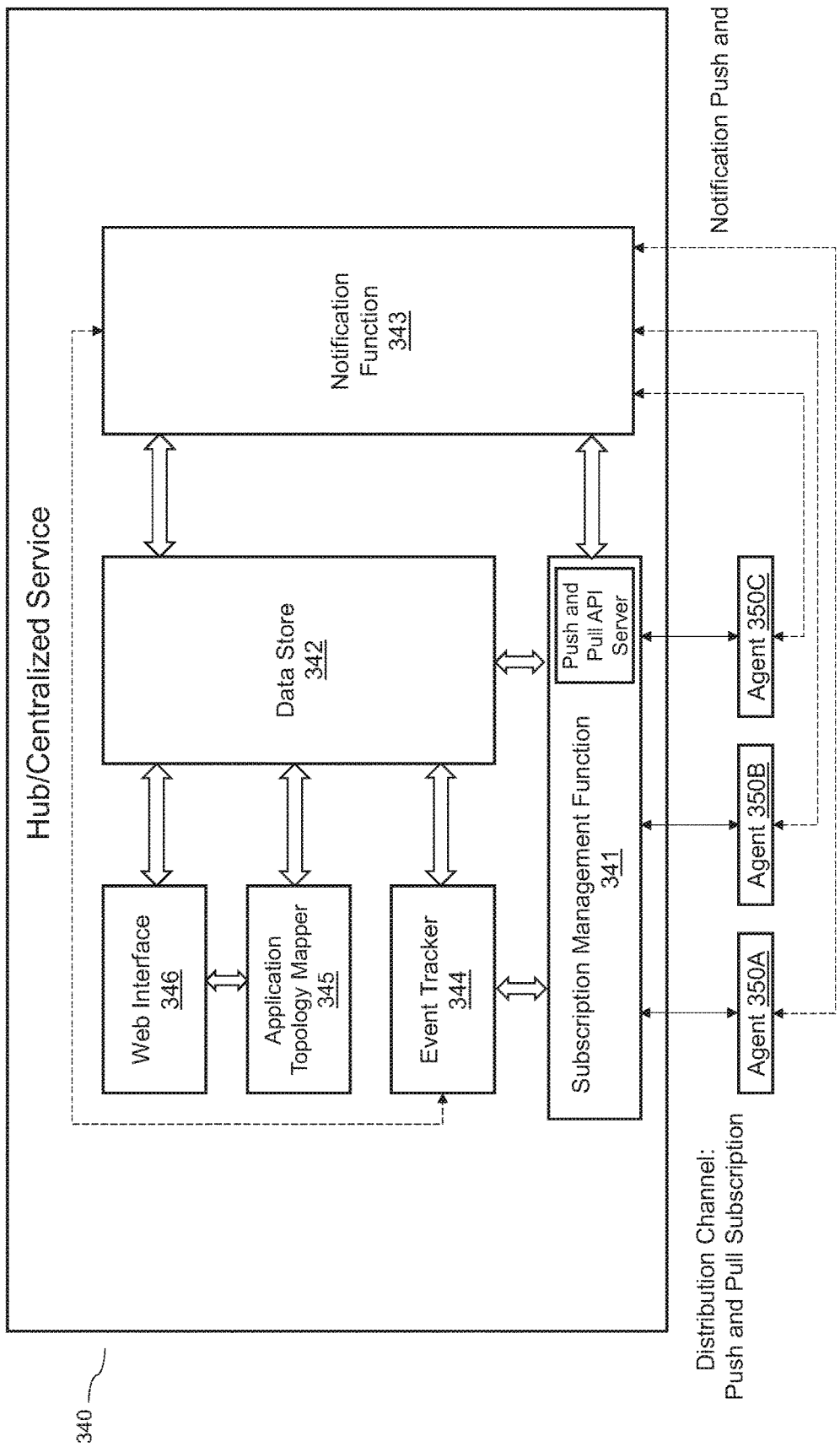
FIG. 3B illustrates a block diagram of an example configuration of a hub, according to one or more embodiments.

FIG. 3B illustrates a block diagram of an example configuration of the hub 340, according to one or more embodiments. As shown in FIG. 3B, the hub 340 may include components such as a subscription management function 341 which includes integrated functions configured to perform operations in accordance with a Push and Pull Model and a Subscription Notify Model, a data store 342 configured to handle a database of authenticated network entities (e.g., authenticated supplicants) in the open fronthaul network, a notification function 343 configured to inform subscribers regarding updates in the real-time network traffic, an event tracker 344 configured to monitor new subscriptions and any requests made by the hub 340 or agents 350A, 350B and 350C, a network (application) topology mapper 345 configured to provide a comprehensive map of all the authenticated network entities (e.g., authenticated supplicants) in the network, and a web interface 346 configured to access and view the comprehensive map of all the authenticated network entities (e.g., authenticated supplicants) in the network.

According to embodiments, the hub 340 may include a centralized service that acts as a central point of communication for the plurality of network entities 310, 320, and 330. According to embodiments, the hub 340 may be hosted on any element in the open fronthaul network that has a communication path to the plurality of network entities 310, 320, and 330, such as an O-RU, an O-DU, an SMO, or an IEEE 802.1x Authentication Server. In some implementations, the hub 340 may act as a centralized agent. Alternatively, one or more operations of one or more components in the hub 340 may be deployed in the form of a virtual network service. In this case, the hub 340 may act as a centralized service.

According to embodiments, each of the agents 350A-350C may be deployed in one or more of the plurality of network entities 310, 320, and 330. The agents 350A-350C may include a software or an entity having a predefined set of instructions. Each of the agents 350A-350C may also be autonomous and may operate independently or in collaboration with other agents deployed in other network entities. Each of the agents 350A-350C may also be set up with information regarding other agents deployed in network entities that are directly connected to their respective network entities, either through manual configuration during bootstrapping or through automated techniques. According to embodiments, each of the agents 350A-350C may be able to support one or more HTTP methods (e.g., GET/POST/PUT/DELETE, etc.) for communicating and exchanging information with each other.

According to embodiments, each of the agents 350A-350C may be configured to communicate indirectly with each other via the hub 340 in the hub-and-spoke configuration, where the hub 340 may act as a central point of communication for the agents 350A-350C. According to embodiments, the hub 340 and the agents 350A-350C may exchange data (e.g., request and provide services and resources, etc.) in accordance with a Push and Pull Model and/or a Subscription Notify Model.

According to embodiments, each of the agents 350A-350C may be configured to establish mutual authentication with the hub 340. In particular, an agent may be configured to utilize a mutual TLS (mTLS) process to establish a secured connection with the hub, and the above models may be secured in the mTLS environment through encryption. The mutual authentication between agents and the hub 340 may also improve security of communication between the plurality of network entities and the hub 340, and may allow said agents to communicate indirectly via a secured connection. For instance, once the connection is established between the agents 350A-350C and the hub 340, the data that is transmitted between the agents 350A-350C and the hub 340 may be encrypted using one or more TLS processes, which provides data confidentiality and integrity. As such, even if an attacker intercepts the transmitted data, they will not be able to read or tamper with the data.

According to embodiments, one or more of the agents 350A-350C may be configured to perform functions related to one or more trusted datastores, such as creating, updating, obtaining, viewing, and advertising the one or more trusted datastores (e.g., authentication list, trust list, etc.) to the hub 340.

According to embodiments, one or more of the plurality of network entities 210, 220, 230, 310, 320, and 330 may be configured to perform the above functions related to the one or more trusted datastores (e.g., authentication list, trust list, etc.), without the agents 350A-350C. In particular, each of the plurality of network entities may utilize an EAP over LAN (EAPoL) notification to inform an authenticated network entity (i.e., a network entity authenticated via an authentication process such as an 802.1x process) regarding the one or more trusted datastores. In this case, such process may involve implementing changes to the IEEE 802.1x specification, such as in the IEEE 802.1x EAP notification methods. On the other hand, by deploying the agents to perform the above functions related to the one or more trusted datastores, each of the plurality of network entities is allowed to utilize the information of the authenticated network entities without changing the IEEE 802.1x specification.

It can be understood that the configurations illustrated in FIG. 2, FIG. 3A, and FIG. 3B are simplified for descriptive purpose, and are not intended to limit the scope of the present disclosure in any way. For example, in practice, the number of network entities and/or the agents in the system can be any number.

Figure 4:
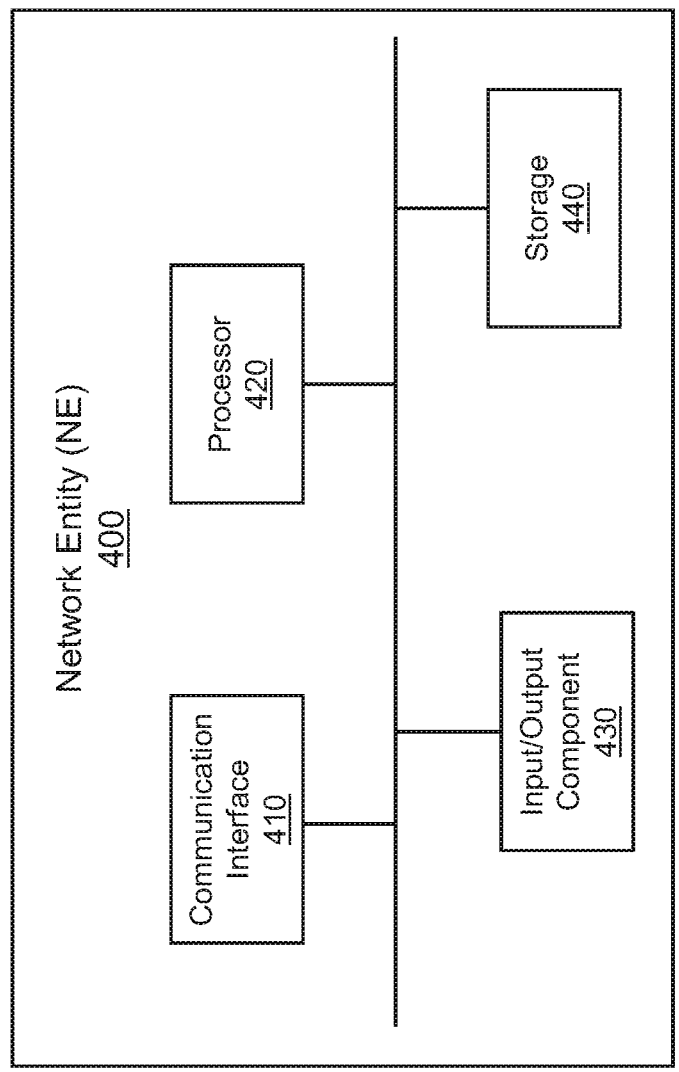
FIG. 4 illustrates a block diagram of example components in a network entity (NE), according to one or more embodiments.

Several example components that may be included in the plurality of network entities and the hub, according to one or more embodiments, are described below with reference to FIG. 4. FIG. 4 illustrates a block diagram of example components in a network entity (NE) 400, according to one or more embodiments. The NE 400 may correspond to at least one network entity of the plurality of network entities in FIG. 2 and FIG. 3A, or may correspond to the hub 340 in FIG. 3A and FIG. 3B. Thus, the features associated with the plurality of network entities/the hub and the NE 400 may be similarly applicable to each other, unless explicitly described otherwise. Further, it is contemplated that the descriptions of one or more components of the NE 400 may also apply to an O-RU controller (example embodiments associated therewith are described below with reference to FIG. 20 to FIG. 28C).

As illustrated in FIG. 4, the NE 400 may include at least one communication interface 410, at least one processor 420, at least one input/output component 430, and at least one storage 440, although it can be understood that the NE 400 may include more or fewer components than as illustrated in FIG. 4, and/or may be arranged in a manner different from as illustrated in FIG. 4, without departing from the scope of the present disclosure.

The communication interface 410 may include at least one transceiver-like component (e.g., a transceiver, a separate receiver and transmitter, a bus, etc.) that enables the components of the NE 400 to communicate with each other and/or to communicate with one or more components external to the NE 400, such as via a wired connection, a wireless connection, or a combination of wired and wireless connections.

For instance, the communication interface 410 may couple the processor 420 to the storage 440 to thereby enable them to communicate and to interoperate with each other in performing one or more operations. As another example, communication interface 410 may couple the NE 400 (or one or more components included therein) to a separate network entity, so as to enable them to communicate and to interoperate with each other. According to embodiments, the communication interface 410 may include one or more application programming interfaces (APIs) that allow the NE 400 (or one or more components included therein) to communicate with one or more software applications.

The input/output component 430 may include at least one component that permits the NE 400 to receive information and/or to provide output information. It can be understood that, in some embodiments, the input/output component 430 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 440 may include one or more storage mediums suitable for storing data, information, and/or computer-executable instructions therein. According to embodiments, the storage 440 may include at least one memory storage, such as a random access memory (RAM), a read-only memory (ROM), and/or another type of dynamic or static storage device (e.g., a flash memory, a magnetic memory, and/or an optical memory) that stores information and/or instructions for use by the processor 420. Additionally or alternatively, the storage 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 440 may be configured to store information, such as raw data, metadata, or the like. Additionally or alternatively, the storage 440 may be configured to store one or more information associated with one or more operations performed by the processor 420. For instance, the storage 440 may store information defining the historical operation(s) performed by the processor 420, one or more results of one or more operations performed by the processor 420, one or more trusted datastores such as one or more authentication lists and/or one or more trust lists, or the like.

In some implementations, the storage 440 may include a plurality of storage mediums, and the storage 440 may be configured to store a duplicate or a copy of at least a portion of the information in the plurality of storage mediums, to provide redundancy and for backing up the information or the associated data. Furthermore, the storage 440 may also store computer-readable or computer-executable instructions which, when being executed by one or more processors (e.g., processor 420), cause the one or more processors to perform one or more actions/operations described herein.

The processor 420 may include at least one processor capable of being programmed or being configured to perform a function(s) or an operation(s) described herein. For instance, the processor 420 may be configured to execute computer-executable instructions stored in at least one storage medium or a memory storage (e.g., storage 440, etc.) to thereby perform one or more actions or one or more operations described herein.

According to embodiments, the processor 420 may be configured to receive (e.g., via the communication interface 410, via the input/output component 430, etc.) one or more signals and/or one or more user inputs defining one or more instructions for performing one or more operations. Further, the processor 420 may be implemented in hardware, firmware, or a combination of hardware and software. For instance, processor 420 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 420 may be configured to collect, to extract, and/or to receive one or more information (in the form of signal or data, etc.), and to process the received one or more information to thereby enable network entities to view authenticated supplicants, to advertise authenticated network entities, and to determine the authentication status information of at least one O-RU.

Descriptions of several example operations which may be performed by the processor 420 are provided below with reference to FIG. 5 to FIG. 28C.

Example Operations: Viewing Information of Authenticated Network Entities

As described above, one or more network entities may be configured to view information of authenticated network entities, according to one or more embodiments. For instance, a network entity may obtain and view information of one or more authenticated network entities (e.g., authenticated supplicants, etc.) in a peer-to-peer configuration. Further, in a hub-and-spoke configuration, the network entity may obtain said information from a hub, and may view said information accordingly. Example operations associated therewith are described below with reference to FIG. 5 to FIG. 11C.

Figure 5:
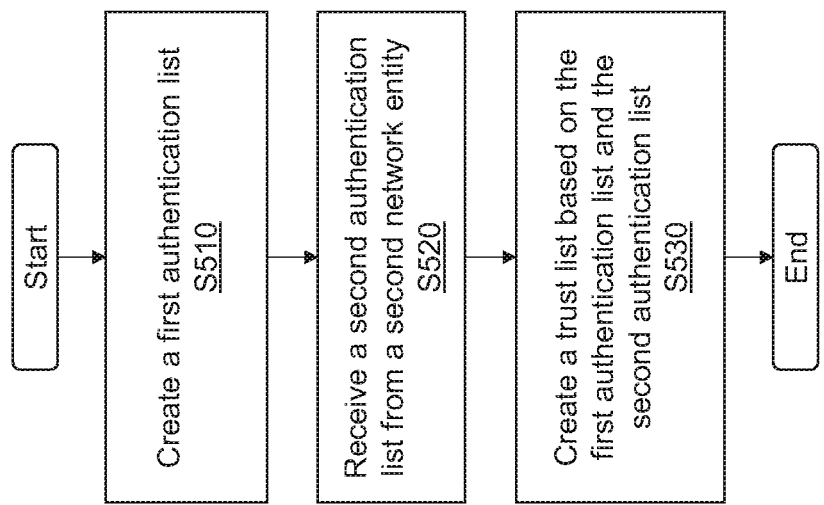
FIG. 5 illustrates a flow diagram of an example method for enabling a plurality of network entities to view authenticated network entities in a peer-to-peer configuration, according to one or more embodiments.

FIG. 5 illustrates a flow diagram of an example method 500 for enabling a plurality of network entities to view authenticated supplicants in a peer-to-peer configuration, according to one or more embodiments. One or more operations in method 500 may be performed by at least one processor (e.g., processor 420) of at least one network entity (i.e., a first network entity) of the plurality of network entities in the open fronthaul network. It can be understood that said one or more operations may also be performed by a system including the at least one network entity, by a system including at least one processor, and the like, without departing from the scope of the present disclosure.

As illustrated in FIG. 5, at operation S510, the at least one network entity may be configured to create a first authentication list. According to embodiments, the first authentication list may specify one or more network entities that are authenticated with the at least one network entity. Specifically, the first authentication list may specify one or more MAC addresses of one or more ports (e.g., a Network Interface Card (NIC), etc.) of the at least one network entity (may be referred to as "one or more first MAC addresses" herein), and one or more MAC addresses of one or more ports of one or more network entities authenticated with the one or more first MAC addresses. According to embodiments, the first authentication list may also specify a role of the one or more ports of the at least one network entity, such as an authenticator and a supplicant.

Figure 6:
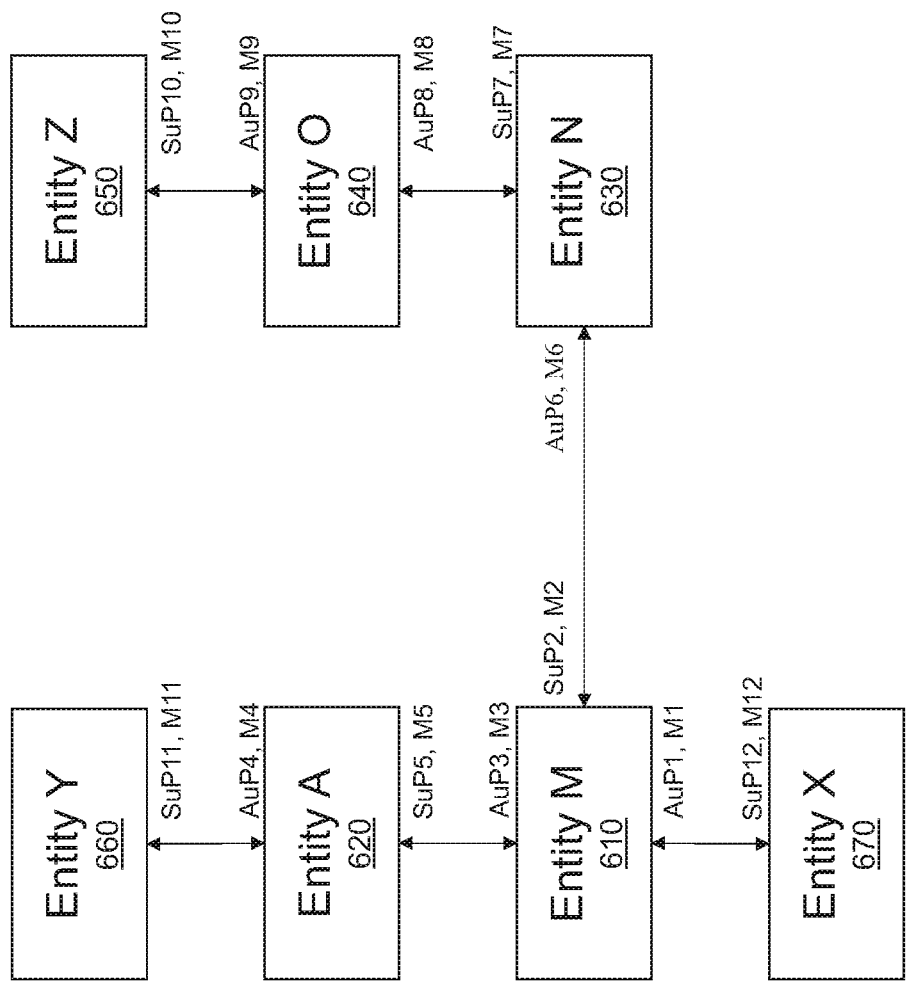
FIG. 6 illustrates an example use case in which the network entities are configured in a peer-to-peer configuration, according to one or more embodiments.

For example, referring to FIG. 6, which illustrates an example use case in which the network entities are configured in a peer-to-peer configuration. As shown in FIG. 6, the system may comprise seven network entities, namely: Network Entity Y, Network Entity A, Network Entity M, Network Entity X, Network Entity Z, Network Entity O, and Network Entity N.

As shown in FIG. 6, for example, Network Entity A is authenticated with Network Entity Y and Network Entity M; where port AuP4 of Network Entity A has a MAC address M4 and a role of an authenticator that is authenticated with port SuP11 of Network Entity Y, which has a MAC address M11 and a role of a supplicant; and where port SuP5 of Network Entity A has a MAC address M5 and a role of a supplicant that is authenticated with port AuP3 of Network Entity M, which has a MAC address M3 and a role of an authenticator. Similar explanation applies to Network Entity Y, Network Entity M, Network Entity X, Network Entity Z, Network Entity O, and Network Entity N.

It may be understood that the authentication between the network entities may be performed based on an 802.1x process with an IEEE 802.1x authentication server. In particular, as part of the EAPoL process, a network entity acting as an authenticator requests identity information from network entities acting as the supplicants, and relays said identity information to the authentication server. The authentication server then validates the identity information of the network entities acting as the supplicants and determines if said network entities are authorized to access the network. If said network entities acting as the supplicants are authorized to access the network, said network entities acting as the supplicants are authenticated with said network entity acting as the authenticator. Through the above authentication process, the network entities involved in the authentication process are able to obtain information such as port identity, port MAC address, role of the ports, authorization status, and the like, from each other.

Figure 7:
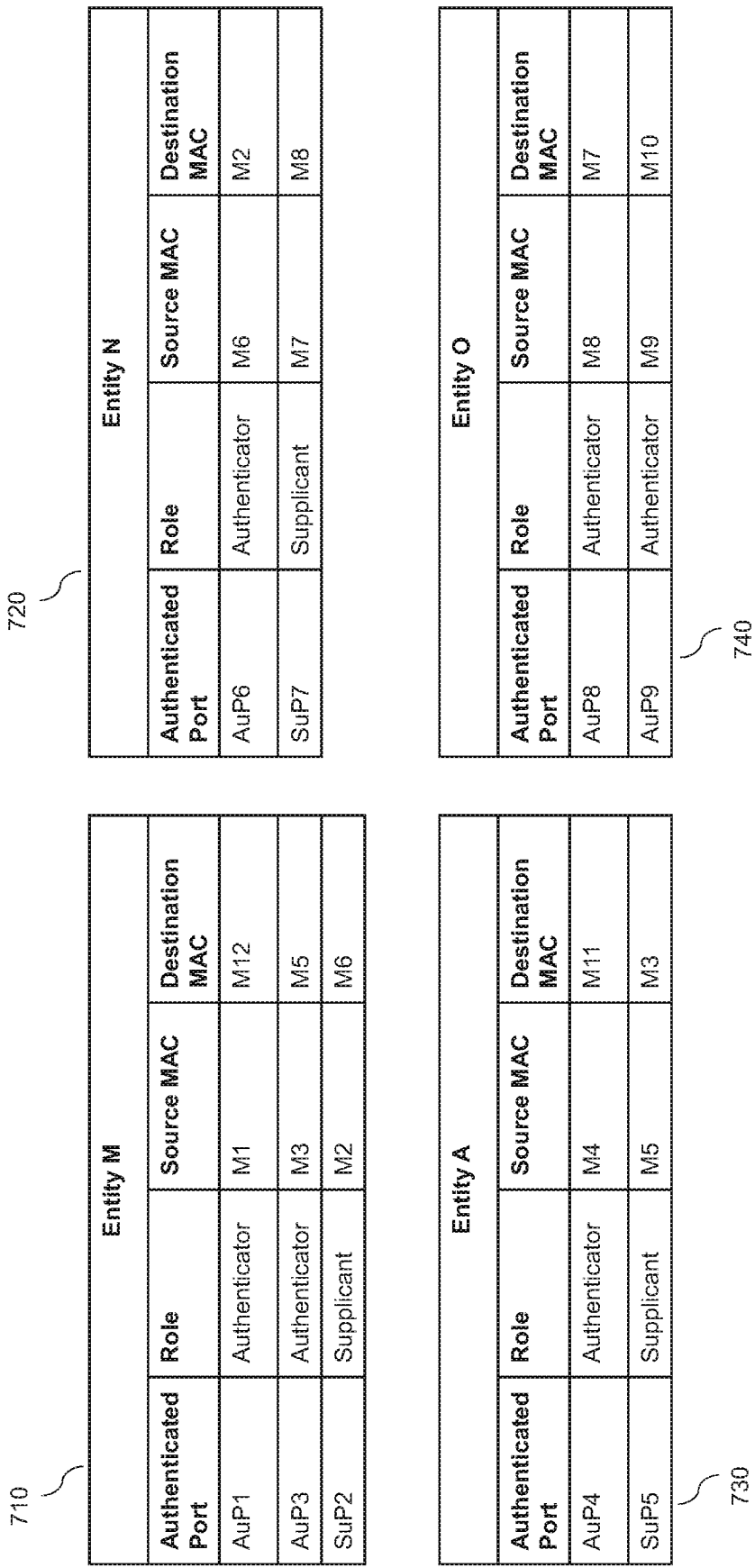
FIG. 7 illustrates examples of authentication lists, according to one or more embodiments.

FIG. 7 illustrates examples of authentication lists, according to one or more embodiments. As shown in FIG. 7, for example, Network Entity A may be configured to create its authentication list 730 that may specify the MAC addresses M4 and M5 of ports AuP4 and SuP5 of the Network Entity A, as well as the MAC address M11 of ports SuP11 of Network Entity Y that is authenticated with port AuP4, and the MAC address M3 of ports AuP3 of Network Entity M that is authenticated with port SuP5. Further, the authentication list for Network Entity A may also specify that port AuP4 of Network Entity A has a role of an authenticator, and port SuP5 of Network Entity A has a role of a supplicant. As such, the authentication list 730 may specify Network Entity Y and Network Entity M (which have ports SuP11 and AuP3, respectively) that are authenticated with Network Entity A (which has ports AuP4 and SuP5).

Similar explanation applies to Network Entity Y, Network Entity M, Network Entity X, Network Entity Z, Network Entity O, and Network Entity N. Since Network Entity Y, Network Entity X, and Network Entity Z have only one port, the authentication lists for said network entities are omitted from FIG. 7. It can be understood that parameters illustrated in the authentication lists of FIG. 7 are merely examples of possible use cases, and the scope of the present disclosure should not be limited thereto. Specifically, in practice, the authentication lists may include more/fewer parameters than as illustrated, and/or the parameters may be presented in a different manner than as illustrated, without departing from the scope of the present disclosure.

According to embodiments, the at least one network entity may be configured to create and update, at a regular period of time (i.e., a regular interval or periodicity), the associated authentication list. For instance, the at least one network entity may be configured to perform, at the regular period of time, a Simple Network Management Protocol version 3 (SNMPv3) query of an Object Identifier (OID) "1.3.111.2.802.1.1.15.2.2.3". Subsequently, based on an SNMPv3 response (which would show the status of an Object-Type "ieee8021XPaeLogonGroup"), the at least one network entity may then create and/or update the authentication list. According to embodiments, the at least one network entity may also be configured to transmit the first authentication list to the one or more network entities that are authenticated with the at least one network entity.

Referring back to FIG. 5, upon creating the first authentication list at operation S510, the method 500 may proceed to operation S520, at which the at least one network entity (i.e., the first network entity) may be configured to receive a second authentication list from a second network entity. According to embodiments, the transmitting of the first authentication list and the receiving of the second authentication list may be performed by the at least one network entity via an advertising interface.

According to embodiments, the at least one network entity (i.e., the first network entity) and the second network entity may be authenticated with each other. According to embodiments, similar to the first authentication list, the second authentication list may specify one or more network entities that are authenticated with the second network entity. In particular, the second authentication list may specify one or more MAC addresses of one or more ports of the second network entity (may be referred to as "one or more second MAC addresses" herein) and one or more MAC addresses of one or more ports of one or more network entities authenticated with the one or more second MAC addresses. According to embodiments, the second authentication list may also specify a role of the one or more ports of the second network entity, such as an authenticator and a supplicant. For example, referring to FIG. 6 and FIG. 7, at operation S520, the Network Entity A (i.e., component 620 in FIG. 6) may receive an authentication list of Network Entity M (i.e., authentication list 710 in FIG. 7) from Network Entity M (i.e., component 610 in FIG. 6) which is authenticated with Network Entity A.

The method 500 then proceeds to operation S530, at which the at least one network entity may be configured to create a trust list based on the first authentication list and the second authentication list. According to embodiments, the trust list may specify a trust level between the at least one network entity (i.e., the first network entity) and one or more network entities in the first and second authentication lists. For example, referring to FIG. 6 and FIG. 7, since the authentication list of Network Entity A specifies Network Entity Y and Network Entity M (which are authenticated with Network Entity A via port MAC addresses M11 and M3, respectively) and since the authentication list of Network Entity M specifies Network Entity X and Network Entity N (which are authenticated with Network Entity M via port MAC addresses M12 and M6, respectively), the trust list for Network Entity A may specify a trust level between Network Entity A and Network Entity Y, Network Entity M, Network Entity X, and Network Entity N. Examples of operations for creating a trust list are described below with reference to FIG. 10.

Upon performing operation S530, the method 500 may be ended or be terminated. Alternatively, method 500 may return to operation S520, such that the at least one network entity may be configured to repeatedly (e.g., periodically, continuously, etc.) perform, for at least a predetermined amount of time, the receiving the second authentication list (at operation S520) and the creating the trust list (at operation S530). For instance, the at least one network entity may continuously or periodically receive a plurality of authentication lists from a plurality of network entities and may then create or update the trust list based thereon.

In view of the above, according to one or more embodiments, the network entities in the open fronthaul network may communicate in the peer-to-peer configuration to obtain the information of authenticated network entities. Accordingly, example embodiments of the present disclosure may enable the network entities to view information of authenticated network entities (e.g., authenticated supplicants, etc.) in the network via communicating with one another in the peer-to-peer configuration. More specifically, each network entity in the network could obtain overall knowledge of other authenticated network entities by referring to one or more trusted datastores (e.g., authentication list, trust list, etc.) created locally and updated in a timely manner.

Additionally or alternatively, the network entities may be configured to obtain the information of authenticated network entities via communicating with a hub (or a centralized agent/centralized service). Descriptions of an example hub are provided above with reference to the hub 340 in FIG. 3A and FIG. 3B, and further descriptions of several example operations associated therewith in viewing the information of the authenticated network entities are provided below with reference to FIG. 8 to FIG. 11C.

Figure 8:
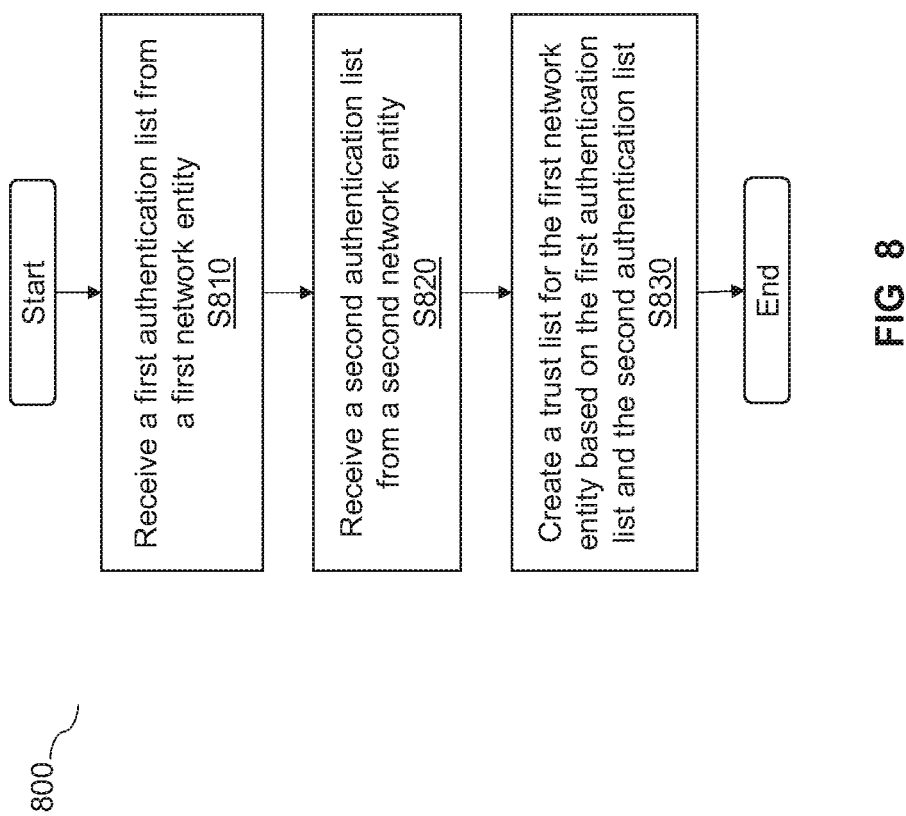
FIG. 8 illustrates a flow diagram of an example method for enabling a plurality of network entities to view information of authenticated network entities in a hub-and-spoke configuration, according to one or more embodiments.

FIG. 8 illustrates a flow diagram of an example method 800 for enabling a plurality of network entities to view information of authenticated network entities (e.g., authenticated supplicants) in a hub-and-spoke configuration, according to one or more embodiments. One or more operations in method 800 may be performed by at least one processor (e.g., processor 420) of a hub communicatively coupled to the plurality of network entities in the system. It can be understood that said one or more operations may also be performed by a system including the hub, by a system including at least one processor, and the like, without departing from the scope of the present disclosure.

As illustrated in FIG. 8, at operation S810, the hub may be configured to receive a first authentication list from a first network entity. The first authentication list may be similar to the first authentication list described above in relation to method 500 of FIG. 5.

Figure 9:
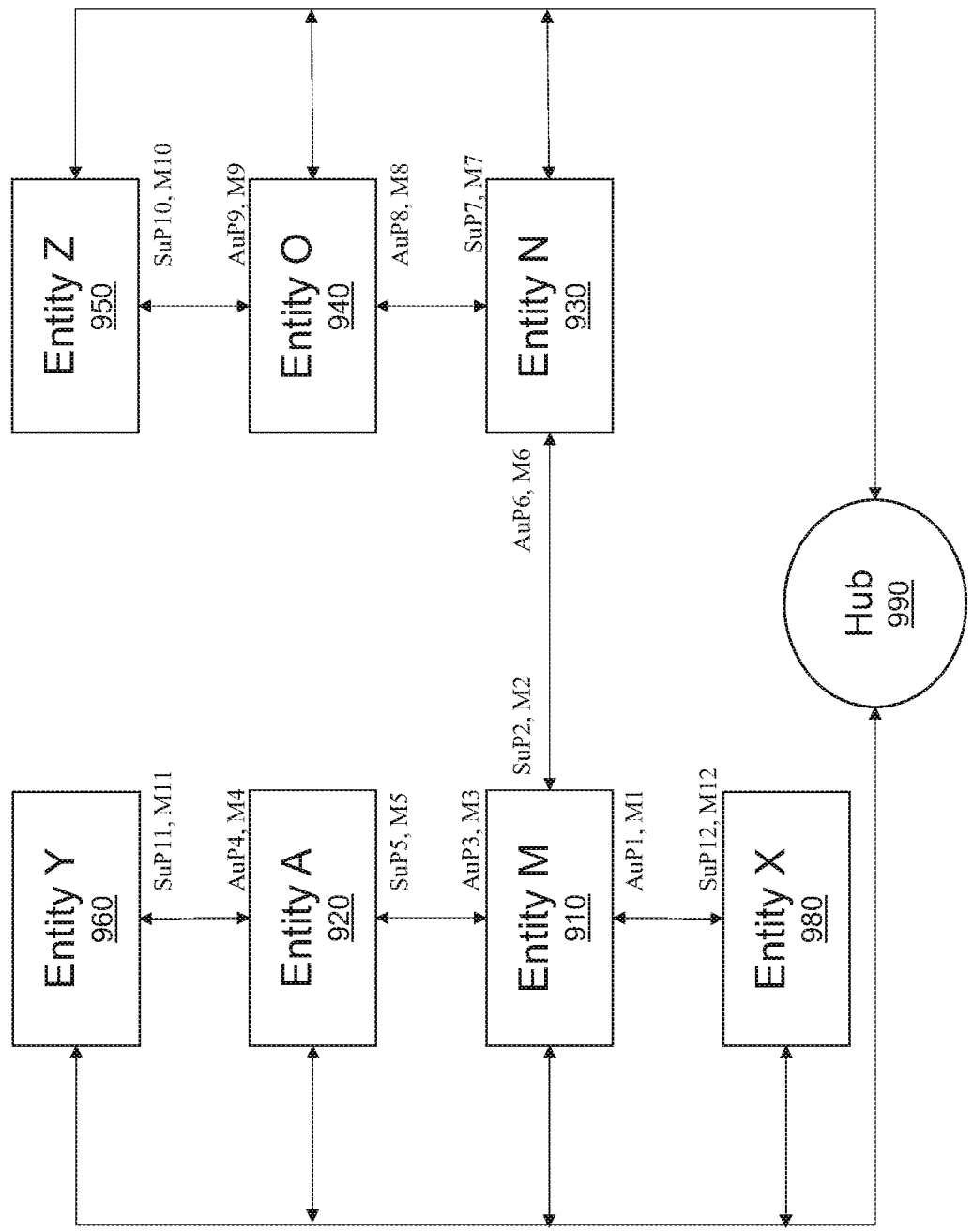
FIG. 9 illustrates an example use case in which the network entities are configured in a hub-and-spoke configuration, according to one or more embodiments.

FIG. 9 illustrates an example use case in which the network entities are configured in a hub-and-spoke configuration, according to one or more embodiments. The examples of network entities in the hub-and-spoke configuration shown in FIG. 9 are similar to the examples of network entities in the peer-to-peer configuration shown in FIG. 6, with an addition of a hub 990 that is communicatively coupled to each of the network entities.

In this regard, referring to FIG. 7 and FIG. 9, at operation S810, the hub 990 may, for example, be configured to receive the authentication list of Network Element A (i.e., the authentication list 730 shown in FIG. 7) from Network Element A (i.e., component 920 in FIG. 9).

Upon performing operation S810, the method 800 may then proceed to operation S820, at which the hub may be configured to receive a second authentication list from a second network entity. The second authentication list may be similar to the second authentication list described above in relation to method 500. For example, referring to FIG. 7 and FIG. 9, at operation S820, the hub 990 may receive an authentication list of Network Entity M (i.e., the authentication list 710 shown in FIG. 7) from Network Entity M (i.e., component 910 in FIG. 9) which is authenticated with Network Entity A.

According to embodiments, the receiving of the first authentication list and the second authentication list may be performed by the hub via an advertising interface. Upon receiving the first authentication list and the second authentication list, the method 800 may proceed to operation S830, at which the hub may be configured to create a trust list for the first network entity based on the first authentication list and the second authentication list. The trust list may be similar to the trust list described above in relation to method 500. Further descriptions of examples of trust lists are provided below with reference to FIG. 11A and FIG. 11C.

Upon performing operation S830, the method 800 may be ended or be terminated. Alternatively, method 800 may return to operation S820, such that the hub may be configured to repeatedly (e.g., periodically, continuously, etc.) perform, for at least a predetermined amount of time, the receiving the second authentication list (at operation S820) and the creating the trust list (at operation S830). For instance, the hub may continuously (or periodically) receive a plurality of authentication lists from a plurality of network entities, and may then create or update the trust list based thereon.

In view of the above, according to one or more embodiments, the network entities in the open fronthaul network may communicate with the hub in the hub-and-spoke configuration, and the hub may provide information of one or more trusted datastores (e.g., authentication list, trust list, etc.) associated with the authenticated network entities to the network entities communicatively coupled thereto. For instance, the one or more trusted datastores (e.g., authentication list, trust list, etc.) may be created locally at each network entity and transmitted to the hub and/or may be created at the hub, and the hub may then be configured to transmit or advertise the one or more trusted datastores to the network entities associated therewith. Further, the hub may be configured to update, at regular intervals or periodically, at least a portion of the trusted datastores (e.g., trust list, etc.). Accordingly, example embodiments of the present disclosure may enable the network entities to view information of authenticated network entities (e.g., authenticated supplicants, etc.) in the network via communicating with the hub in the hub-and-spoke configuration. More specifically, each network entity in the network could obtain overall knowledge of other authenticated network entities by referring to the one or more trusted datastores (e.g., authentication list, trust list, etc.) created and updated in a timely manner.

Figure 10:
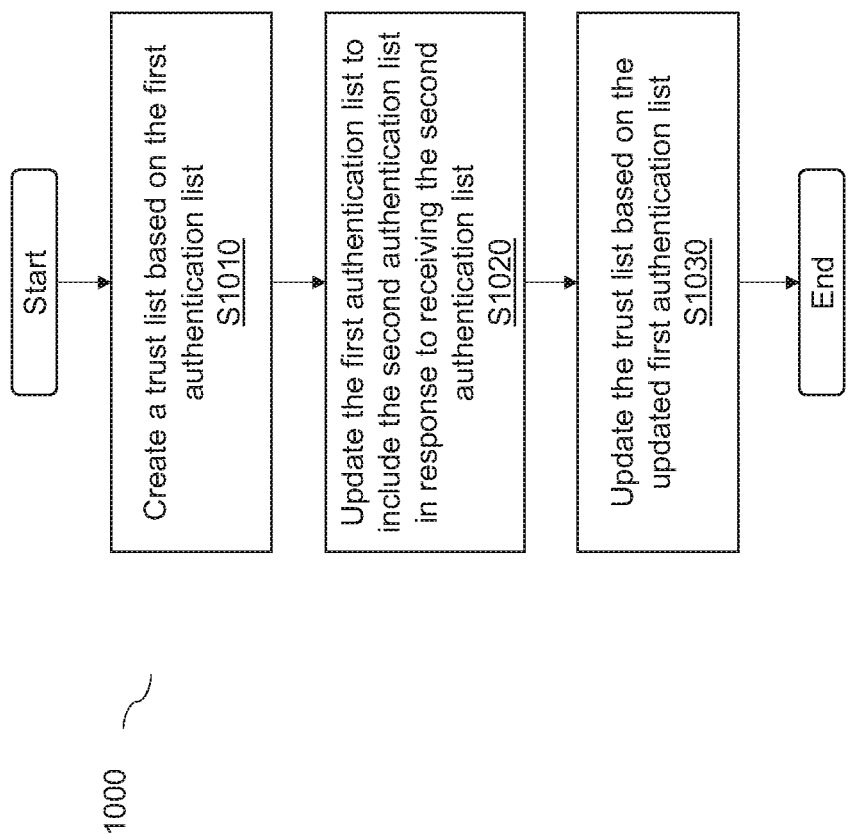
FIG. 10 illustrates a flow diagram of an example method for managing a trust list, according to one or more embodiments.

In the following, examples of operations for managing (e.g., creating, updating, etc.) a trust list are described. FIG. 10 illustrates a flow diagram of an example method 1000 for managing a trust list, according to one or more embodiments. The trust list may include information collected and consolidated from multiple authenticated network entities in an open fronthaul network.

For instance, in some implementations, the trust list may be presented in the form of an entity-level trust table and/or in the form of a network-level (e.g., direct or indirect) trust table. The entity-level trust table may be generated based on an authentication list associated with a network entity. On the other hand, the network-level trust table may be generated based on information consolidated from a plurality of authentication lists, each of the plurality of authentication lists is associated with one of a plurality of authenticated network entities (e.g., authenticated supplicants) in the network. An example of an entity-level trust list (i.e., a trust list presented in the form of an entity-level trust table) is described below with reference to FIG. 11A, and an example of a network-level trust list (i.e., a trust list presented in the form of a network-level trust table) is described below with reference to FIG. 11C.

It is contemplated that, in some implementations, the authentication list may also be presented in the form of an entity-level authentication table and/or in the form of a network-level authentication table, in a similar manner. For instance, the authentication list 730 described above is an example of an entity-level authentication list (i.e., an authentication list presented in the form of an entity-level authentication table) associated with Network Entity A, and an example of a network-level authentication list (i.e., an authentication list presented in the form of a network-level authentication table) associated with Network Entity A is described below with reference to FIG. 11B.

Referring back to FIG. 10, one or more operations in the method 1000 may be performed by at least one processor (e.g., processor 420) of at least one network entity (i.e., the first network entity) of the plurality of network entities in the system, or may be performed by at least one processor (e.g., processor 420) of the hub communicatively coupled to the plurality of network entities in the system. It can be understood that said one or more operations may also be performed by a system including the at least one network entity, by a system including the hub, by a system including at least one processor, and the like, without departing from the scope of the present disclosure. Further, it is contemplated that one or more operations of the method 1000 may be performed in the peer-to-peer configuration and/or the hub-and-spoke configuration, and may be part of operation S530 in the method 500 or may be part of operation S830 in the method 800.

Referring to FIG. 10, at operation S1010, the at least one network entity/the hub may be configured to create a trust list based on a first authentication list. The first authentication list may be created by the at least one network entity (at operation S510), or may be received by the hub from the first network entity (at operation S810).

According to embodiments, the trust list created based on the first authentication list may specify a trust level between the at least one network entity (i.e., the first network entity) and the one or more network entities in the first authentication list. Specifically, in some embodiments, the trust level may be one of direct trust and indirect trust between one or more ports of the at least one network entity (i.e., the first network entity) and one or more ports of the one or more network entities in the first authentication list that has a role of a supplicant.

According to embodiments, the trust list created based on the first authentication list may comprise one or more MAC addresses of the one or more ports of the at least one network entity (i.e., the first network entity) and one or more MAC addresses of the one or more ports of the one or more network entities in the first authentication list that has the role of the supplicant. For example, FIG. 11A illustrates an example of a trust list for Network Entity A, wherein the trust list is created (e.g., created by the at least one network entity, created by the hub, etc.) based on an authentication list of the Network Entity A (e.g., authentication list 730 in FIG. 7), according to one or more embodiments.

As shown in FIG. 11A, the trust list for the Network Entity A specifies MAC addresses M5 and M4 (i.e., MAC addresses of ports SuP5 and AuP4 of Network Entity A, respectively). Further, since the port of Network Entity Y (which is in the authentication list of Network Entity A) that has a role of a supplicant (i.e., SuP11) is authenticated with port AuP4 of Network Entity A, the trust list for Network Entity A specifies MAC address M11 of said port SuP11 of the Network Entity Y and specifies that the trust level between the port SuP11 and the port AuP4 of Network Entity A is a direct trust. On the other hand, since the port of Network Entity M (which is in the authentication list of Network Entity A) that has a role of a supplicant (i.e., SuP2) is authenticated with port SuP5 of Network Entity A via port AuP3 of Network Entity M, the trust list for Network Entity A specifies MAC address M2 of said port SuP2 and specifies that the trust level between said port SuP2 of Network Entity M and the port SuP5 of Network Entity A is an indirect trust. In this regard, since the trust list in FIG. 11A is created based on the authentication list of Network Entity A, said trust list may be referred to as "entity-level trust list" herein, and the table included in the trust list may be referred to as "entity-level trust table" herein.

Upon creating the authentication list and/or the trust list, said authentication list/trust list may be shared or advertised to one or more network entities in the network. For instance, the created authentication list and/or the trust list may be shared by the at least one network entity to another network entity(s) in a peer-to-peer configuration or may be shared by the hub to one or more network entity(s) in a hub-and-spoke configuration.

According to embodiments, upon creating the trust list, the at least one network entity/the hub may be configured to periodically (or continuously) update the trust list. For instance, upon performing operation S1010, the method 1000 may further proceed to operation S1020, at which the at least one network entity/the hub may be configured to update the first authentication list to include the second authentication list in response to receiving the second authentication list.

For example, FIG. 11B illustrates an example of an updated authentication list for Network Entity A, according to one or more embodiments. As shown in FIG. 11B, the authentication list for Network Entity A is updated (from authentication list 730 in FIG. 7) to include information of the authentication list for Network Entity M (i.e., authentication list 710 in FIG. 7). In this regard, since the authentication list in FIG. 11B is an authentication list that includes information consolidated from a plurality of authentication lists, and each of the plurality of authentication list is associated with one of a plurality of network entities in the network, said authentication list may be referred to as "network-level authentication list" herein, and the table included in the authentication list may be referred to as "network-level authentication table" herein.

Upon updating the authentication list, the method 1000 may further proceed to operation S1030, at which the at least one network entity/the hub may be configured to update, based on the updated authentication list, the trust list of the network entity associated with the updated authentication list. For instance, the at least one network entity/the hub may update the trust list, based on the updated first authentication list, to further specify a trust level between the at least one network entity (i.e., the first network entity) and the one or more network entities in the second authentication list. According to embodiments, the trust level may be one of direct trust and indirect trust between one or more ports of the at least one network entity (i.e., the first network entity) and one or more ports of the one or more network entities in the second authentication list (which is now included in the updated first authentication list) that have a role of a supplicant. According to embodiments, the updated trust list may comprise one or more MAC addresses of the one or more ports of the at least one network entity (i.e., the first network entity) and one or more MAC addresses of the one or more ports of the one or more network entities in the second authentication list that has the role of the supplicant.

For example, referring to FIG. 11C, which illustrates an example of an updated trust list for Network Entity A, according to one or more embodiments. Specifically, since the port of Network Entity X (which is in the authentication list of Network Entity M that is now included in the updated authentication list of Network Entity A) that has a role of a supplicant (i.e., SuP12) is authenticated with port SuP5 of Network Entity A via ports AuP1 and AuP3 of Network Entity M, the updated trust list for Network Entity A further specifies MAC address M12 of said port SuP12 and specifies that the trust level between port SuP12 of Network Entity X and port SuP5 of Network Entity A is an indirect trust. Similarly, since the port of Network Entity N (which is in the authentication list of Network Entity M that is now included in the updated authentication list of Network Entity A) that has a role of a supplicant (i.e., SuP7) is authenticated with port SuP5 of Network Entity A via ports AuP6 of Network Entity N and ports SuP2 and AuP3 of Network Entity M, the updated trust list for Network Entity A further specifies MAC address M7 of said port SuP7 and specifies that the trust level between port SuP7 of Network Entity N and port SuP5 of Network Entity A is an indirect trust. In this regard, since the trust list in FIG. 11C is created based on the updated authentication list of Network Entity A (i.e., an authentication list that includes information consolidated from a plurality of authentication lists, and each of the plurality of authentication lists is associated with one of a plurality of network entities in the network), said trust list may be referred to as "network-level trust list" herein, and the table included in the trust list may be referred to as "network-level trust table" herein It may be understood that, in some implementations, one or more ports of Network Entity A that are in the authentication list of Network Entity M (that is now included in the updated authentication list of Network Entity A) may be included/excluded in one or more of the above processes.

Upon updating the authentication list and/or the trust list, the updated authentication list and/or the updated trust list may be shared or advertised to one or more network entities in the network. For instance, the updated authentication list and/or the updated trust list may be shared by the at least one network entity with another network entity(s) in the peer-to-peer configuration or may be shared by the hub to one or more network entity(s) in the hub-and-spoke configuration. By way of example, in the peer-to-peer configuration, the updated first authentication list may be transmitted to one or more network entities that are authenticated with at least one network entity (i.e., the first network entity), and accordingly, a second authentication list that is received may also further specify one or more network entities that are authenticated with a third network entity that is authenticated with the second network entity.

According to embodiments, upon performing operation S1030, the method 1000 may be ended or be terminated. Alternatively, method 1000 may return to operation S1020, such that the at least one network entity/the hub may be configured to repeatedly (e.g., periodically, continuously, etc.) perform, for at least a predetermined amount of time, the updating the first authentication list (at operation S1020) and the updating the trust list (at operation S1030), until each of the plurality of network entities have a comprehensive view of all the authenticated network entities within the network.

For example, in the peer-to-peer configuration, after the authentication list for Network Entity A is updated to include the authentication list for Network Entity M and the trust list for Network Entity A is updated based on the updated authentication list as described above, Network Entity M may receive an authentication list for Network Entity N from Network Entity N (which specify Network Entity O that is authenticated with Network Entity N). The authentication list for Network Entity M may then be updated to include the authentication list for Network Entity N (such that the authentication list for Network Entity M now specifies Network Entity O) and the trust list for Network Entity M is updated based on the updated authentication list in the similar manner as described above. Subsequently, Network Entity M may then transmit its updated authentication list to Network Entity A again, where the process is repeated and the authentication list and the trust list for Network Entity A are updated to now also specify Network Entity O. The above process may be repeated until each of the plurality of network entities have an up-to-date comprehensive view of all the authenticated network entities within the network.

In a similar manner, example embodiments allow an O-RU controller (e.g., an O-DU, an SMO, etc.) and an O-RU to establish a trust level between each other. For instance, the O-RU controller and the O-RU may establish an indirect trust between each other, and a channel binding may be established thereafter, even though the O-RU controller and the O-RU are not directly authenticated with each other. Example operations associated therewith are described below with reference to FIG. 20 to FIG. 28C.

It can be understood that the descriptions provided above with reference to FIG. 5 to FIG. 11C are merely descriptions of examples from possible embodiments, and the scope of the present disclosure should not be limited thereto. Specifically, the authentication lists and/or the trust lists illustrated in FIG. 7 and FIGS. 11A-11C may include more/fewer information than illustrated, and/or the information may be presented in any other suitable forms different from a table-form, without departing from the scope of the present disclosure. Similarly, the number of network entities in the system can be any number, the number of ports in each of the plurality of network entities can be any number, each of the plurality of network entities may be authenticated with any other network entities, and the like.

Example Operations: Advertising Information of Authenticated Network Entities

As described above, one or more network entities may be configured to share or advertise information of authenticated network entities, according to one or more embodiments. For instance, a network entity may advertise information of one or more authenticated network entities (e.g., authenticated supplicants, etc.) with another network entity(s) in a peer-to-peer configuration. Further, in a hub-and-spoke configuration, the network entity may advertise said information to a hub, and the hub may be configured to advertise said information to another network entity(s) accordingly. Example operations associated therewith are described below with reference to FIG. 12 to FIG. 19C.

Figure 12:
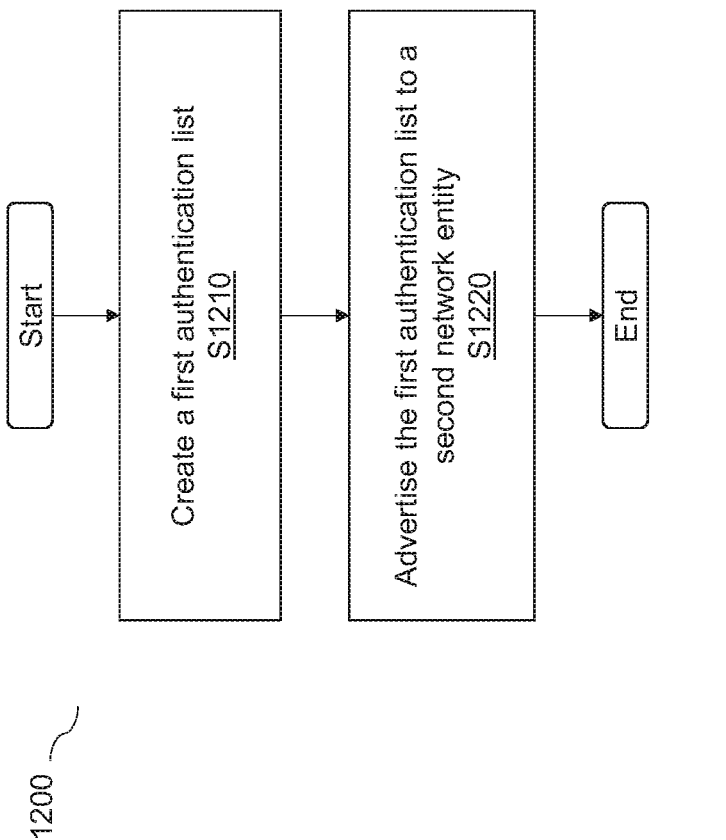
FIG. 12 illustrates a flow diagram of an example method for advertising authenticated network entities in a peer-to-peer configuration, according to one or more embodiments.

FIG. 12 illustrates a flow diagram of an example method 1200 for advertising authenticated network entities in a peer-to-peer configuration, according to one or more embodiments. One or more operations in method 1200 may be performed by at least one processor (e.g., processor 420) of at least one network entity (i.e., the first network entity) of the plurality of network entities in the system. It can be understood that said one or more operations may also be performed by a system including the at least one network entity, by a system including at least one processor, and the like, without departing from the scope of the present disclosure.

As illustrated in FIG. 12, at operation S1210, the at least one network entity may be configured to create a first authentication list. This operation may be similar to operation S510 in the method 500, and thus, redundant descriptions associated therewith may be omitted below for conciseness.

Upon creating the first authentication list at operation S1210, the method 1200 may proceed to operation S1220, at which the at least one network entity (i.e., the first network entity) may be configured to advertise the first authentication list to a second network entity. For instance, the at least one network entity may advertise the first authentication list to a second agent (e.g., agent 350B) deployed in the second network entity. According to embodiments, the at least one network entity and the second network entity may be authenticated with each other. For example, referring to FIG. 6 and FIG. 7, at operation S1220, Network Entity A (i.e., component 620 in FIG. 6) may be configured to advertise the authentication list 730 (i.e., authentication list for the Network Entity A) to an agent deployed in Network Entity M (i.e., component 610 in FIG. 6) which is authenticated with the Network Entity A.

According to embodiments, the creating of the first authentication list may be performed by a first agent (e.g., agent 350A) that is deployed in the at least one network entity, and the advertising of the first authentication list may be performed via an advertising interface by the first agent.

According to embodiments, the advertising interface may include an interface such as a Representational State Transfer (REST) API. According to embodiments, the first agent may be mutually authenticated with the second agent.

Upon performing operation S1220, the method 1200 may be ended or be terminated. Alternatively, the at least one network entity may be configured to repeatedly (e.g., periodically, continuously, etc.) perform, for at least a predetermined amount of time, the advertising the first authentication list (at operation S1220). For instance, the at least one network entity may update the first authentication list in response to a change in the network, and may then restart the advertising the first authentication list.

Figure 13:
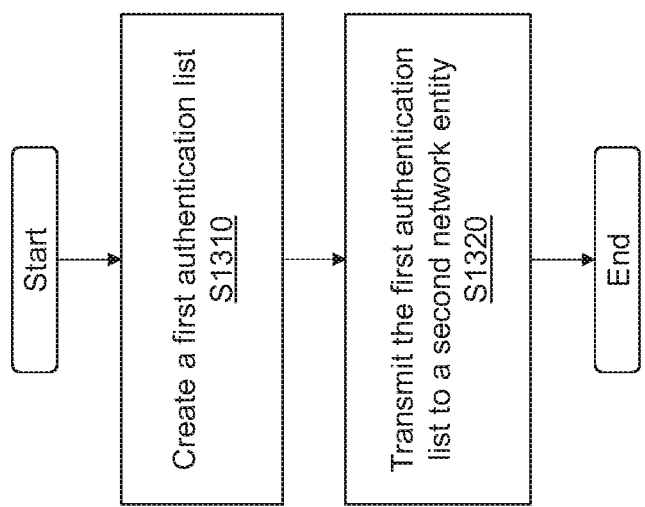
FIG. 13 illustrates a flow diagram of an example method for advertising an authentication list in a peer-to-peer configuration, according to one or more embodiments.

FIG. 13 illustrates a flow diagram of an example method 1300 for advertising an authentication list in a peer-to-peer configuration, according to one or more embodiments. One or more operations of method 1300 may be similar to operations S1210 and S1220 in method 1200, and may be performed by at least one processor (e.g., processor 420) of at least one network entity (i.e., the first network entity) of the plurality of network entities in the system. It can be understood that said one or more operations may also be performed by a system including the at least one network entity, by a system including at least one processor, and the like, without departing from the scope of the present disclosure.

As illustrated in FIG. 13, at operation S1310, the at least one network entity may be configured to create a first authentication list, in the similar manner as described above in relation to operation S510 in the method 500.

Upon performing operation S1310, the method 1300 may then proceed to operation S1320, at which the at least one network entity may be configured to transmit the first authentication list to a second network entity. According to embodiments, the at least one network entity may transmit the first authentication list to a second agent deployed in the second network entity. The at least one network entity (i.e., the first network entity) and the second network entity may be authenticated with each other.

For example, referring to FIG. 6 and FIG. 7, at operation S1320, Network Entity A (i.e., component 620 in FIG. 6) may be configured to transmit the associated authentication list (i.e., authentication list 730 in FIG. 7) to an agent deployed in Network Entity M (i.e., component 610 in FIG. 6) which is authenticated with the Network Entity A.

According to embodiments, the at least one network entity may be configured to transmit the first authentication list to the second agent, in response to receiving a request to transmit the first authentication list from the second agent. Similarly, the at least one network entity may be configured to transmit a request to receive an authentication list from the second agent.

According to embodiments, the creating of the first authentication list may be performed by a first agent that is deployed in the at least one network entity, and the transmitting of the first authentication list may be performed via an advertising interface by the first agent. According to embodiments, the advertising interface may include an interface such as a REST API. According to embodiments, the first agent may be mutually authenticated with the second agent.

Upon performing operation S1320, the method 1300 may be ended or be terminated. Alternatively, the at least one network entity may be configured to repeatedly (e.g., periodically, continuously, etc.) perform, for at least a predetermined amount of time, the transmitting the first authentication list. For instance, the at least one network entity may update the first authentication list in response to a change in the network, and may then restart the transmitting the first authentication list.

Examples of operations for updating an authentication list and advertising the updated authentication list in a peer-to-peer configuration are described below with reference to FIG. 14A and FIG. 14B.

Figure 14B:
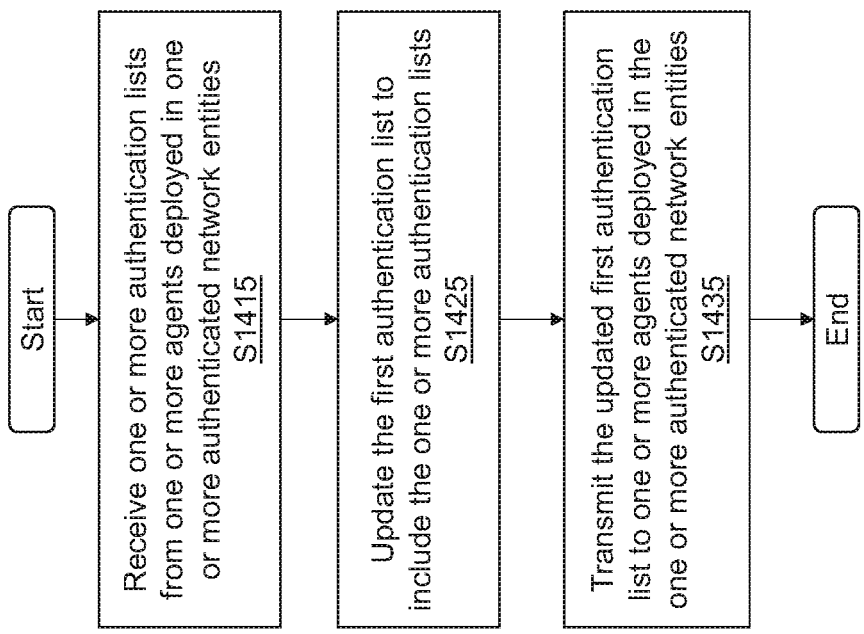
FIG. 14B illustrates a flow diagram of an example method for updating an authentication list in response to receiving another authentication list from a network entity in a peer-to-peer configuration, according to one or more embodiments.
Figure 14A:
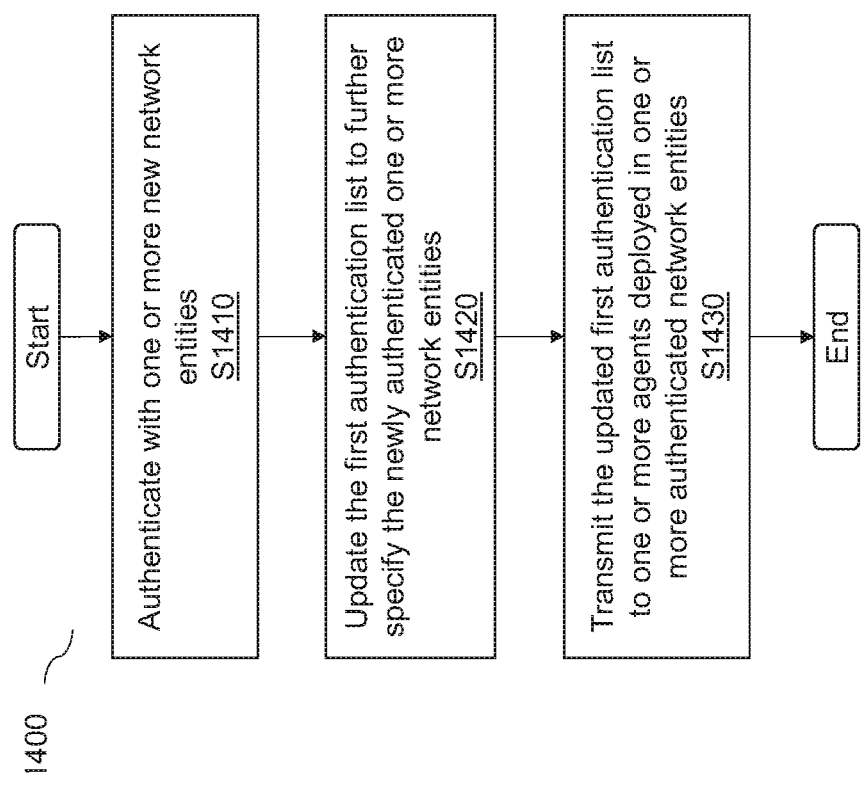
FIG. 14A illustrates a flow diagram of an example method for updating an authentication list, according to one or more embodiments.

FIG. 14A illustrates a flow diagram of an example method 1400 for updating an authentication list, according to one or more embodiments. One or more operations in method 1400 may be performed by the at least one processor (e.g., processor 420) of at least one network entity (i.e., the first network entity) of the plurality of network entities in the system, in response to a newly authenticated network entity in a peer-to-peer configuration after the first authentication list is created. It can be understood that said one or more operations may also be performed by a system including the at least one network entity, by a system including at least one processor, and the like, without departing from the scope of the present disclosure.

As illustrated in FIG. 14A, at operation S1410, the at least one network entity may be configured to authenticate with one or more new network entities. According to embodiments, the newly authenticated one or more network entities may include one or more network entities that are authenticated with the at least one network entity after the first authentication list is created, and that are not indicated in the first authentication list.

For example, referring to FIG. 6 and FIG. 7, after the Network Entity A (i.e., component 620 in FIG. 6) created the associated authentication list (i.e., authentication list 730 in FIG. 7) specifying port SuP11 (with the MAC address of M11) of Network Entity Y, the Network Entity A may be newly authenticated with Network Entity M (which is not yet indicated or specified in the in the authentication list 730) at operation S1410.

In this case, the method 1400 may proceed to operation S1420, at which the at least one network entity may be configured to update the first authentication list to further specify the newly authenticated one or more network entities. For example, referring to FIG. 6 and FIG. 7, after the Network Entity A is newly authenticated with the Network Entity M, the Network Entity A may be configured to update the associated authentication list (i.e., authentication list 730 in FIG. 7) to further specify the Network Entity M. By way of example, the Network Entity A may update the associated authentication list by adding a new row to specify port AuP3 (with the MAC address of M3) of Network Entity M in the authentication list 730 along with the corresponding port SuP5 (with the MAC address of M5) of Network Entity A.

Accordingly, the method 1400 may proceed to operation S1430, at which the at least one network entity may be configured to transmit the updated first authentication list to one or more agents deployed in the one or more authenticated network entities (i.e., one or more network entities that are authenticated with the at least one network entity). For example, upon updating its authentication list, the Network Entity A may be configured to transmit its updated authentication list to an agent deployed in the Network Entity Y (i.e., network entity previously authenticated with the Network Entity A) and to an agent deployed in the Network Entity M (i.e., network entity newly authenticated with the Network Entity A).

Upon performing operation S1430, the method 1400 may be ended or be terminated. Alternatively, method 1400 may return to operation S1410, such that the at least one network entity may be configured to repeatedly (e.g., periodically, continuously, etc.) perform, for at least a predetermined amount of time, the authenticating of one or more network entities (at operation S1410), the updating the first authentication list (at operation S1420), and the transmitting the updated first authentication list (at operation S1430). For instance, the at least one network entity may continue to find more network entities to authenticate with, and may then restart the operations S1410 to S1430.

FIG. 14B illustrates a flow diagram of an example method 1405 for updating an authentication list in response to receiving another authentication list from a network entity in a peer-to-peer configuration, according to one or more embodiments. One or more operations in method 1405 may be performed after the first authentication list is created, and may be performed by at least one processor (e.g., processor 420) of at least one network entity (i.e., the first network entity) of the plurality of network entities in the system. It can be understood that said one or more operations may also be performed by a system including the at least one network entity, by a system including at least one processor, and the like, without departing from the scope of the present disclosure.

As illustrated in FIG. 14B, at operation S1415, the at least one network entity may be configured to receive one or more authentication lists from one or more agents deployed in one or more authenticated network entities (i.e., one or more network entities that are authenticated with the at least one network entity). It may be understood that the one or more authentication lists may be created by the respective one or more agents in the similar manner as described above. For instance, at operation S1415, the at least one network entity may be configured to receive a second authentication list from a second agent deployed in a second network entity, wherein the second network entity is authenticated with the at least one network entity (i.e., the first network entity). According to embodiments, the second authentication list may specify one or more network entities that are authenticated with the second network entity in the similar manner as the first authentication list. For example, referring to FIG. 6 and FIG. 7, the Network Entity A (i.e., component 620 in FIG. 6) may be configured to receive an authentication list for Network Entity M (i.e., authentication list 710 in FIG. 7) from an agent deployed in the Network Entity M (i.e., component 610 in FIG. 6).

Upon performing operation S1415, the method 1405 may then proceed to operation S1425, at which the at least one network entity may be configured to update the first authentication list to include the one or more authentication lists. For example, referring to FIG. 6 and FIG. 7, at operation S1415, the Network Entity A (i.e., component 620 in FIG. 6) may be configured to update its authentication list (i.e., authentication list 730 in FIG. 7) to include rows for specifying ports AuP1, AuP3, and SuP2 in the authentication list of Network Entity M (e.g., authentication list 710 in FIG. 7).

Upon performing the operation S1425, the method 1405 may then proceed to operation S1435, at which the at least one network entity may be configured to transmit the updated first authentication list to one or more agents deployed in the one or more authenticated network entities (i.e., one or more network entities that are authenticated with the at least one network entity). For example, the Network Entity A may be configured to transmit its updated authentication list (which further includes the information of ports AuP1, AuP3, and SuP2 of the Network Entity M) to an agent deployed in Network Entity Y and to an agent deployed in Network Entity M, wherein Network Entity Y and Network Entity M are authenticated with Network Entity A.

Upon performing operation S1435, the method 1405 may be ended or be terminated. Alternatively, method 1405 may return to operation S1415, such that the at least one network entity may be configured to repeatedly (e.g., periodically, continuously, etc.) perform, for at least a predetermined amount of time, the receiving the one or more authentication lists (at operation S1415), the updating the first authentication list (at operation S1425), and the transmitting the updated first authentication list (at operation S1435). For instance, the at least one network entity may continue to receive more authentication lists, and may then restart the operations S1415 to S1435.

According to embodiments, the at least one network entity may be configured to transmit a notification to the one or more agents to indicate a change in the network. For example, the at least one network entity may be configured to transmit a notification that the at least one network entity is newly authenticated with a network entity, that the first authentication list has been updated, and the like. According to embodiments, the at least one network entity may be configured to transmit the updated first authentication list to the one or more agents, in response to receiving a request to transmit the updated first authentication list from the one or more agents. Similarly, the at least one network entity may be configured to receive a notification from the one or more agents, and transmit a request to receive an updated authentication list from the one or more agents.

According to embodiments, the receiving of the one or more authentication lists, the updating of the first authentication list, and the transmitting of the updated first authentication list may be performed by a first agent that is deployed in the at least one network entity. According to embodiments, the transmitting of the updated first authentication list as well as the transmitting and receiving of notifications and requests may be performed via an advertising interface. According to embodiments, the advertising interface may include an interface such as a REST API. According to embodiments, the first agent may be mutually authenticated with the one or more agents deployed in the one or more network entities that are authenticated with the first network entity.

In view of the above, the example embodiments allow the agents of the network entities to be readily informed of any changes to the network and allow the agents to always have the most recent information of the authentication network entities (e.g., always receive the latest version of the authentication list, etc.).

In the following, descriptions of an example use case for advertising authenticated network entities in a peer-to-peer configuration, according to one or more embodiments, are provided.

Figure 15A:
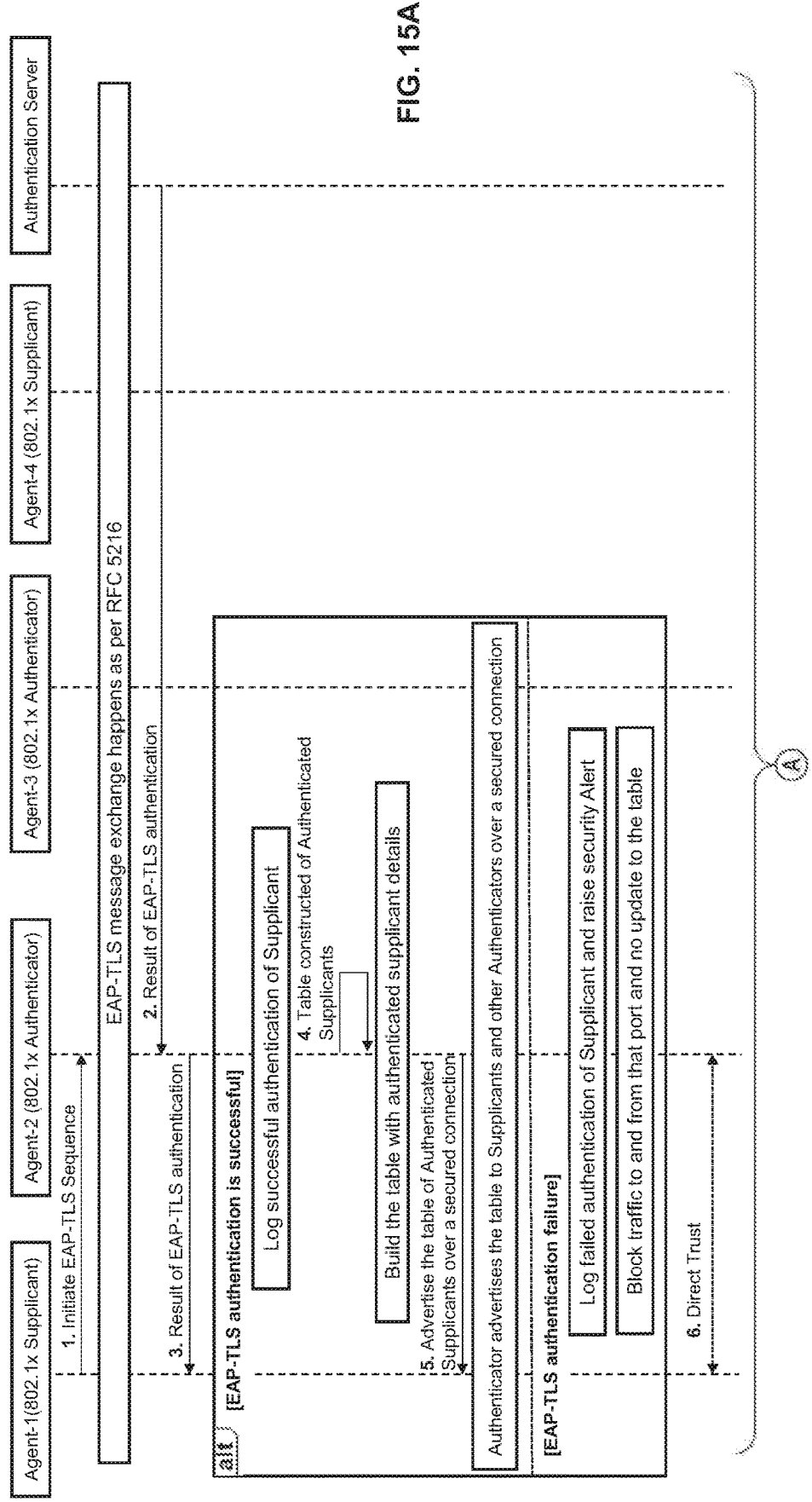
FIGS. 15A to 15C illustrate an example flow sequence of an example use case for advertising authenticated network entities in a peer-to-peer configuration, according to one or more embodiments.
Figure 15B:
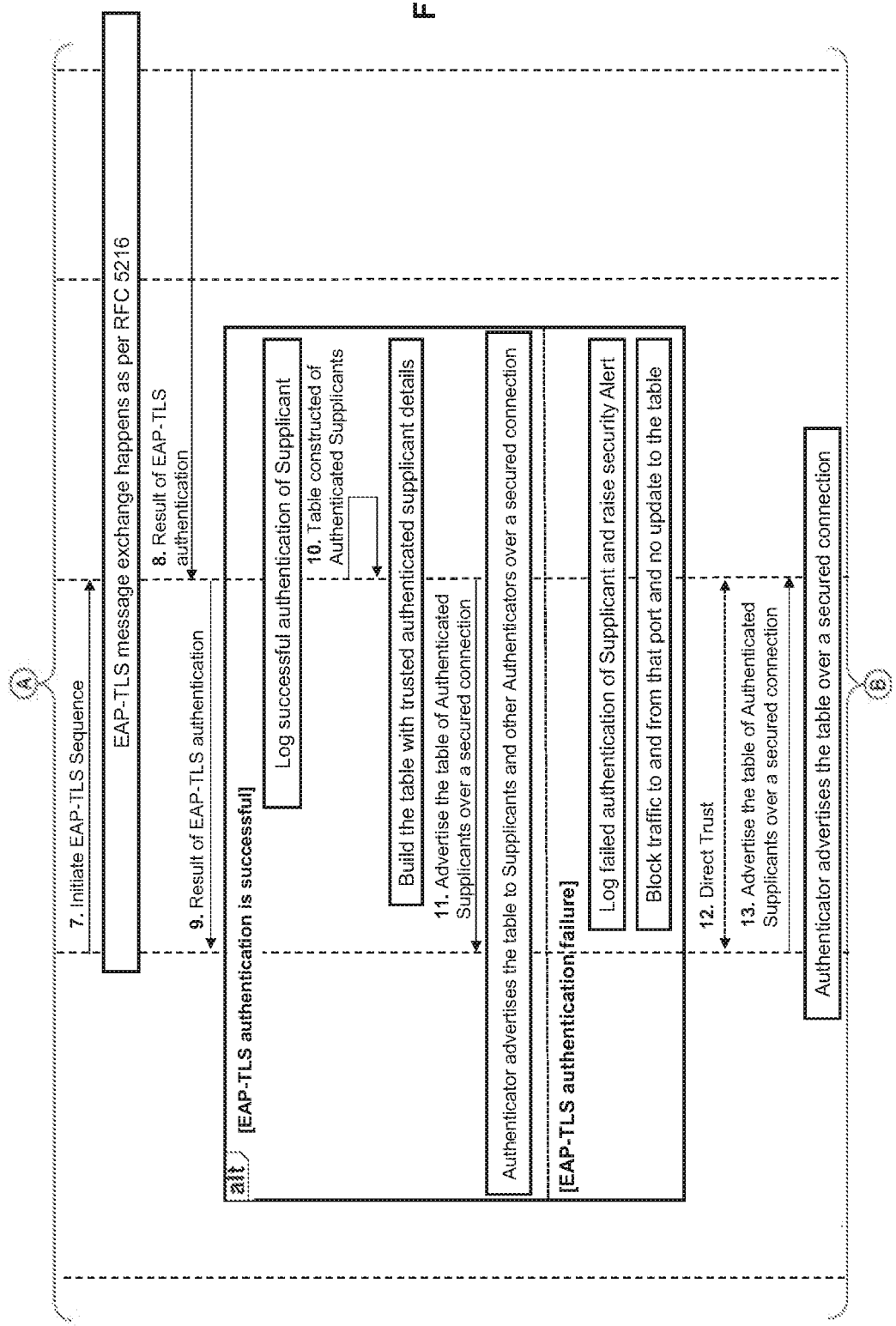
Figure 15C:
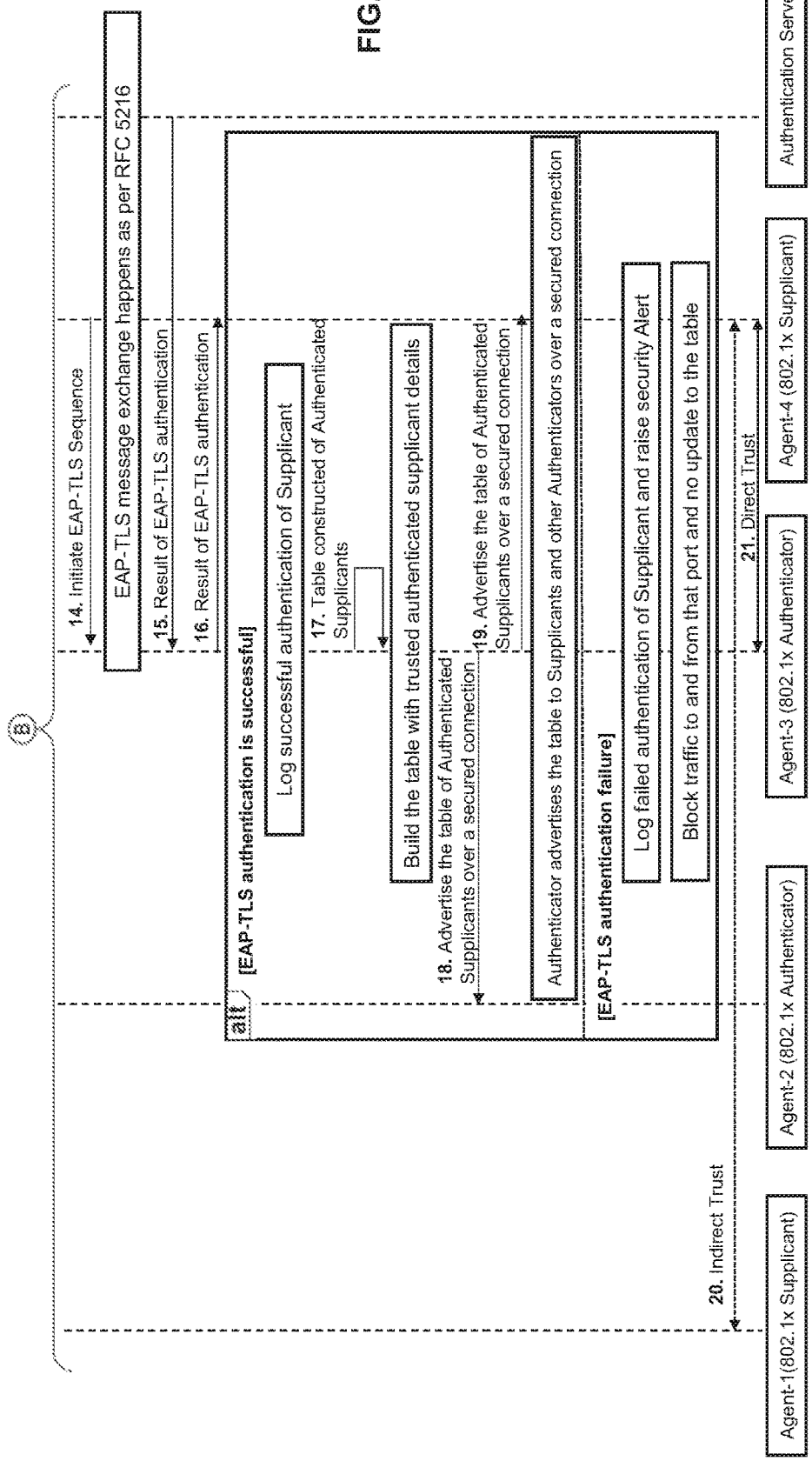

FIGS. 15A to 15C illustrate an example flow sequence of an example use case for advertising authenticated network entities in a peer-to-peer configuration, according to one or more embodiments. The example flow sequence illustrated in FIGS. 15A to 15C involves processes explained above in relation to methods 1200, 1300, 1400, and 1405, and is split into 3 parts for clarity.

As shown in FIGS. 15A to 15C, the network includes 4 network entities deploying 4 agents (i.e., Agent 1, Agent 2, Agent 3, and Agent 4) and an Authentication Server.

During steps 1 to 3, Network Entity 1 (in which the Agent 1 is deployed) may perform authentication with Network Entity 2 (in which the Agent 2 is deployed). According to embodiments, the Network Entity 1 may perform authentication with the Network Entity 2 via an 802.1x process (i.e., an authentication process in accordance with RFC 5216 EAP-TLS Authentication Protocol of IEEE 802.1x). If the authentication is successful, the sequence proceeds to step 4. On the other hand, if the authentication is not successful, the Network Entity 2 may raise a security alert and may block data traffic to and from the Network Entity 1.

During steps 4 to 5, the Network Entity 2 may create/update an authentication list and may advertise the authentication list to the Network Entity 1 over a secured connection.

During step 6, the Network Entity 2 may form a direct trust with the Network Entity 1. For example, once the authentication list of the Network Entity 2 is received by the Network Entity 1, the Network Entity 1 may be configured to create/update a trust list that specifies that a trust level between the Network Entity 2 and the Network Entity 1 is a direct trust.

During steps 7 to 12, the Network Entity 3 (in which the Agent 3 is deployed) may perform authentication with the Network Entity 2, may create/update an authentication list, may advertise the authentication list to the Network Entity 2, and may form a direct trust with the Network Entity 2, in the similar manner as described above in relation to steps 1 to 6.

During step 13, the Network Entity 2 may advertise its authentication list to the Network Entity 3. In particular, since the Network Entity 2 is newly authenticated with the Network Entity 3 and has received an authentication list from the Network Entity 3, the Network Entity 2 may update its authentication list to include the authentication list received from the Network Entity 3, and may advertise its updated authentication list to the Network Entity 3. Similarly, the Network Entity 3 may update its authentication list to include the authentication list received from the Network Entity 2.

During steps 14 to 16, the Network Entity 3 may perform authentication with the Network Entity 4 (in which the Agent 4 is deployed), in the similar manner as described above in relation to steps 1 to 3.

During step 17, the Network Entity 3 may update its authentication list to further specify the newly authenticated Network Entity 4.

During steps 18 to 19, the Network Entity 3 may advertise its updated authentication list to the Network Entity 2 and the Network Entity 4.

During step 20, the Network Entity 4 may form an indirect trust with the Network Entity 1. For example, since the Network Entity 1 is specified in the authentication list of the Network Entity 2, which is advertised to the Network Entity 3 (at step 13), and since the Network Entity 3 updated its authentication list to include the authentication list of the Network Entity 2 and advertised it to the Network Entity 4 (at step 19), the Network Entity 4 may update its authentication list to include the authentication list of Network Entity 3 (which specifies the Network Entity 1). As such, the Network Entity 4 may be configured to create/update a trust list that specifies that a trust level between the Network Entity 4 and the Network Entity 1 is an indirect trust, based on the updated authentication list of Network Entity 4.

During step 21, the Network Entity 4 may form a direct trust with the Network Entity 3, in the similar manner as described above in relation to step 6.

To this end, example embodiments of the present disclosure enable a network entity to advertise information of authenticated network entities in a peer-to-peer configuration. In this way, each network entity in the open fronthaul network may obtain comprehensive information of other authenticated network entities in the network and may receive real-time updates.

In addition to or in alternative to the peer-to-peer configuration, the network entity may also advertise the information of the authenticated network entities in a hub-and-spoke configuration. In the following, several example operations for advertising the information of one or more authenticated network entities in the hub-and-spoke configuration, according to one or more embodiments, are described with reference to FIG. 16 to FIG. 19C.

Figure 16:
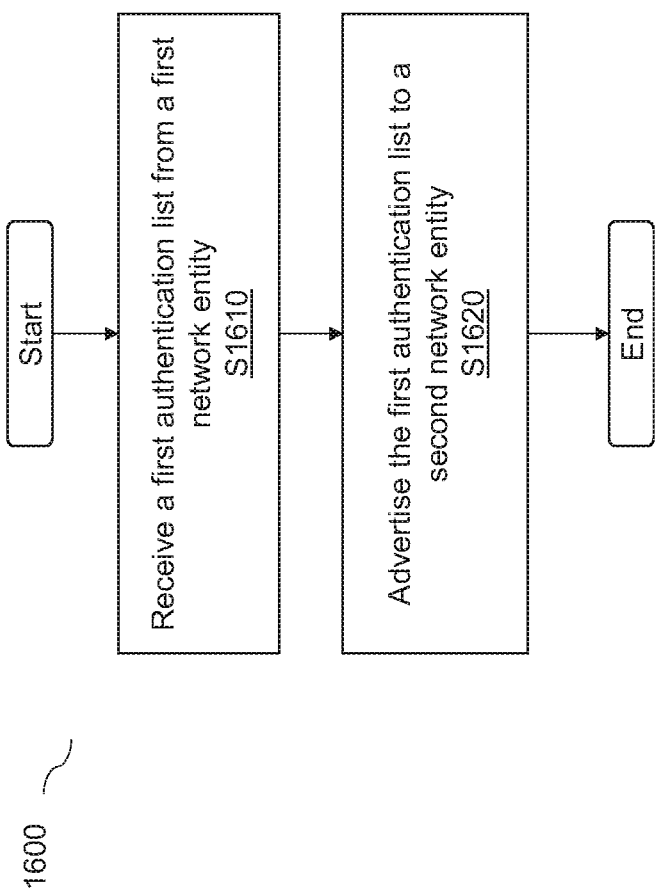
FIG. 16 illustrates a flow diagram of an example method for advertising authenticated network entities in a hub-and-spoke configuration, according to one or more embodiments.

FIG. 16 illustrates a flow diagram of an example method 1600 for advertising authenticated network entities in a hub-and-spoke configuration, according to one or more embodiments. One or more operations in method 1600 may be performed by at least one processor (e.g., processor 420) of a hub communicatively coupled to the plurality of network entities in the system. It can be understood that said one or more operations may also be performed by a system including the hub, by a system including at least one processor, and the like, without departing from the scope of the present disclosure.

As illustrated in FIG. 16, at operation S1610, the hub may be configured to receive a first authentication list from a first network entity. According to embodiments, the hub may be configured to receive the first authentication from a first agent deployed in the first network entity. The first authentication list may be similar to the first authentication list described above and may be created by the first agent in the similar manner as described above in relation to the peer-to-peer configuration. For example, referring to FIG. 7 and FIG. 9, at operation S1610, the hub 990 may be configured to receive the authentication list 730 (i.e., authentication of Network Entity A) from Network Entity A (i.e., component 920 in FIG. 9). In some implementations, the hub 990 may be configured to receive the authentication list 730 from an agent deployed in Network Entity A.

Upon receiving the first authentication list, the method 1600 may then proceed to operation S1620, at which the hub may be configured to advertise the first authentication list to a second network entity. According to embodiments, the hub may be configured to advertise the first authentication list to a second agent deployed in the second network entity in accordance with a subscription model, such as a Push and Pull Model and a Subscription Notify Model. Examples of operations for advertising an authentication list in accordance with a Push and Pull Model in a hub-and-spoke configuration are described below with reference to FIG. 17, and examples of operations for advertising an authentication list in accordance with a Subscription Notify Model in a hub-and-spoke configuration are described below with reference to FIG. 18. According to embodiments, the first network entity and the second network entity may be authenticated with each other.

For example, referring to FIG. 7 and FIG. 9, upon receiving the authentication list 730 from the Network Entity A (i.e., component 920 in FIG. 9), the hub 990 may be configured to advertise the authentication list 730 to Network Entity M (i.e., component 910 in FIG. 9) which is authenticated with the Network Entity A. In some implementations, the hub 990 may be configured to advertise the authentication list 730 to an agent deployed in the Network Entity M.

According to embodiments, the advertising of the first authentication list may be performed via an advertising interface. According to embodiments, the advertising interface may include an interface such as a REST API. According to embodiments, the first agent and the second agent may be mutually authenticated with the hub.

Upon performing operation S1620, the method 1600 may be ended or be terminated. Alternatively, the hub may be configured to repeatedly (e.g., periodically, continuously, etc.) perform, for at least a predetermined amount of time, the advertising the first authentication list (at operation S1620). For instance, the hub may update the first authentication list in response to a change in the network, and may then restart the advertising the first authentication list.

Figure 17:
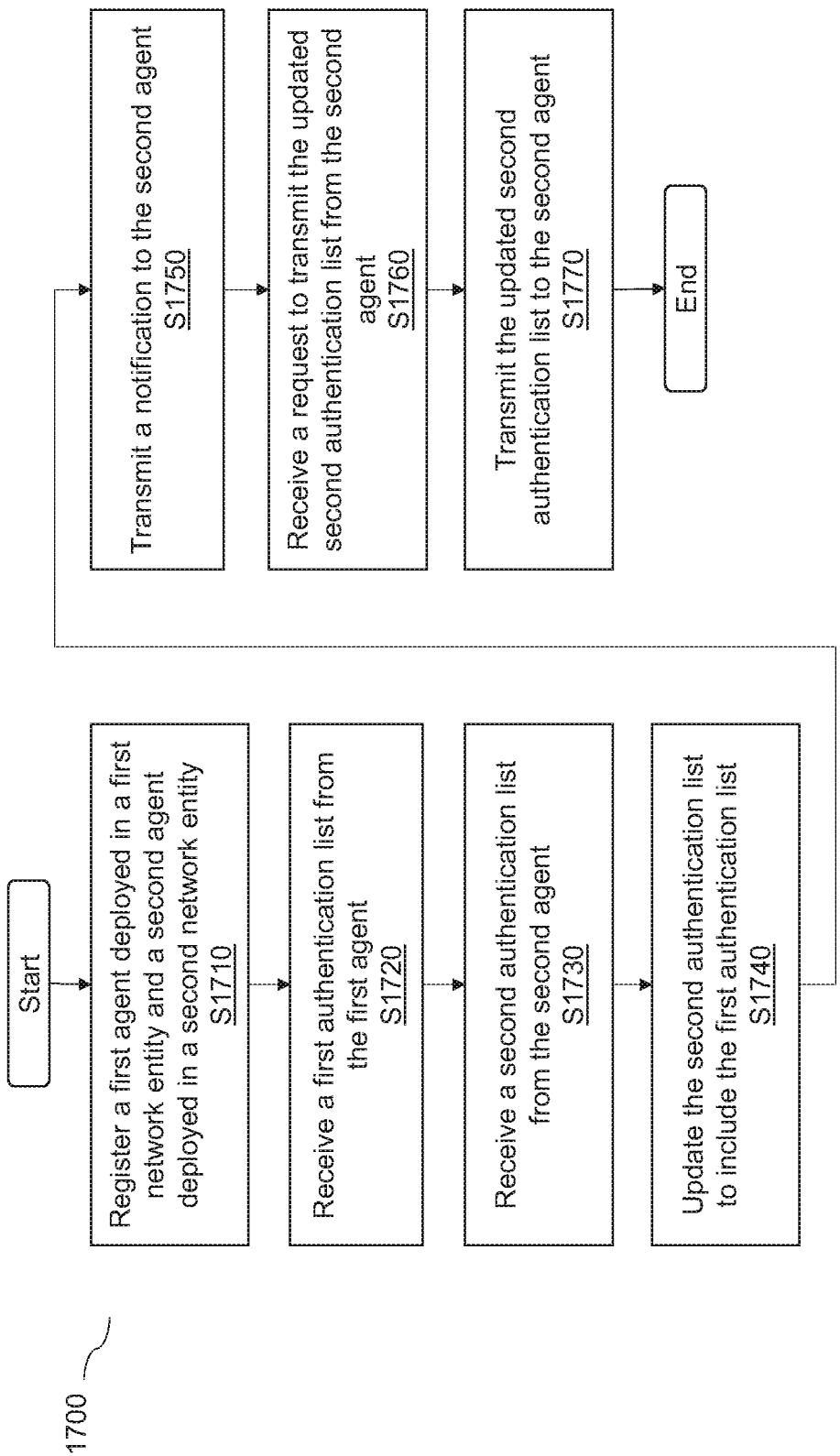
FIG. 17 illustrates a flow diagram of an example method for advertising an authentication list in accordance with a Push and Pull Model in a hub-and-spoke configuration, according to one or more embodiments.

FIG. 17 illustrates a flow diagram of an example method 1700 for advertising an authentication list in accordance with a Push and Pull Model in a hub-and-spoke configuration, according to one or more embodiments. One or more operations of method 1700 may be part of operation S1610 and S1620 in method 1600 and may be performed by at least one processor (e.g., processor 420) of the hub communicatively coupled to the plurality of network entities in the system. It can be understood that said one or more operations may also be performed by a system including the hub, by a system including at least one processor, and the like, without departing from the scope of the present disclosure.

As illustrated in FIG. 17, at operation S1710, the hub may be configured to register a first agent deployed in a first network entity and a second agent deployed in a second network entity. According to embodiments, the hub may be configured to register the first agent and the second agent under the Push and Pull Model.

For example, the first agent and the second agent may be configured to register to an API function for the Push and Pull Model during bootstrapping, where an account and API keys will be confirmed by the API function and will be used for all API requests. The first agent and the second agent may then initiate a REST API POST request to subscribe to the Push and Pull Model, as well as provide information such as the API key, the channel name for subscription, and any additional parameters needed for the function.

Upon performing operation S1710, the method 1700 may then proceed to operation S1720, at which the hub may be configured to receive a first authentication list from the first agent, in the similar manner as described above in relation to operation S1610. For example, referring to FIG. 9, the hub 990 may be configured to receive the authentication list of the Network Entity A (e.g., component 920 in FIG. 9) from an agent deployed in the Network Entity A.

Subsequently, the method 1700 may proceed to operation S1730, at which the hub may be configured to receive a second authentication list from the second agent. For example, referring to FIG. 9, the hub 990 may be configured to receive the authentication list of the Network Entity M (e.g., component 910 in FIG. 9) from an agent deployed in the Network Entity M. According to embodiments, the first network entity and the second network entity (in which the first agent and the second agent are deployed, respectively) may be authenticated with each other. It may be understood that the second authentication list may be created by the second agent in the similar manner as described above for the first agent in the peer-to-peer configuration.

The method 1700 may then proceed to operation S1740, at which the hub may be configured to update the second authentication list to include the first authentication list. For example, referring to FIG. 9, the hub 990 may be configured to update the authentication list of the Network Entity M to include the authentication list of the Network Entity A, in the similar manner as described above in relation to operation S1425 in method 1405.

Subsequently, the method 1700 may proceed to operation S1750, at which the hub may be configured to transmit a notification to the second agent. According to embodiments, the notification may notify the second agent regarding a change in the network. For example, the notification may specify that the first network entity is newly deployed in the network, that the first authentication list is received, that the second authentication list has been updated, and the like.

According to embodiments, the event tracker (e.g., component 344 in FIG. 3B) of the hub may be configured to monitor the data stored in the hub (e.g., data stored in the data store of the hub), track the data received from and transmitted to the agent(s), and detect a change in the stored data (e.g., detect that the first authentication list is received from the first agent, that an updated first authentication list is received from the first agent, that the second authentication list has been updated, etc.). Subsequently, the event tracker may inform the data store of the hub regarding the change, and utilize the notification mechanism/function (e.g., component 343 in FIG. 3B) of the hub to transmit the notification to the agent(s).

Accordingly, the method 1700 may then proceed to operation S1760, at which the hub may be configured to receive a request to transmit the updated second authentication list from the second agent. According to embodiments, the second agent may be configured to transmit the request in response to receiving the notification and/or periodically.

Upon receiving the request at operation S1760, the method 1700 may then proceed to operation S1770, at which the hub may be configured to transmit the updated second authentication list to the second agent in response to receiving the request. For example, referring to FIG. 9, the hub 990 may be configured to transmit the updated authentication list of the Network Entity M to the agent deployed in the Network Entity M, in the similar manner as described above in operation S1435 in method 1405.

According to embodiments, the hub may be configured to store the received authentication lists, as well as the updated authentication lists, such that the hub may serve as a central agent or a repository of information for all the authenticated network entities (e.g., authenticated supplicants) in the open fronthaul network. In particular, the network topology mapper (e.g., component 345 in FIG. 3B) of the hub may use the stored authentication lists to form a consolidated data store of authenticated network entities (e.g., authenticated network supplicants), and to create a topological map of all the authenticated network entities in the open fronthaul network. Accordingly, the hub may be configured to develop a live network mapping application that can build a comprehensive topological overview of all the authenticated network entities based on the stored authentication lists.

According to embodiments, the transmitting of the updated second authentication list may be performed via an advertising interface. According to embodiments, the advertising interface may include an interface such as a REST API. According to embodiments, the first agent and the second agent may be mutually authenticated with the hub.

Upon performing operation S1770, the method 1700 may be ended or be terminated. Alternatively, method 1700 may return to operation S1720, such that the hub may be configured to repeatedly (e.g., periodically, continuously, etc.) perform, for at least a predetermined amount of time, the receiving the first authentication list (at operation S1720), the receiving the second authentication list (at operation S1730), the updating the second authentication list (at operation S1740), the transmitting the notification (at operation S1750), the receiving the request (at operation S1760), and the transmitting the updated second authentication list (at operation S1770).

For instance, the first network entity may newly authenticate with a network entity (change in the network), where the first authentication list is updated and transmitted to the hub in the similar manner as described above in relation to method 1400. Accordingly, the hub may receive the updated first authentication list (at operation S1720), and may then restart the receiving the second authentication list (at operation S1730), the updating the second authentication list (at operation S1740), the transmitting the notification (at operation S1750), the receiving the request (at operation S1760), and the transmitting the updated second authentication list (at operation S1770).

Figure 18:
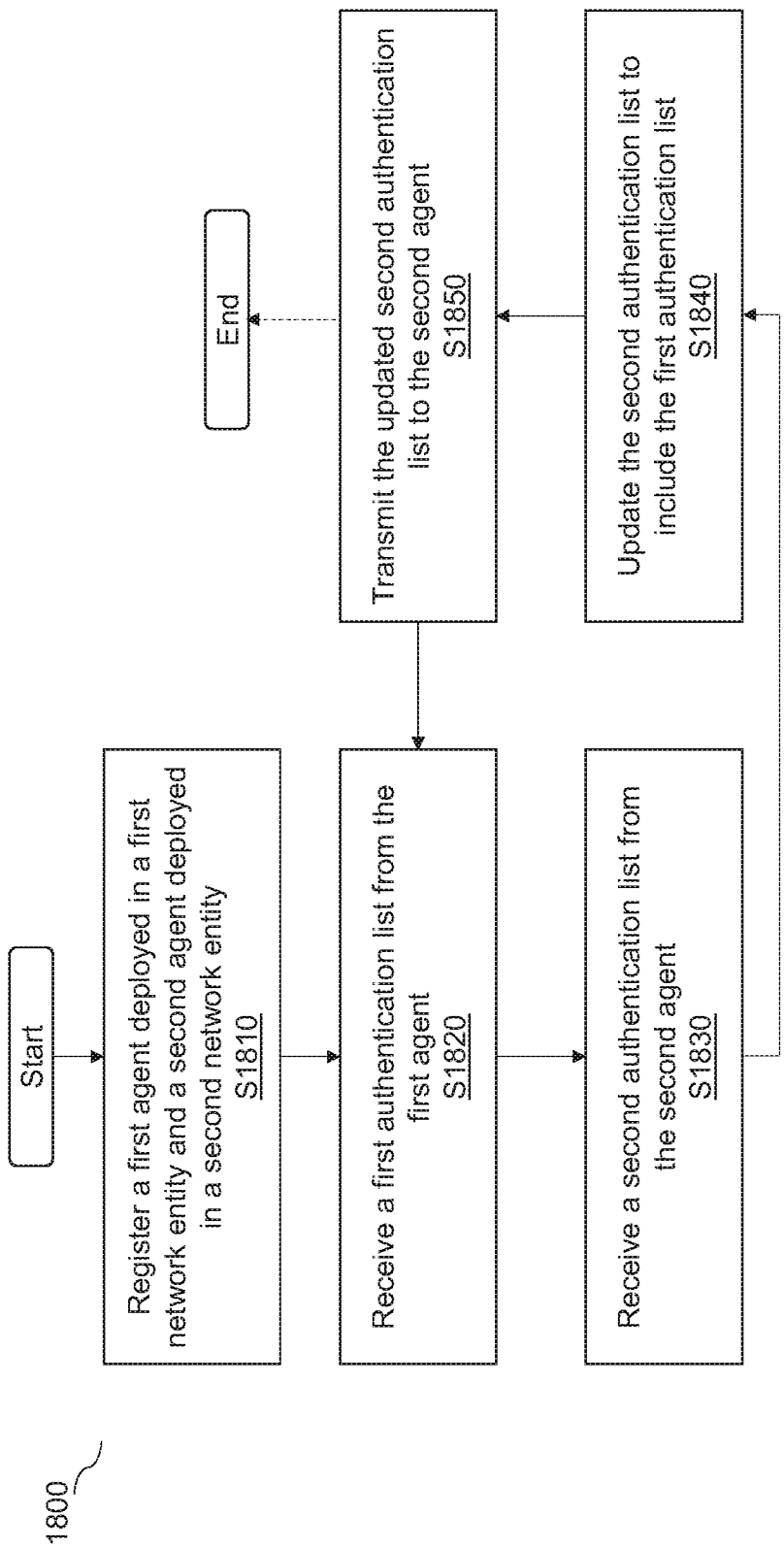
FIG. 18 illustrates a flow diagram of an example method for advertising an authentication list in accordance with a Subscription Notify Model in a hub-and-spoke configuration, according to one or more embodiments.

FIG. 18 illustrates a flow diagram of an example method 1800 for advertising an authentication list in accordance with a Subscription Notify Model in a hub-and-spoke configuration, according to one or more embodiments. One or more operations of method 1800 may be part of operation S1610 and S1620 in method 1600, and may be performed by at least one processor (e.g., processor 420) of the hub communicatively coupled to the plurality of network entities in the system. It can be understood that said one or more operations may also be performed by a system including the hub, by a system including at least one processor, and the like, without departing from the scope of the present disclosure.

As illustrated in FIG. 18, at operation S1810, the hub may be configured to register a first agent deployed in a first network entity and a second agent deployed in a second network entity. According to embodiments, the hub may be configured to register the first agent and the second agent under the Subscription Notify Model. Specifically, the first agent and the second agent may be configured to subscribe to a centralized endpoint URL of the hub using a REST API, where the Subscription Management Function API of the hub manages the process of the subscription, publishing, and notification. Subsequently, the hub may respond to the first agent and the second agent with a success status code to indicate that the subscription was successful, and may keep the connection between the hub and the first agent and the second agent open.

Subsequently, the method 1800 may proceed to operation S1820, at which the hub may be configured to receive a first authentication list from the first agent, in the similar manner as described above in relation to operation S1610. According to embodiments, the first agent may be configured to transmit the first authentication list periodically. The method 1800 may then proceed to operation S1830, at which the hub may be configured to receive a second authentication list from the second agent. According to embodiments, the second agent may be configured to transmit the second authentication list periodically. According to embodiments, the first network entity and the second network entity may be authenticated with each other.

Upon performing operation S1830, the method 1800 may then proceed to operation S1840, at which the hub may be configured to update the second authentication list to include the first authentication list, in the similar manner as described above in operation S1425 in method 1405.

Accordingly, the method 1800 may then proceed to operation S1850, at which the hub may be configured to transmit the updated second authentication list to the second agent. According to embodiments, the hub may be configured to transmit the updated second authentication list periodically. For example, referring to FIG. 9, at operation S1850, the hub 990 may be configured to transmit the updated authentication list of the Network Entity M (which includes the authentication list of the Network Entity A) to the agent deployed in the Network Entity M, in the similar manner as described above in operation S1435 in the method 1405.

Upon performing operation S1850, the method 1800 may be ended or be terminated. Alternatively, the method 1800 may return to operation S1820, such that the hub may be configured to repeatedly (e.g., periodically, continuously, etc.) perform, for at least a predetermined amount of time, the receiving the first authentication list (at operation S1820), the receiving the second authentication list (at operation S1830), the updating the second authentication list (at operation S1840), and the transmitting the updated second authentication list (at operation S1850).

For instance, the first network entity and the second network entity (or the agent(s) deployed therein) may periodically (or continuously) transmit the first authentication list and the second authentication list to the hub. Accordingly, the hub may periodically (or continuously) receive the first authentication list and the second authentication list, and may then restart the operations S1820 to S1850. Additionally, the first network entity may newly authenticate with a network entity (change in the network), where the first authentication list is updated and transmitted to the hub in the similar manner as described above in relation to method 1400, during the above periodic transmission.

According to embodiments, the hub may be configured to additionally transmit a notification to the second agent, receive a request from the second agent, and transmit the updated second authentication list to the second agent, in the similar manner as described above at operations S1750 to S1770 in method 1700.

Figure 19A:
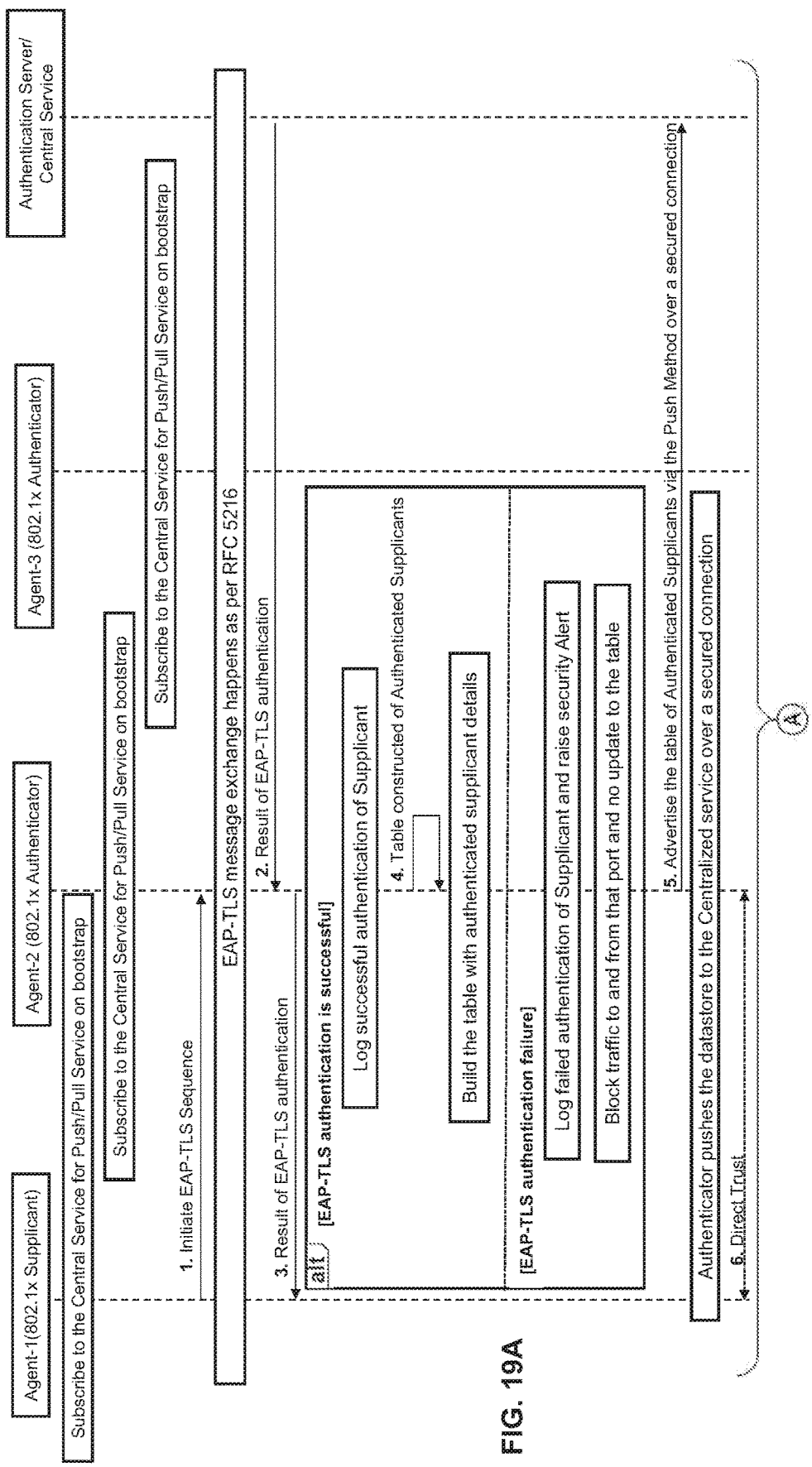
FIG. 19A to FIG. 19C illustrate an example flow sequence of an example use case for advertising authenticated network entities in accordance with a Push and Pull Model in a hub-and-spoke configuration, according to one or more embodiments.
Figure 19B:
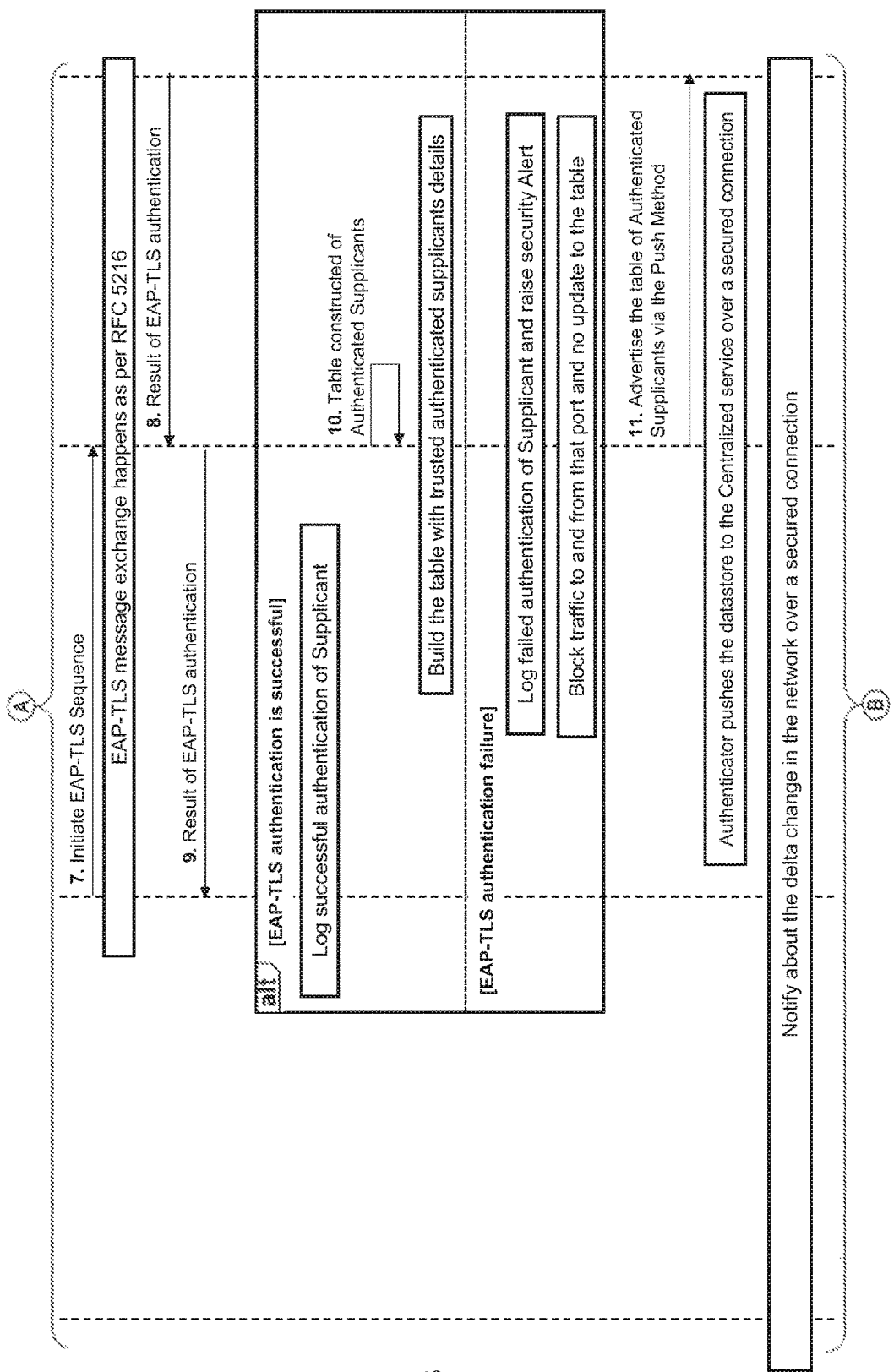
Figure 19C:
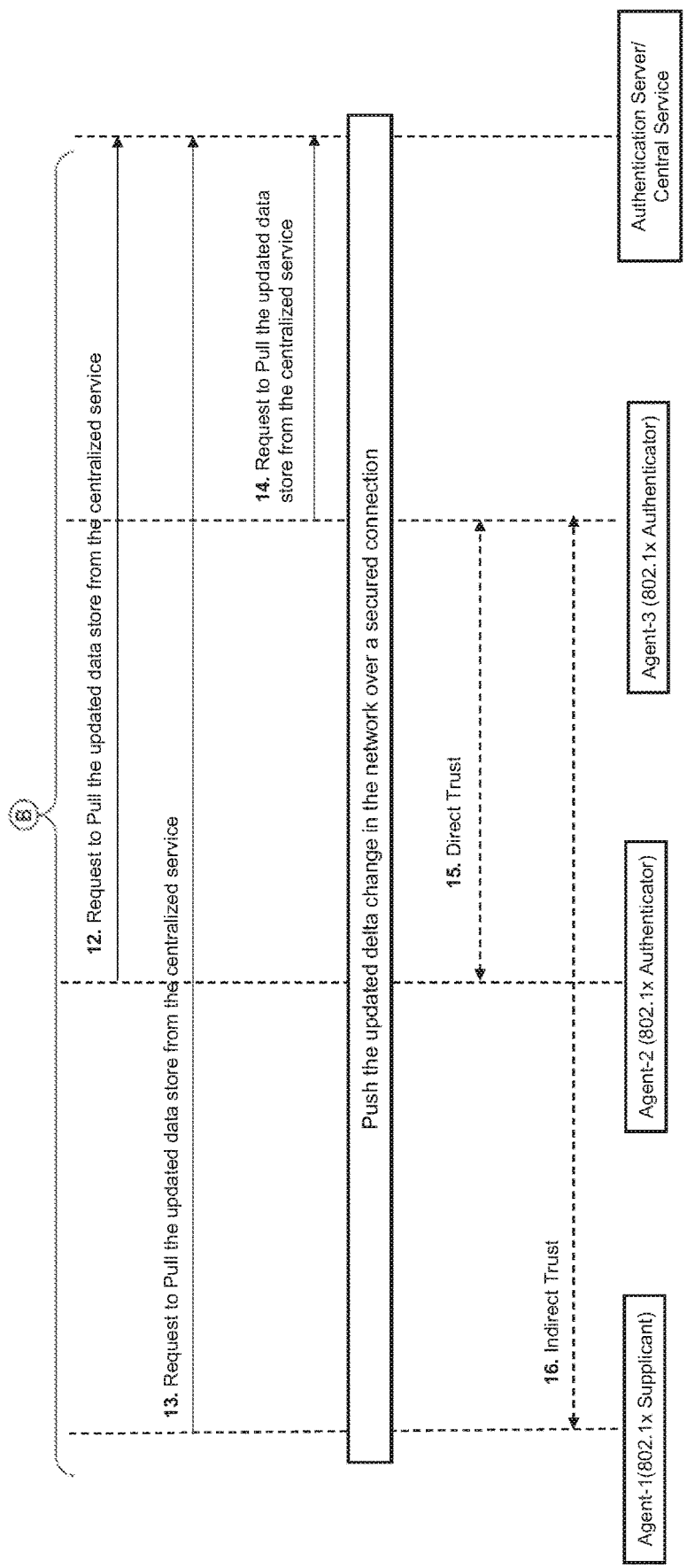

FIG. 19A to FIG. 19C illustrate an example flow sequence of an example use case for advertising authenticated network entities in accordance with a Push and Pull Model in a hub-and-spoke configuration, according to one or more embodiments. The example flow sequence in FIGS. 19A to 19C may involve processes explained above in relation to method 1600 and method 1700.

As shown in FIGS. 19A to 19C, the network includes 3 network entities deploying 3 agents (Agent 1, Agent 2, and Agent 3) and a central service (hub) located at an Authentication Server.

Prior to step 1, Network Entity 1, Network Entity 2, and Network Entity 3 (in which the Agent 1, the Agent 2, and the Agent 3 are deployed, respectively) may subscribe (register) with the hub under the Push and Pull Model.

During steps 1 to 3, Network Entity 1 may perform authentication with Network Entity 2 via an 802.1x process (i.e., an authentication process in accordance with RFC 5216 EAP-TLS Authentication Protocol of IEEE 802.1x). If the authentication is successful, the sequence proceeds to step 4. On the other hand, if the authentication is not successful, Network Entity 2 may raise a security alert, and may block data traffic to and from Network Entity 1.

During steps 4 to 5, Network Entity 2 may create/update its authentication list, and may advertise its authentication list to the hub over a secured connection.

During step 6, Network Entity 2 may form a direct trust with Network Entity 1. For example, once the authentication list of Network Entity 2 is received by the hub, the hub may be configured to create/update a trust list that specifies that a trust level between Network Entity 2 and Network Entity 1 is a direct trust based on the authentication list of Network Entity 2 that specifies Network Entity 1.

During steps 7 to 11, Network Entity 3 may perform authentication with Network Entity 2, may create/update its authentication list, and may advertise its authentication list to the hub, in a similar manner as described above in relation to steps 1 to 5.

After step 11, the hub may transmit a notification to Network Entity 1, Network Entity 2, and Network Entity 3 regarding a change in the network.

During steps 12 to 14, Network Entity 1, Network Entity 2, and Network Entity 3 may transmit requests for an updated authentication list to the hub, and the hub may then transmit the updated authentication list to the Network Entities 1, 2, and 3, respectively.

During step 15, Network Entity 2 may form a direct trust with Network Entity 3. For example, the hub may update the authentication list of Network Entity 3 to include Network Entity 2, and may create/update a trust list that specifies that a trust level between Network Entity 2 and Network Entity 3 is a direct trust based on the authentication list of Network Entity 3 that specifies Network Entity 2.

During step 16, Network Entity 1 may form an indirect trust with Network Entity 3. For example, the hub may update the authentication list of Network Entity 3 to include the authentication list of Network Entity 2 (which specify Network Entity 1) and may create/update a trust list that specifies that a trust level between Network Entity 3 and Network Entity 1 is an indirect trust based on the authentication list of Network Entity 3 that specifies Network Entity 1.

It can be understood that the features and configurations described above are simplified for descriptive purposes, and are not intended to limit the scope of the present disclosure in any way. For example, in practice, the number of network entities in the system can be any number, the number of ports in each of the plurality of network entities can be any number, each of the plurality of network entities may be authenticated with any other network entities, the sequence of steps may be in any different order and may include additional steps, and the like. Similarly, the authentication list and the trust list can be in any other form and can include any additional information in accordance with use.

In view of the above, example embodiments allow the hub and the agents to advertise information of authenticated network entities in the hub-and-spoke configuration. Accordingly, the hub and the agents may be readily informed of any changes to the network, and the agent may always have the most recent version of the authentication list of each network entity in the network. On a periodical basis or in response to a request, the hub could advertise the most up-to-date authentication list of a network entity across the network so that all the network entities in the network may update their local authentication lists. In this way, the information of a direct trust or an indirect trust connection between a network entity with any other network entities could become available to each network entity in the network. Further, example embodiments also guarantee that the hub is promptly informed whenever new data becomes available for transmission, as well as accommodate for errors and retries for any failure scenarios based on the "id" field to uniquely identify each message.

Example Operations: Determining Authentication Status Information of an O-RU

According to embodiments, the network entities of the open fronthaul network may include an O-RU controller, at least one TNE, and at least one O-RU, while the O-RU controller may be communicatively coupled to the at least one O-RU via the at least one TNE. The O-RU controller may include at least one of an O-DU and an SMO.

In this regard, said O-RU controller, TNE, and O-RU may include one or more above-described components and/or may be configured to perform one or more above-described operations. For instance, the O-RU controller and/or O-RU may include at least one processor and may be configured to perform one or more operations for viewing and advertising information of authenticated network entities, and the like. According to embodiments, the O-RU controller described herein may refer to a network entity, a system, an apparatus, or the like, which includes the at least one processor configurable to perform one or more operations described herein and one or more operations of O-DU and/or SMO. Alternatively, the O-RU controller may refer to the at least one processor itself.

In addition to the above-described operations, the O-RU may be authenticated via an authentication process (e.g., an 802.1x process), and the O-RU controller may be configured to perform one or more operations for determining authentication status information of the O-RU (e.g., whether or not the O-RU has been authenticated) and to perform one or more operations based thereon.

Specifically, the O-RU controller (or the at least one processor associated therewith) may be configured to obtain information of the Data Link Layer (may also be referred to as "layer 2" herein) of the O-RU, such as the MAC address of the O-RU, and may utilize said information to determine the authentication status of the O-RU. Accordingly, the O-RU controller may establish a channel binding (e.g., a Data Link Layer to Application Layer channel binding) and a chain of trust between an authenticated O-RU and the O-RU controller, and may isolate an unauthenticated O-RU from any further communication with the O-RU controller.

FIG. 20 illustrates a block diagram of an example system architecture 2000 of an open fronthaul network, according to one or more embodiments. As illustrated in FIG. 20, the system architecture 2000 may include at least one O-RU 2010, at least one TNE 2020, and at least one O-RU controller 2030. It can be understood that, in practice, the system architecture 2000 may include more than one O-RU, more than one TNE, and/or more than one O-RU controller, without departing from the scope of the present disclosure.

The O-RU controller 2030 may include an O-DU or an SMO. The O-RU 2010, the TNE 2020, and the O-RU controller 2030 may be authenticated with one another via an authentication process (e.g., the 802.1x process). The O-RU controller 2030 may obtain (or may be provided with) information of the Data Link Layer of the O-RU 2010 (e.g., a MAC address of the O-RU 2010) and may determine the authentication status of the O-RU 2010 based thereon. For instance, the O-RU controller 2030 may determine, based on the MAC address of the O-RU 2010, whether or not the O-RU 2010 has been authenticated. Accordingly, based on determining that the O-RU 2010 is successfully authenticated (or has a certain level of trust with the O-RU controller 2030 after the authentication process), the O-RU controller 2030 may establish a channel binding and/or a chain of trust between the O-RU controller 2030 and the O-RU 2010. The channel binding and/or the chain of trust may be established during one or more bring-up processes of the O-RU 2010.

Figure 21:
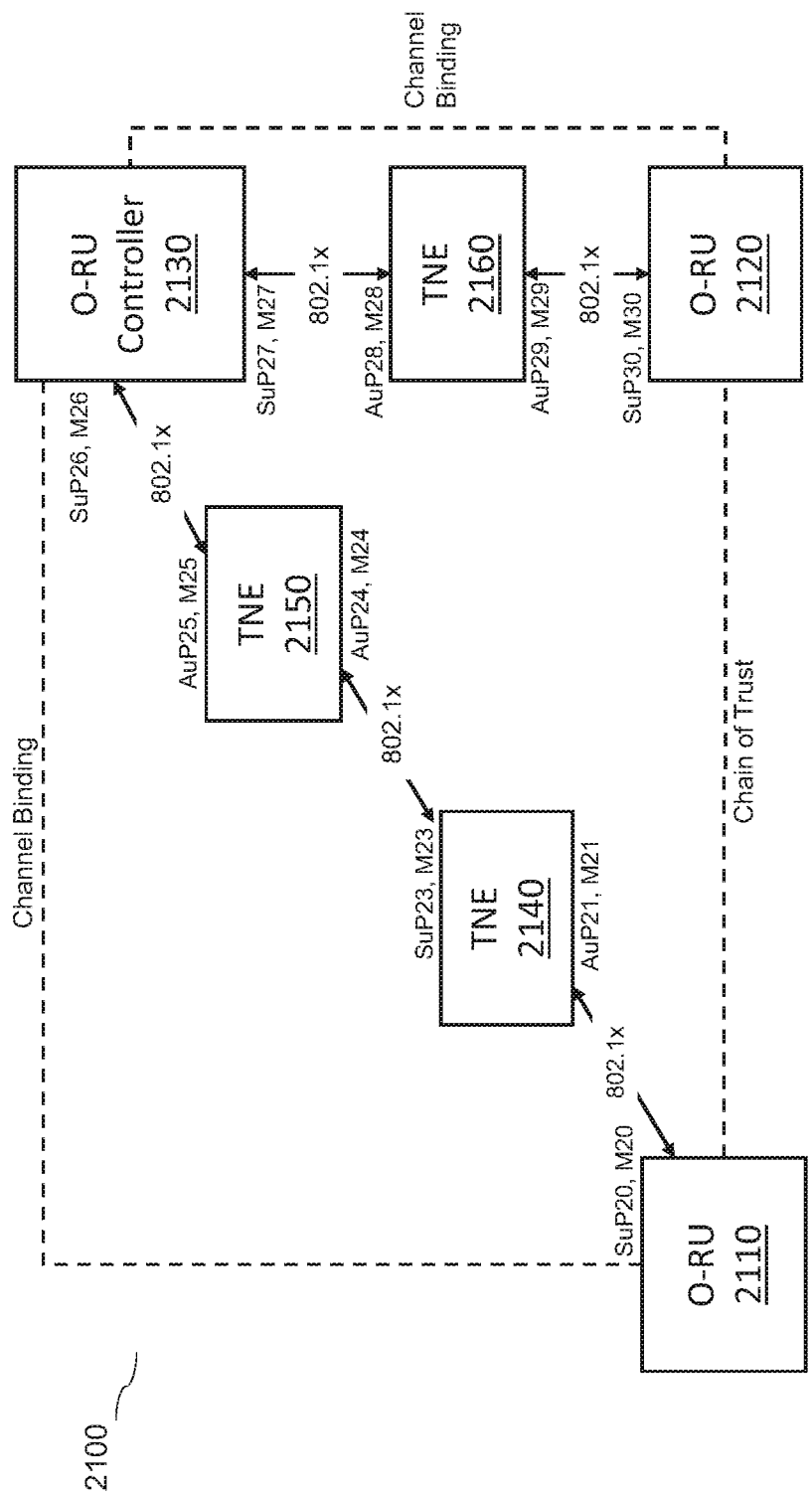
FIG. 21 illustrates a block diagram of another example system architecture of an open fronthaul network, according to one or more embodiments.

FIG. 21 illustrates a block diagram of another example system architecture 2100 of an open fronthaul network, according to one or more embodiments. The system architecture 2100 may include a first O-RU 2110, a second O-RU 2120, an O-RU controller 2130, and a plurality of TNEs 2140-2160. The O-RU controller 2130 may be communicatively coupled to the first O-RU 2110 via TNE 2140 and TNE 2150, and may be communicatively coupled to the second O-RU 2120 via TNE 2160. According to embodiments, the O-RU controller 2130 may act as a centralized controller or a hub (e.g., the hub 340) for controlling the O-RU 2110 and the O-RU 2120. Alternatively, the hub may be a component independent from the O-RU controller 2130, and the O-RU controller 2130 may be communicatively coupled to the hub to obtain information required for controlling the O-RU 2110 and the O-RU 2120.

The first O-RU 2110 may comprise a port SuP20 which has a MAC address M20 and a role of a supplicant that is authenticated (e.g., via the 802.1x process) with port AuP21 of the TNE 2140, which has a MAC address M21 and a role of an authenticator. Similarly, the O-RU 2120, the TNE 2140, the TNE 2150, the TNE 2160, and the O-RU controller 2130 may be authenticated (e.g., via the 802.1x process) with other network entity(s).

Each of the network entities in the system architecture 2100 may have an authentication list, a trust list, or a combination of the authentication list and the trust list (which includes the respective authentication status information) built therefor. Said authentication list and trust list may be collectively referred to herein as "trusted datastore" or the like. Descriptions of examples of trusted datastore of the network entities in FIG. 21 are provided in the following with reference to FIG. 22 and FIG. 23.

Figure 22:
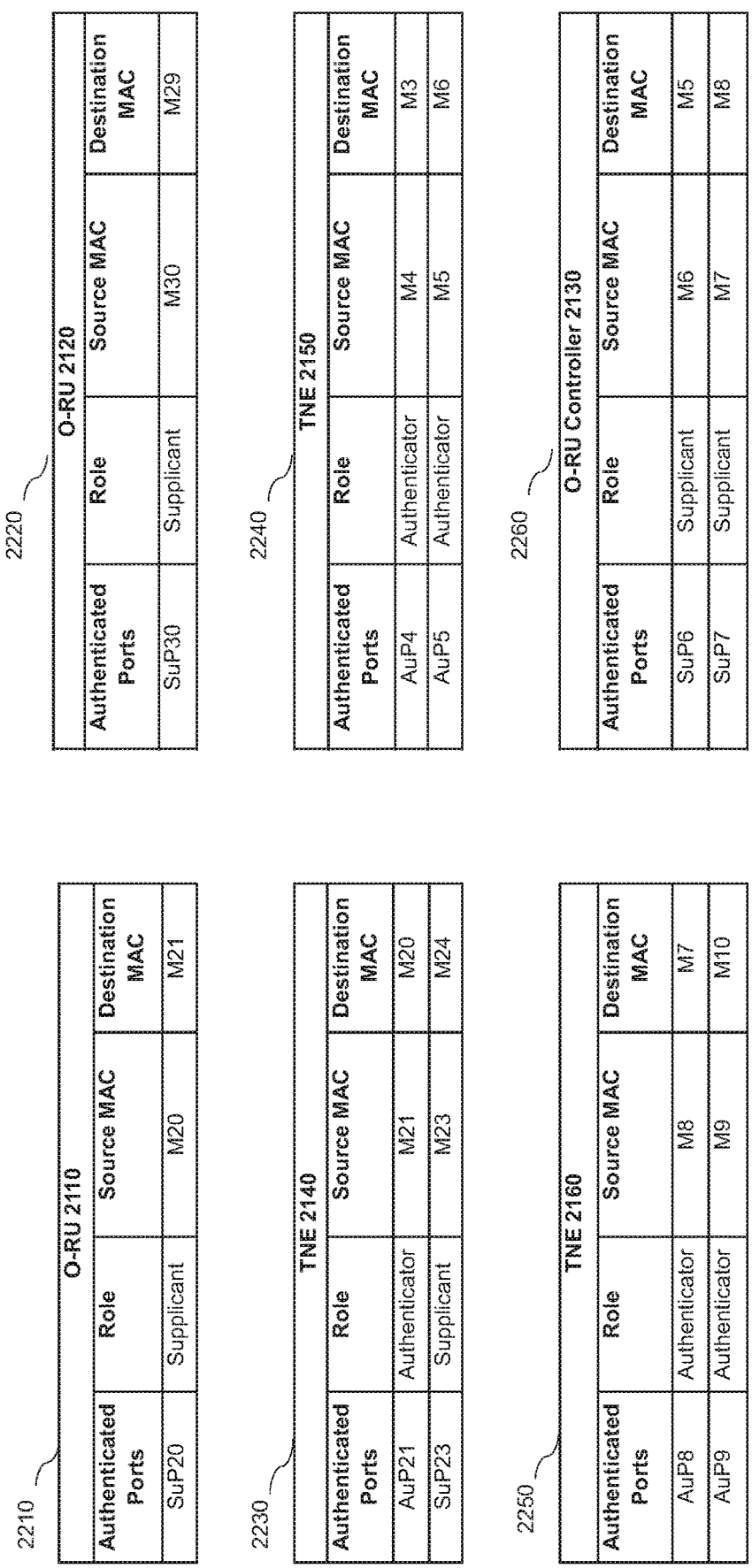
FIG. 22 illustrates examples of trusted datastore associated with the network entities in FIG. 21, according to one or more embodiments.

FIG. 22 illustrates examples of trusted datastore associated with the network entities in FIG. 21, according to one or more embodiments. The trusted datastore comprises information associated with the authentication status of the network entities. For instance, a network entity may be authenticated via an 802.1x process, and the trusted datastore associated with the network entity may include parameters (e.g., ID, description, tag, etc.) defining port(s) authenticated via the 802.1x process, a role of the authenticated ports, MAC address of the authenticated ports (illustrated as "Source MAC"), and MAC address of ports with which the authenticated ports are authenticated via the 802.1x process.

For instance, the trusted datastore 2210 is built for the O-RU 2110, and may include the information of the port SuP20 (i.e., the authenticated port of the O-RU 2110), the role of the port SuP20, the MAC address of the port SuP20 (i.e., M20), and the MAC address of the port AuP21 of TNE 2140 (i.e., M21) with which the port SuP20 is authenticated (e.g., authenticated via the 802.1x process). Similar descriptions apply to the trusted datastores 2220 to 2260, each of which is associated with the O-RU 2120, the TNE 2140, the TNE 2150, the TNE 2160, and the O-RU controller 2130, respectively.

According to embodiments, the trusted datastore may include information of trust levels among network entities. For instance, FIG. 23 illustrates other examples of trusted datastore associated with the network entities in FIG. 21, according to one or more embodiments.

As illustrated in FIG. 23, the trusted datastore may include a trust level between one or more ports of a network entity and one or more ports of one or more other network entities that have a role of a supplicant. The trust level may include one of direct trust and indirect trust. For instance, trusted datastore 2330 associated with the TNE 2140 shows that the port having MAC address M21 (i.e., port AuP21 of the TNE 2140) has a trust level of "direct trust" with a port having MAC address M20 (i.e., port SuP20 of the O-RU 2110), and the port having MAC address M23 (i.e., port SuP23 of the TNE 2140) has a trust level of "indirect trust" with a port having MAC address M26 (i.e., port SuP26 of the O-RU controller 2130). Similar descriptions apply to the trusted datastores 2310-2320 and 2340-2360, each of which is associated with the O-RU 2110, the O-RU 2120, the TNE 2150, the TNE 2160, and the O-RU controller 2130, respectively.

In some implementations, the trusted datastore built for each network entity may be advertised across the open fronthaul network, and a consolidated network-level trusted datastore (such as a network-level authentication list and a network-level trust list) may be built (e.g., built by the hub, built by one or more network entities, etc.). The trusted datastore may be advertised or shared among the network entities, for example, in a peer-to-peer configuration and/or a hub-and-spoke configuration, in a similar manner as described above. Additionally or alternatively, the trusted datastores of all network entities may be managed by a centralized agent (e.g., a hub, a centralized service, etc.).

To this end, whenever an O-RU controller is firstly communicating with an O-RU (e.g., during the bring-up process of the O-RU, etc.), the O-RU controller may determine the authentication status information of the O-RU to ensure that the O-RU has been authenticated, before further communicating with the O-RU. Specifically, the O-RU controller may obtain the Data Link Layer information (e.g., MAC address) of the O-RU, may obtain the trusted datastore(s) available in the open fronthaul network (or the trusted datastore(s) associated with the O-RU), and may determine the authentication status information based thereon.

It can be understood that the block diagrams in FIG. 20 and FIG. 21, and the trusted datastores in FIG. 22 and FIG. 23, are merely examples of possible embodiments, and the scope of the present disclosure should not be limited thereto. Specifically, the open fronthaul network in FIG. 20 and/or FIG. 21 may include more/fewer components than as illustrated, and/or may be arranged in a different manner from as illustrated. For instance, according to embodiments, the O-RU(s) may be communicatively coupled to an authentication server (i.e., a server that performs the authentication process for the O-RU) via one or more TNEs, the O-RU controller may be communicatively coupled to a hub/a centralized agent, and the like, without departing from the scope of the present disclosure. Further, the trusted datastores in FIG. 22 and FIG. 23 may include more/fewer information than illustrated, without departing from the scope of the present disclosure.

Figures 24, 25:
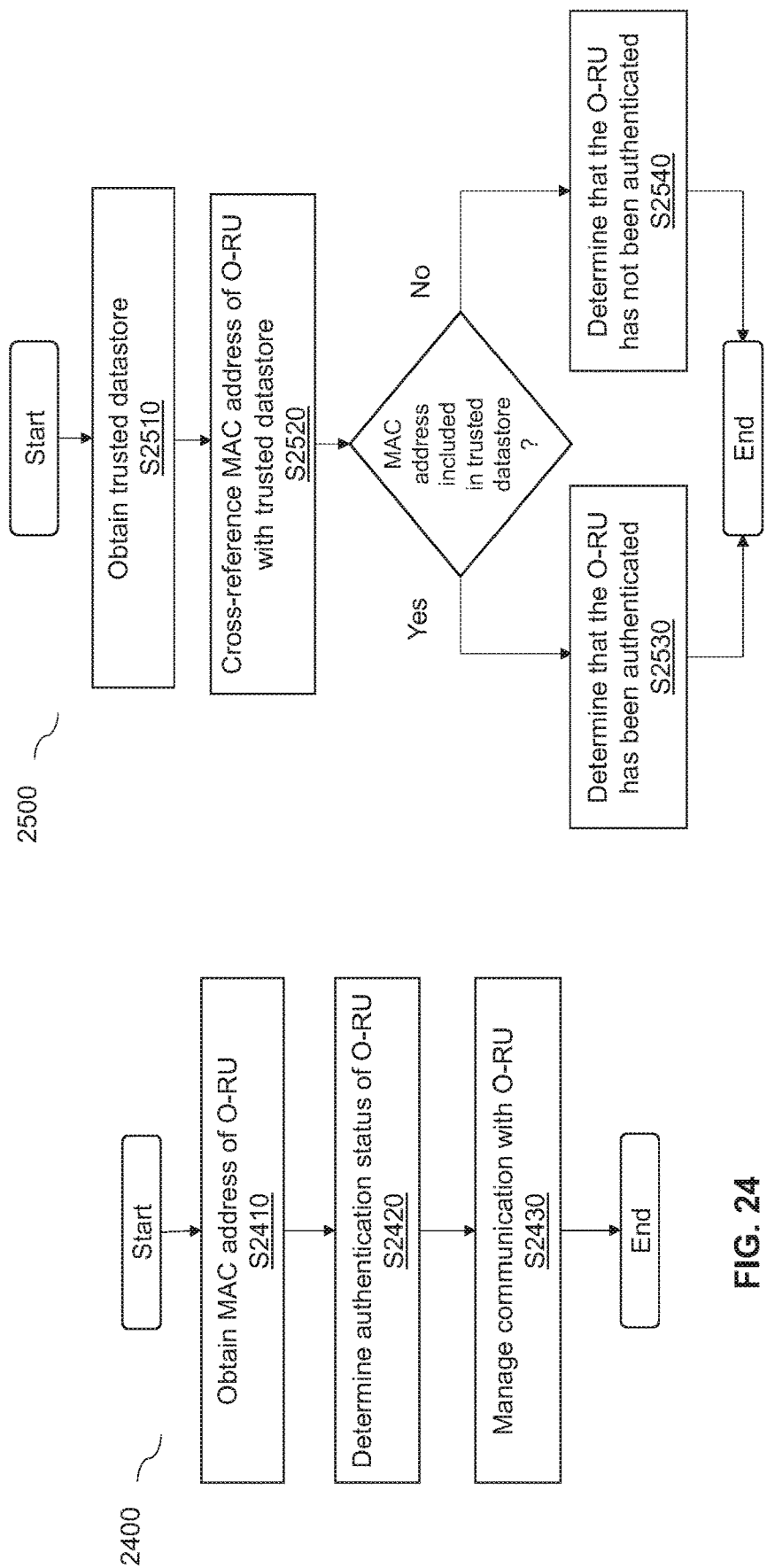
FIG. 24 illustrates a flow diagram of an example method for determining authentication status information of an O-RU and for managing a communication with the O-RU, according to one or more embodiments.
FIG. 25 illustrates a flow diagram of an example method for determining an authentication status of an O-RU, according to one or more embodiments.

FIG. 24 illustrates a flow diagram of an example method 2400 for determining authentication status information of an O-RU and for managing a communication with the O-RU, according to one or more embodiments. One or more operations of the method 2400 may be performed by an O-RU controller (or at least one processor associated therewith).

As shown in FIG. 24, at operation 52410, the O-RU controller may be configured to obtain a MAC address of the O-RU. Example operations for obtaining the MAC address of the O-RU are described below with reference to FIG. 27A and FIG. 27B.

Upon performing operation 52410, the method 2400 may proceed to operation 2420, at which the O-RU controller may be configured to determine an authentication status of the O-RU. Specifically, the O-RU controller may determine, based on the MAC address of the O-RU, the authentication status of the O-RU. The authentication status of the O-RU may correspond to an Extensible Authentication Protocol-Transport Layer Security (EAP-TLS) authentication process for the O-RU. For example, the O-RU controller may determine, based on the MAC address of the O-RU, whether or not the O-RU has been authenticated via an 802.1x process (e.g., an EAP-TLS authentication process, etc.). Example operations for determining the authentication status of the O-RU are described below with reference to FIG. 25.

Upon performing operation S2420, the method 2400 may proceed to operation 2430, at which the O-RU controller may be configured to manage a communication with the O-RU. Specifically, the O-RU controller may be configured to manage the communication with the O-RU, based on determining whether or not the O-RU has been authenticated. Example operations for managing the communication with the O-RU are described below with reference to FIG. 26.

To this end, the O-RU controller may effectively and efficiently determine the authentication status information of one or more O-RUs and may appropriately manage the communication with one or more O-RUs accordingly.

FIG. 25 illustrates a flow diagram of an example method 2500 for determining an authentication status of an O-RU, according to one or more embodiments. One or more operations of the method 2500 may be part of the operation S2420 of the method 2400, and may be performed by the O-RU controller (or the at least one processor associated therewith).

As shown in FIG. 25, at operation S2510, the O-RU controller may be configured to obtain at least one trusted datastore. The trusted datastore may include at least one of an authentication list and a trust list described hereinabove. According to embodiments, the O-RU controller may obtain all available trusted datastore(s). Alternatively, the O-RU controller may obtain trusted datastore(s) associated with the O-RU. For instance, the O-RU controller may search, based on an ID of the O-RU (or any other suitable parameter defining the identity of the O-RU), one or more trusted datastores associated with the O-RU from among a plurality of trusted datastores available in the network.

According to embodiments, the O-RU controller may be configured to obtain the trusted datastore from a storage associated with the O-RU controller (e.g., storage 440). Alternatively, the trusted datastore may be stored in another network entity (e.g., a hub, etc.), and the O-RU controller may be configured to communicate with said network entity and to obtain the trusted datastore therefrom. By way of example, when the O-RU controller is an O-DU, the O-RU controller may obtain the trusted datastore from an SMO, a hub, or other network entities in the network. In some implementations, the O-RU controller may be configured to obtain a first trusted datastore from the storage associated with the O-RU controller, and to obtain a second trusted datastore from another network entity.

Upon performing operation S2510, the method 2500 may proceed to operation S2520, at which the O-RU controller may be configured to cross-reference the MAC address of the O-RU with a plurality of MAC addresses included in the trusted datastore. By cross-referencing the MAC address of the O-RU with the plurality of MAC addresses in the trusted datastore, the O-RU controller may determine whether or not the MAC address of the O-RU is included in the plurality of MAC addresses in the trusted datastore.

Based on determining that the MAC address of the O-RU is included in the plurality of MAC addresses in the trusted datastore, the method 2500 may proceed to operation S2530, at which the O-RU controller may be configured to determine that the O-RU has been authenticated. Specifically, by determining that the MAC address of the O-RU is included in the trusted datastore, the O-RU controller may determine that the information of the O-RU is included in the trusted datastore, indicating that the O-RU has been authenticated via the authentication process (e.g., the 802.1x process) and the O-RU is validated and trustworthy.

Otherwise, based on determining that the MAC address of the O-RU is not included in the plurality of MAC addresses in the trusted datastore, the method 2500 may proceed to operation S2540, at which the O-RU controller may be configured to determine that the O-RU has not been authenticated. Specifically, by determining that the MAC address of the O-RU is not included in the trusted datastore, the O-RU controller may determine that the information of the O-RU is not included in the trusted datastore, indicating that the O-RU has not been authenticated via the authentication process (e.g., the 802.1x process) and the O-RU is not validated and not trustworthy.

According to embodiments, based on determining that the O-RU (and/or the associated MAC address) is included in the trusted datastore, the O-RU controller may determine a trust level (e.g., direct trust, indirect trust, etc.) of the O-RU and may determine whether or not the O-RU is validated and is trustworthy based thereon.

FIG. 26 illustrates a flow diagram of an example method 2600 for managing a communication with the O-RU, according to one or more embodiments. One or more operations of the method 2600 may be part of the operations S2420 and S2430 in the method 2400, and may be performed by the O-RU controller (or the at least one processor associated therewith).

As shown in FIG. 26, at operation S2610, the O-RU controller may be configured to determine whether or not the O-RU is authenticated. Operation S2610 may be similar to one or more operations described above with reference to the method 2500, and may be part of the operation S2420 in method 2400.

Based on determining that the O-RU has been authenticated, the method 2600 may proceed to operation S2620, at which the O-RU controller may be configured to establish a channel binding with the O-RU. The term "channel binding" described herein may refer to the feature of binding an authentication information to a communication channel (e.g., TLS channel, etc.) between the O-RU controller and the O-RU, as defined in one or more specifications (e.g., Request for Comments (RFC) specification, etc.) of one or more standard organizations (e.g., Internet Engineering Task Force (IETF), etc.). By way of example, the channel binding may bind information of an authenticated channel (e.g., TLS channel) to an authenticated event (e.g., an access from an authenticated O-RU, a communication session with the authenticated O-RU, etc.). By establishing the channel binding, the communication between the O-RU controller and the O-RU can be secured, and potential security risks (e.g., session hijacking, etc.) may be prevented.

Otherwise, based on determining that the O-RU has not been authenticated, the method 2600 may proceed to operation S2630, at which the O-RU controller may be configured to isolate the O-RU from further communications with the O-RU controller. In this way, any further communication between the unauthenticated O-RU and the O-RU controller can be avoided, thereby preventing any potential security issue (e.g., O-RU identity spoofing, etc.) possessed by the unauthenticated O-RU.

According to embodiments, the establishment of the channel binding with the authenticated O-RU (at operation S2620) or the isolation of the unauthenticated O-RU (at operation S2630) may be performed during a TLS Session Establishment Phase (an example use case associated therewith is described below with reference to FIG. 28A and FIG. 28B). Additionally or alternatively, the establishment of the channel binding with the authenticated O-RU or the isolation of the unauthenticated O-RU may be performed during a Network Configuration Protocol (NETCONF) Session Establishment Phase (an example use case associated therewith is described below with reference to FIG. 28A and FIG. 28C).

Example operations for obtaining a MAC address of an O-RU are described in the following with reference to FIG. 27A and FIG. 27B. FIG. 27A illustrates a flow diagram of an example method 2700 for obtaining the MAC address of the O-RU, according to one or more embodiments. One or more operations of the method 2700 may be part of the operation S2510 in the method 2500, and may be performed by the O-RU controller (or the at least one processor associated therewith) during the TLS Session Establishment Phase.

As shown in FIG. 27A, at operation S2710, the O-RU controller may be configured to receive a vendor certificate from the O-RU. The vendor certificate may be pre-provisioned to the O-RU and may have the MAC address of the O-RU embedded therein. For instance, the vendor certificate may include a factory pre-provisioned x.509 certificate, and the MAC address of the O-RU may be embedded (e.g., by the vendor of the O-RU, etc.) in an extension (e.g., Subject Alternative Name (SAN) field, etc.) of the x.509 certificate. The vendor certificate may be received by the O-RU controller during a mutual authentication procedure in the TLS Session Establishment Phase. The mutual authentication procedure may include an mTLS process.

Upon performing operation S2710, the method 2700 may proceed to operation S2720, at which the O-RU controller may be configured to extract the MAC address of the O-RU from the vendor certificate. To this end, the O-RU controller may obtain the MAC address of the O-RU during the TLS Session Establishment Phase.

FIG. 27B illustrates a flow diagram of another example method 2705 for obtaining the MAC address of the O-RU, according to one or more embodiments. One or more operations of the method 2705 may be part of the operation S2510 in the method 2500, and may be performed by the O-RU controller (or the at least one processor associated therewith) during the NETCONF Session Establishment Phase.

As shown in FIG. 27B, at operation S2715, the O-RU controller may be configured to send, to the O-RU, a request for O-RU information. Specifically, the requested O-RU information may include the MAC address of the O-RU and inventory information of the O-RU (e.g., Serial Number, etc.). The inventory information of the O-RU may be required by the O-RU controller in providing NETCONF configuration information to the O-RU. The O-RU controller may send the request to the O-RU during the NETCONF Session Establishment Phase.

Subsequently, at operation S2725, the O-RU controller may be configured to receive the O-RU information (requested at operation S2715) from the O-RU. The received O-RU information may include the MAC address of the O-RU and inventory information of the O-RU (e.g., Serial Number, etc.).

Upon receiving the O-RU information at operation S2725, the method 2705 may proceed to operation S2735, at which the O-RU controller may be configured to extract the MAC address of the O-RU from the O-RU information. To this end, the O-RU controller may obtain the MAC address of the O-RU during the NETCONF Session Establishment Phase.

Example use cases associated with the operations of the methods 2400, 2500, 2600, 2700, and 2705, are provided below with reference to FIG. 28A to FIG. 28C. Specifically, FIG. 28A illustrates a flow sequence of an example use case of a bring-up process of an O-RU, FIG. 28B illustrates a flow sequence of an example use case for determining authentication status information of the O-RU and for managing a communication with the O-RU during a TLS Session Establishment Phase, and FIG. 28C illustrates a flow sequence of an example use case for determining the authentication status information of the O-RU and for managing the communication with the O-RU during a NETCONF Session Establishment Phase, according to one or more embodiments.

Figure 28A:
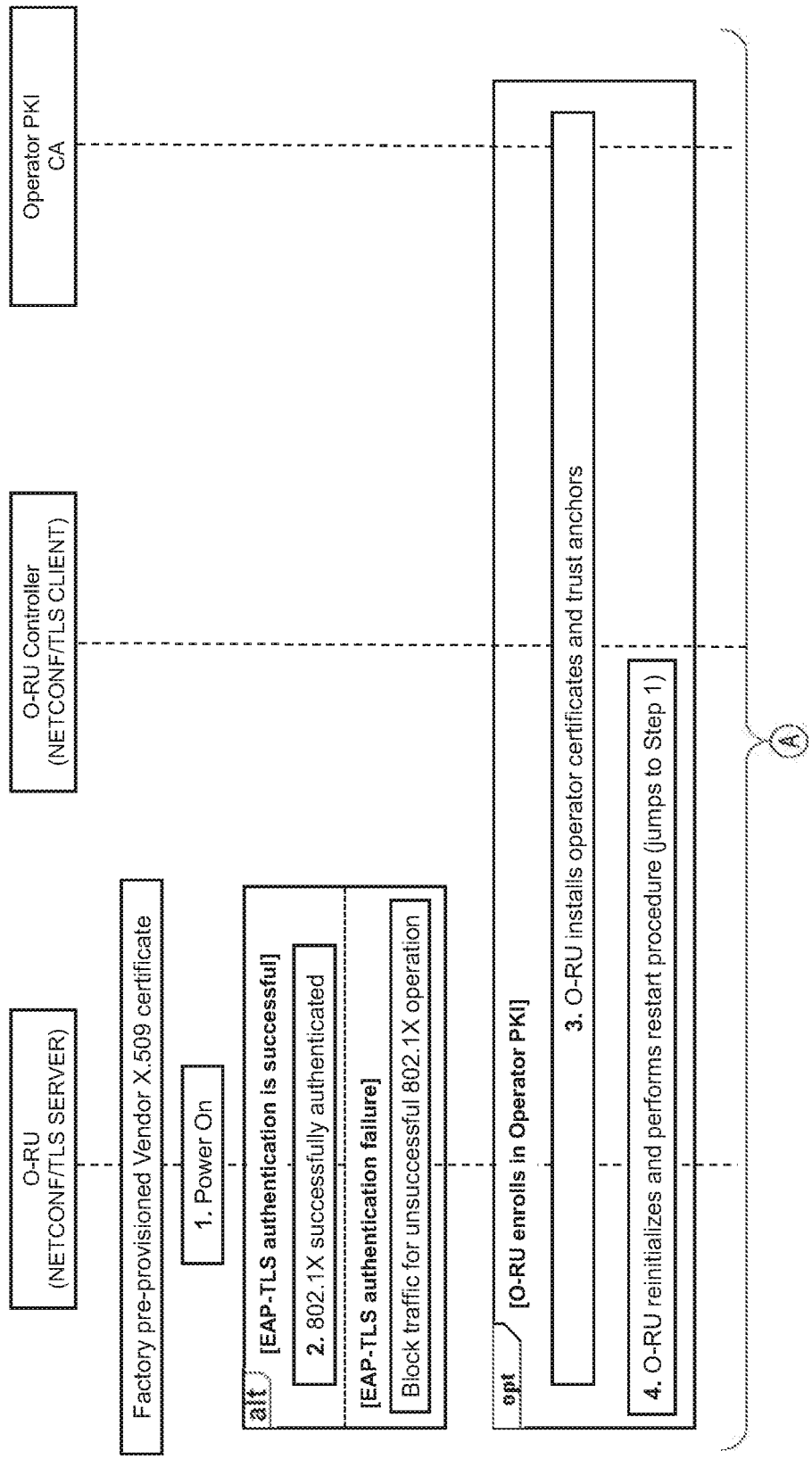
FIG. 28A illustrates a flow sequence of an example use case of a bring-up process of an O-RU, according to one or more embodiments.

Referring to FIG. 28A, the O-RU may act as a TLS Server/NETCONF Server, the O-RU controller may act as a TLS Client/NETCONF Client, and a vendor certificate (e.g., x.509 certificate) may be pre-provisioned to the O-RU. The vendor certificate may or may not have the MAC address of the O-RU embedded therein.

During step 1, the O-RU is powered on in the initial state. For instance, the O-RU may be powered on during the O-RU bring-up process.

During step 2, the O-RU may perform an authentication process. For instance, the O-RU may perform an 802.1x process with a TNE. The TNE may communicatively coupling the O-RU to the O-RU controller and/or to an operator's Public Key Infrastructure (PKI), such as an operator Certificate Authority (CA). The 802.1x process may include one or more EAP-TLS authentication processes, and said one or more EAP-TLS authentication processes may include one or more authentication processes complying with the RFC 5216 EAP-TLS Authentication Protocol of IEEE 802.1x. Further, the EAP-TLS authentication operation may be performed based on the vendor certificate of the O-RU, and/or based on an operator-signed certificate provided by the operator CA.

If the authentication is successful, the flow sequence may proceed to further steps. For instance, upon successfully authenticating with the TNE, the O-RU may be allowed to further communicate with the O-RU controller and/or the operator CA. By way of example, upon determining that the O-RU has been successfully authenticated via the 802.1x process, the port of the TNE communicatively coupled to the O-RU may allow further traffic to and from the O-RU, such that the O-RU may communicate with the O-RU controller and/or the operator CA.

On the other hand, if the authentication is unsuccessful, the O-RU may be isolated from the network. For instance, upon determining that the authentication has failed (e.g., unsuccessful 802.1x process, etc.), the TNE may block the traffic of the O-RU, and thus the flow sequence may be ended and the O-RU may be isolated and no communication between the O-RU and the O-RU controller and/or the operator CA would be allowed.

During step 3, the O-RU (which has been successfully authenticated in step 2) may communicate with the operator CA for certificate enrollment. For instance, the O-RU may obtain one or more operator-signed certificates (e.g., one or more x.509 certificates) from the operator CA. According to embodiments, in addition to the operator-signed certificate(s), the O-RU may also obtain one or more trust anchors from the operator CA. In this regard, a trust anchor may include an information which may be utilized by the O-RU to validate the identity of the operator CA. For instance, the trust anchor may include a root certificate, a public key, and an identity information (e.g., domain name, etc.) of the operator CA.

Subsequently, during step 4, the O-RU may be reinitialized/reset, and the flow sequence may return to step 1. In this regard, the O-RU may be re-authenticated based on the operator-signed certificate(s) via the authentication process (e.g., the 802.1x process). It is contemplated that step 3 and step 4 described herein may be optional. For instance, step 3 and step 4 may be performed when an operator CA is available in the open fronthaul network. On the other hand, if there is no available operator CA in the network, step 3 and step 4 may be omitted.

To this end, the initial authentication of the O-RU is completed, and the O-RU may communicate with the O-RU controller to perform further operations. For instance, upon successful authenticating based on the vendor certificate (and operator-signed certificate, if available), the TNE may allow traffic to and from the O-RU, and the O-RU may communicate with the O-RU controller to establish a TLS Session/Connection.

In this regard, the communication between the O-RU and the O-RU controller happens over a Transmission Control Protocol (TCP) Session. The TLS Session is established during the NETCONF Call Home Register procedure within the TCP Session, thereby achieving reliable and secured communication among the O-RU and the O-RU controller. For instance, upon establishing the TCP Session, the O-RU and the O-RU controller may exchange, over a secured channel, information for establishing the TLS Session.

The TLS Session Establishment Phase involves a series of procedures that both the TLS Client (i.e., the O-RU controller) and the TLS Server (i.e., the O-RU) are taking part in to establish a secure communication channel therebetween. Among others, mutual authentication is a procedure in the TLS Session Establishment Phase, wherein both the TLS Client and the TLS Server verify each other's identity by exchanging one or more security certificates (e.g., one or more x.509 certificates, etc.). The mutual authentication procedure may include an mTLS process.

Figure 28B:
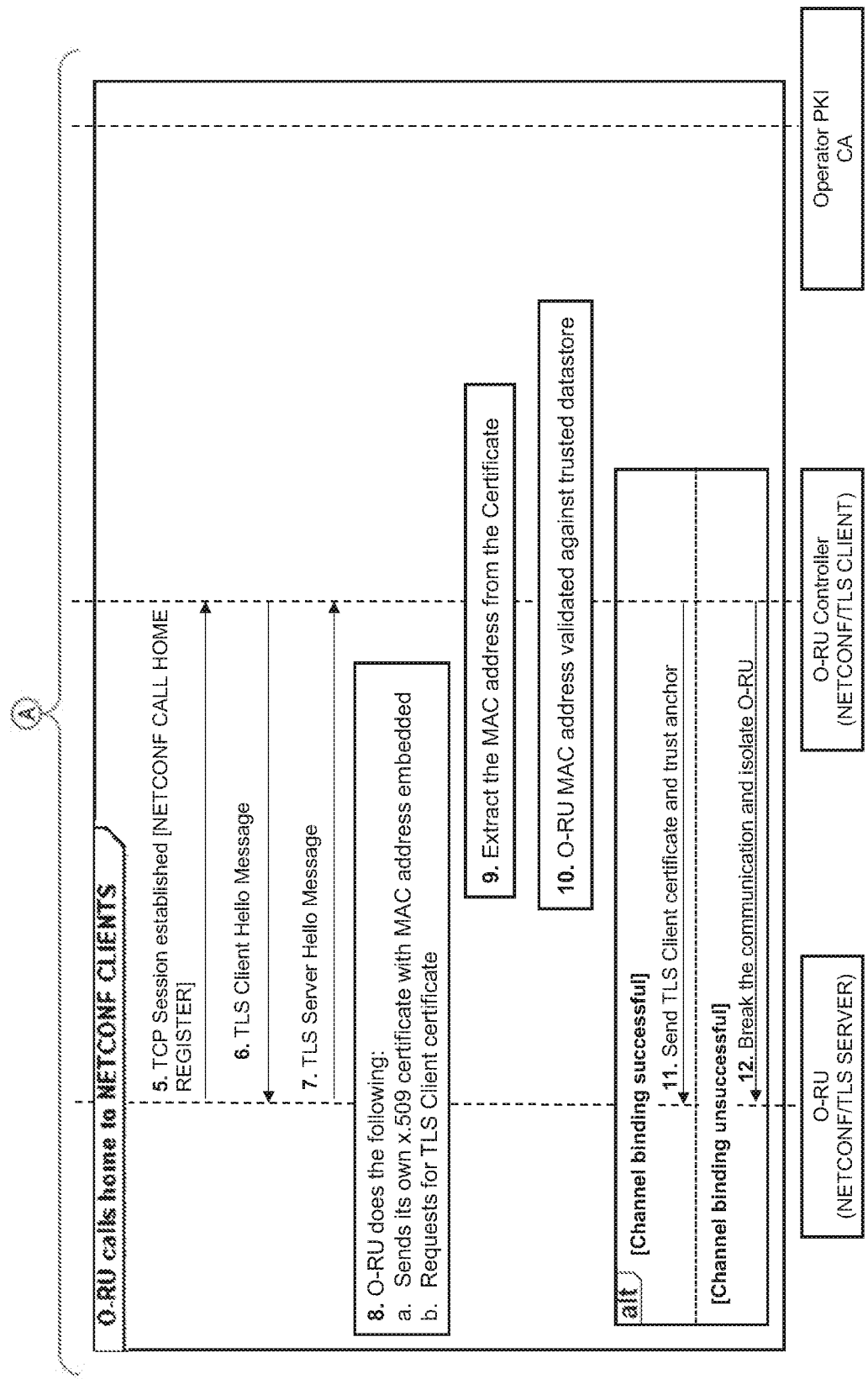
FIG. 28B illustrates a flow sequence of an example use case for determining authentication status information of an O-RU and for managing the communication with the O-RU during a TLS Session Establishment Phase, according to one or more embodiments.
Figure 28C:
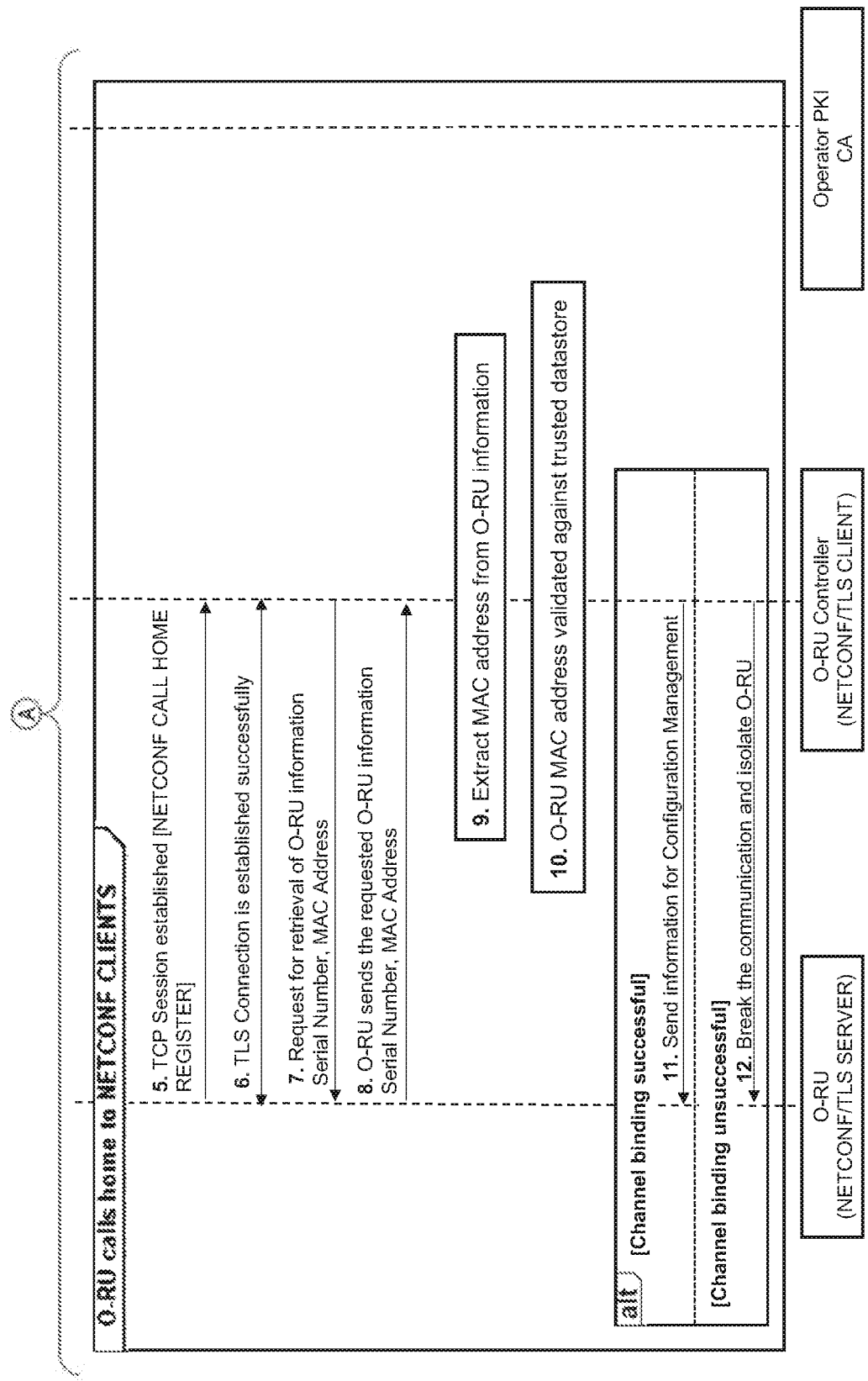
FIG. 28C illustrates a flow sequence of an example use case for determining authentication status information of an O-RU and for managing the communication with the O-RU during a NETCONF Session Establishment Phase, according to one or more embodiments.

In this regard, upon receiving the security certificate (e.g., vendor certificate) from the O-RU during the mutual authentication procedure, if the O-RU controller determines that the MAC address of the O-RU is available in the security certificate (e.g., the MAC address of the O-RU is embedded in the vendor certificate), the O-RU controller may initiate the operations for determining the authentication status information of the O-RU and for managing the communication with the O-RU based thereon (descriptions of an example use case are provided below with reference to FIG. 28B).

According to embodiments, if the O-RU controller determines that the MAC address of the O-RU is not available in the security certificate (e.g., the MAC address is not embedded in the vendor certificate), the O-RU controller may complete the TLS Session Establishment Phase and may obtain the MAC address of the O-RU at a later stage. For instance, the O-RU controller may request the MAC address during the NETCONF Session Establishment Phase, after the TLS Connection among the O-RU controller and the O-RU is established successfully (descriptions of an example use case are provided below with reference to FIG. 28C). Thus, in the following description, the flow sequences in the FIG. 28B and the FIG. 28C may start with step 5, indicating that said flow sequences are a continuation of the flow sequence in FIG. 28A.

Referring to FIG. 28B, during step 5, a TCP Session between the O-RU and the O-RU controller may be established. During step 6, the O-RU controller (i.e., the TLS Client) may send a Client Hello Message to the O-RU (i.e., the TLS Server) to initiate a TLS Handshake procedure. The Client Hello Message may include information associated with the O-RU controller, such as supported encryption algorithms, supported TLS version, and any other suitable information. Subsequently, during step 7, the O-RU may send a Server Hello Message to the O-RU controller, in response to the receiving of the Client Hello Message.

Further, during step 8, the O-RU may send, to the O-RU controller, the vendor certificate (i.e., x.509 certificate with the MAC address of the O-RU embedded therein) and a request for a TLS Client certificate (e.g., an operator-signed certificate). As a part of the mutual authentication procedure, the vendor certificate may act as a TLS Server certificate and may be utilized by the O-RU controller to authenticate the O-RU, while the TLS Client certificate may be utilized by the O-RU to authenticate the O-RU controller. In view of the above, the O-RU controller may receive, from the O-RU during the TLS Session Establishment Phase, the vendor certificate and the request for the TLS Client certificate.

During step 9, the O-RU controller may extract the MAC address of the O-RU from the vendor certificate, in a similar manner described above with reference to the method 2700 in FIG. 27A.

During step 10, the O-RU controller may validate the MAC address of the O-RU, before providing the requested TLS Client certificate to the O-RU. For instance, as a part of the mutual authentication procedure using the vendor certificate (e.g., x.509 certificates), the O-RU controller may validate the certificate file validation path of the O-RU and/or match the contents of the vendor certificate to a previously trusted value.

According to embodiments, the O-RU controller may obtain a trusted datastore and may determine (based on the MAC address of the O-RU and the information in the trusted datastore) an authentication status of the O-RU, in a similar manner described above with reference to the method 2400 and the method 2500. The authentication status of the O-RU may correspond to an 802.1x process (e.g., an EAP-TLS authentication process) for the O-RU. According to embodiments, the O-RU controller may obtain the trusted datastore from a hub or a centralized service/agent. Alternatively, the O-RU controller may obtain the trusted datastore from a storage associated with the O-RU controller (e.g., storage 440).

Accordingly, based on determining that the O-RU has been authenticated, the O-RU controller may establish a channel binding with the O-RU. Subsequently, upon successful channel binding, during step 11, the O-RU controller may send the TLS Client certificate (e.g., the operator-signed certificate requested by the O-RU at step 8) to the O-RU, and the TLS Session Establishment procedures can be continued.

Otherwise, based on determining that the O-RU has not been authenticated, or based on determining that the channel binding is unsuccessful, during step 12, the O-RU controller may isolate the O-RU (e.g., break the communication with the O-RU, perform network isolation on the O-RU, etc.) from further communications with the O-RU controller. In this case, a session teardown happens at the TLS Session Establishment Phase, without allowing the unauthenticated O-RU to further communicate with the O-RU controller.

In addition to or in alternative to providing the MAC address of the O-RU to the O-RU controller by embedding the MAC address in the vendor certificate, the MAC address may also be provided by the O-RU to the O-RU controller, in response to a request or query from the O-RU controller.

Referring to FIG. 28C, during step 5, a TCP session between the O-RU and the O-RU controller may be established, in a similar manner as described above with reference to step 5 in FIG. 28B. In this regard, it is contemplated that one or more operations in FIG. 28C may be similar to one or more operations in FIG. 28B. For instance, step 5, step 10, and step 12 of FIG. 28C may be similar to step 5, step 10, and step 12 of FIG. 28B, respectively. The example use case of FIG. 28C is different from the example use case of FIG. 28B in that, unlike the example use case of FIG. 28B in which the MAC address of the O-RU is embedded in the vendor certificate (e.g., x.509 certificate) and is provided to the O-RU controller during the TLS Session Establishment Phase, the example use case of FIG. 28C does not require the MAC address of the O-RU to be embedded in the vendor certificate. Rather, the O-RU controller may obtain the MAC address of the O-RU during the NETCONF Session Establishment Phase, after the TLS Connection is established. The example use case of FIG. 28C may be useful when the vendor of the O-RU does not embed the MAC address of the O-RU in the vendor certificate (e.g., x.509 certificate).

During step 6, the TLS Connection is established successfully, and the NETCONF Session Establishment Phase may be initiated. During step 7, the O-RU controller (i.e., NETCONF client) may query or send a request to the O-RU (i.e., NETCONF server) for retrieval of O-RU information. The requested O-RU information may include inventory information of the O-RU that is required in the NETCONF Session Establishment Phase (e.g., Serial Number of the O-RU, etc.) and the MAC address of the O-RU. Accordingly, during step 8, the O-RU may provide the requested O-RU information (including the MAC address of the O-RU and the inventory information of the O-RU) to the O-RU controller, and the O-RU controller may receive the O-RU information from the O-RU.

During step 9, the O-RU controller may extract the MAC address of the O-RU from the O-RU information. Step 7, step 8, and step 9 in FIG. 28C may be performed in a similar manner described above with reference to method 2705 in FIG. 27B.

Subsequently, during step 10, the O-RU controller may validate the MAC address of the O-RU and may determine an authentication status of the O-RU (based on the MAC address of the O-RU and the information in the trusted datastore), in a similar manner as described above in relation to step 10 in FIG. 28B. Accordingly, during step 11, the O-RU may establish a channel binding with the O-RU (based on determining that the O-RU has been authenticated) or may isolate the O-RU from any further communication with the O-RU controller (based on determining that the O-RU has not been authenticated), in a similar manner described above with reference to step 10 to step 12 in FIG. 28B.

In this case, a session teardown happens at the NETCONF Session Establishment Phase, without allowing the unauthenticated O-RU to further communicate with the O-RU controller. On the other hand, based on determining that the O-RU has been authenticated and upon successful channel binding, during step 11, the O-RU controller may generate (based on the O-RU information) one or more NETCONF configuration information, and may send the one or more NETCONF configuration information to the O-RU. The NETCONF Session Establishment procedures can then be continued.

In this regard, the one or more NETCONF configuration information may define one or more NETCONF configurations. According to embodiments, the one or more NETCONF configuration information may include information associated with Configuration Management, such as information for managing one or more configurations associated with the O-RU. For example, the one or more NETCONF configuration information may include information for managing frequency configuration of the O-RU (e.g., carrier frequency, channel bandwidths, etc.), information for managing power configuration of the O-RU (e.g., transmission power level that meets signal quality requirement, power control parameters for achieving power efficiency, etc.), information for managing cell configuration (e.g., cell identity, cell type, supported handover and mobility mechanisms, etc.) of the cell at which the O-RU is located, and any other suitable information for managing configuration(s) of the O-RU to get the O-RU on-air and to make the O-RU operational.

It can be understood that the steps illustrated in the flow sequences of the FIG. 28A to FIG. 28C are merely examples of possible embodiments, and the scope of the disclosure shall not be limited thereto. Specifically, one or more steps illustrated in the FIG. 28A to FIG. 28C may be omitted, a step may be combined with another step, one or more steps may be added, and the like, without departing from the scope of the present disclosure.

In view of the above, example embodiments of the present disclosure provide apparatuses, methods, and the like, which enable an O-RU controller to effectively and efficiently determine authentication status information of an O-RU. Specifically, example embodiments define security mechanisms or approaches for providing Data Link Layer information of the O-RU (e.g., the MAC address of the O-RU) to the O-RU controller and enabling the O-RU controller to determine the authentication status information of the O-RU based on the Data Link Layer information. Accordingly, the O-RU controller may decide whether to establish a channel binding with the O-RU or to isolate the O-RU based thereon. In this way, the O-RU controller may effectively and efficiently manage the communication with one or more O-RUs connected thereto, without implicitly or inherently trusting said one or more O-RUs. Ultimately, the security of the open fronthaul network may be enhanced, and the communications among one or more O-RUs and the O-RU controller may be securely established while satisfying the Zero Trust Model.

In the related art, the SMO (Service Management and Orchestration) or O-DU (O-RAN Distributed Unit) implicitly trusts the O-RU (O-RAN Radio Unit) to allow communication during start-up and installation. There is no channel binding method defined to verify the O-RU's 802.1X authorization status in the Open front haul network during the O-RU's registration with SMO and/or O-DU (altogether "O-RU controller") before treating the O-RU as a trusted entity.

According to example embodiments of the present disclosure, O-RU controller could build channel binding between the Ethernet Layer and the Application Layer thus establishing a trust relation with O-RU in the open front haul network environment. According to example embodiments of the present disclosure, the O-RU controller could gain knowledge of the IEEE 802.1X authorized port state of the O-RAN Radio Unit (O-RU). Therefore, trust model and channel binding could become available for the open front haul network according to example embodiments of the present disclosure. Enhanced security for communication between entities in the front-haul network is thereby ensured.

Provided below are descriptions of some example embodiments according to the present disclosure.

A. Channel Binding During the TLS Connection Establishment Phase.

The O-RU shall have MAC address of its NIC included in the "extensions" portion of its x.509 certificate. This MAC address will be used to verify the identity of the O-RU in the trusted datastore during the mTLS communication that happens between O-RU & SMO and/or O-RU & O-DU during the TLS Session Establishment process.

i. In the Initial State, the O-RU shall be powered on.
  ii. O-RU performs the successful 802.1X authentication with the switch using pre-provisioned factory (vendor) certificates and the switch port now allows further traffic towards the O-RU controller (O-DU or SMO) using the Open Front Haul network.
  iii. The O-RU shall then communicate with the Operator CA for certificate enrolment.
  iv. The O-RU reinitializes/resets and authenticates itself using the operator-signed x509 certificates, in accordance with 802.1x.
  v. The communication between the O-RU and O-RU controller (O-DU or SMO) happens over NETCONF Protocol over Transport Layer Security (TLS) with Mutual X.509 Authentication.
  vi. The O-RU controller which acts as the TLS client sends the Client Hello message to initiate the TLS handshake.
  vii. The TLS and NETCONF server which is the O-RU in the O-RAN Network sends a Server Hello message, the server certificate chain, and a CertificateRequest message to request a certificate from the client.
  viii. As a part of the mutual authentication procedure using x.509 certificates, the client shall validate the certificate file validation path of the server or match the contents of the certificate to a previously trusted value.
  ix. The NETCONF and TLS Client, which is the O-RU controller, shall query the centralized agent of the trusted open fronthaul framework to compare the trust relationship of the O-RU's MAC address in the Trust table database.
  x. Once the verification of the trust relationship is completed successfully, the SMO (Service Management Orchestrator)/O-DU can establish the channel binding.
  xi. On successful channel binding, the O-RU controller (TLS Client) sends its own client certificate for the TLS connection to be established
  xii. In the event that a trust relationship is not determined or met, the SMO or O-DU will perform network isolation for the O-RU and not allow any further communication between the O-RU and SMO or O-RU and O-DU, thus a connection/session teardown happens at the TLS connection establishment phase.

B. Channel Binding During the NETCONF CONFIGURATION PHASE.

i. In the initial state, the O-RU shall be powered on.
  ii. O-RU performs the successful 802.1X authentication with the switch using pre-provisioned factory (vendor) certificates and the switch port now allows further traffic towards the O-RU controller (O-DU or SMO) using the Open Front Haul network.
  iii. The O-RU shall then communicate with the Operator CA for certificate enrolment.
  iv. The O-RU reinitializes/resets and authenticates itself using the operator signed x509 certificates, using 802.1x.
  v. The communication between the O-RU and O-RU controller [O-DU and or SMO] happens over NETCONF Protocol over Transport Layer Security (TLS) with Mutual X.509 Authentication as per the current M-PLANE specification of the O-RAN WG4 MP document.
  vi. TLS connection established successfully.
  vii. The NETCONF Client [O-RU controller] queries for the retrieval of O-RU information like serial number and MAC Address from the O-RU (NETCONF Server).
  viii. The O-RU sends the required details to the O-RU controller.
  ix. The NETCONF and TLS Client, which is the O-RU controller, shall query the centralized agent of the trusted open fronthaul framework to compare the trust relationship of the O-RU's MAC address in the Trust table database.
  x. Subsequently, the O-RU validates the MAC address received by cross-referencing it with the trusted datastore stored at the centralized agent.
  xi. If the MAC address is deemed trustworthy, it allows for further NETCONF communications to proceed under which the Software and configuration management is done on O-RU.
  xii. If the trust relationship is not determined or met, the O-RU controller will perform network isolation for the O-RU and not allow any further communication between the O-RU and SMO or O-DU.

Example Implementation Environment

Figure 29:
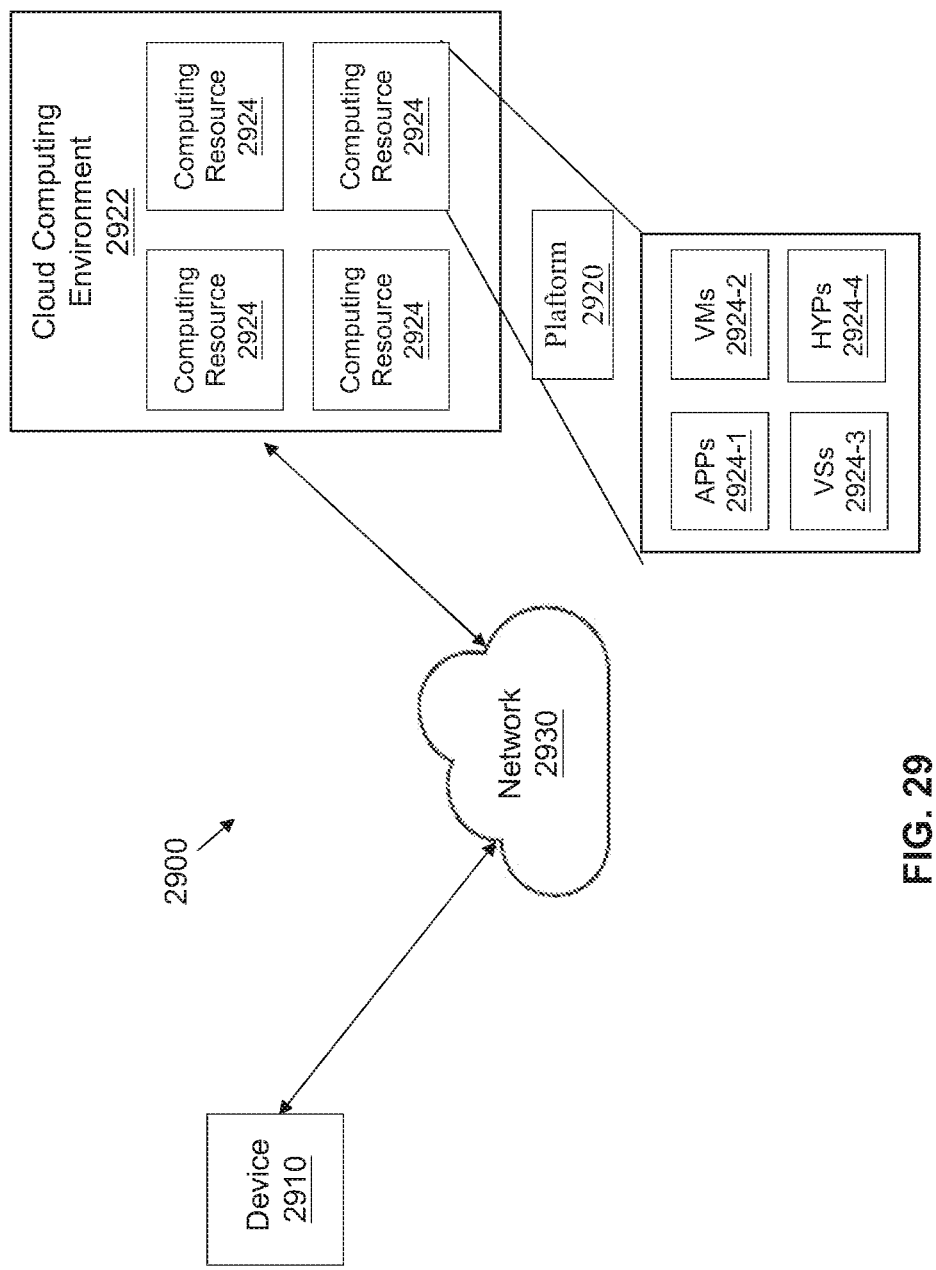
FIG. 29 illustrates a diagram of an example environment in which apparatuses, systems, and/or methods, described herein, may be implemented.

FIG. 29 illustrates a diagram of an example environment 2900 in which systems and/or methods, described herein, may be implemented. As shown in FIG. 29, environment 2900 may include a device 2910, a platform 2920, and a network 2930. Devices of environment 2900 may interconnect via wired connections, wireless connections, or a combination of wired and wireless connections. In some embodiments, any of the functions and operations described above with reference to FIG. 2 to FIG. 28C may be performed by any combination of elements illustrated in FIG. 29.

According to embodiments, the network entity (e.g., O-RU controller, etc.) described herein may be stored, hosted, or deployed in the cloud computing platform 2920. In this regard, device 2910 may include a device, system, equipment, or the like, utilized by the user (e.g., user of a marketing team, user of a network planning team, etc.) to access the network entity and/or the platform 2920. In this case, device 2910 may include one or more devices capable of receiving, generating, storing, processing, and/or providing information associated with platform 2920.

Platform 2920 may include one or more devices capable of receiving, generating, storing, processing, and/or providing information. In some implementations, platform 2920 may include a cloud server or a group of cloud servers. In some implementations, platform 2920 may be designed to be modular such that certain software components may be swapped in or out depending on a particular need. As such, platform 2920 may be easily and/or quickly reconfigured for different uses.

In some implementations, as shown, platform 2920 may be hosted in cloud computing environment 2922. Notably, while implementations described herein describe platform 2920 as being hosted in cloud computing environment 2922, in some implementations, platform 2920 may not be cloud-based (i.e., may be implemented outside of a cloud computing environment) or may be partially cloud-based.

Cloud computing environment 2922 may include an environment that hosts platform 2920. Cloud computing environment 2922 may provide computation, software, data access, storage, etc. services that do not require end-user (e.g., user device 2910) knowledge of a physical location and configuration of system(s) and/or device(s) that hosts platform 2920. As shown, cloud computing environment 2922 may include a group of computing resources 2924 (referred to collectively as "computing resources 2924" and individually as "computing resource 2924").

Computing resource 2924 may include one or more personal computers, a cluster of computing devices, workstation computers, server devices, or other types of computation and/or communication devices. In some implementations, computing resource 2924 may host platform 2920. The cloud resources may include compute instances executing in computing resource 2924, storage devices provided in computing resource 2924, data transfer devices provided by computing resource 2924, etc. In some implementations, computing resource 2924 may communicate with other computing resources 2924 via wired connections, wireless connections, or a combination of wired and wireless connections.

As further shown in FIG. 29, computing resource 2924 may include a group of cloud resources, such as one or more applications ("APPs") 2924-1, one or more virtual machines ("VMs") 2924-2, one or more virtualized storages ("VSs") 2924-3, one or more hypervisors ("HYPs") 2924-4, or the like. While the current example embodiment is with reference to virtualized network functions, it is understood that one or more other embodiments are not limited thereto, and may be implemented in at least one of containers, cloud-native services, one or more container platforms, etc. For example, in one or more other example embodiments, any of the above-described components may be a software-based component deployed or hosted in, for example, a server cluster such as a hybrid cloud server, data center servers, and the like. The software-based component may be containerized and may be deployed and controlled by one or more machines, called "nodes", that run or execute the containerized network elements. In this regard, a server cluster may contain at least one master node and a plurality of worker nodes, wherein the master node(s) controls and manages a set of associated worker nodes.

Application 2924-1 may include one or more software applications that may be provided to or accessed by device 2910. Application 2924-1 may eliminate a need to install and execute the software applications on device 2910. For example, application 2924-1 may include software associated with platform 2920 and/or any other software capable of being provided via cloud computing environment 2922. In some implementations, one application 2924-1 may send/receive information to/from one or more other applications 2924-1, via virtual machine 2924-2.

Virtual machine 2924-2 may include a software implementation of a machine (e.g., a computer) that executes programs like a physical machine. Virtual machine 2924-2 may be either a system virtual machine or a process virtual machine, depending upon use and degree of correspondence to any real machine by virtual machine 2924-2. A system virtual machine may provide a complete system platform that supports execution of a complete operating system ("OS"). A process virtual machine may execute a single program, and may support a single process. In some implementations, virtual machine 2924-2 may execute on behalf of a user (e.g., user device 2910), and may manage infrastructure of cloud computing environment 2922, such as data management, synchronization, or long-duration data transfers.

Virtualized storage 2924-3 may include one or more storage systems and/or one or more devices that use virtualization techniques within the storage systems or devices of computing resource 2924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 2924-4 may provide hardware virtualization techniques that allow multiple operating systems (e.g., "guest operating systems") to execute concurrently on a host computer, such as computing resource 2924. Hypervisor 2924-4 may present a virtual operating platform to the guest operating systems, and may manage the execution of the guest operating systems. Multiple instances of a variety of operating systems may share virtualized hardware resources.

Network 2930 may include one or more wired and/or wireless networks. For example, network 2930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 29 are provided as an example. In practice, there may be additional devices and/or networks, fewer devices and/or networks, different devices and/or networks, or differently arranged devices and/or networks than those shown in FIG. 29. Furthermore, two or more devices shown in FIG. 29 may be implemented within a single device, or a single device shown in FIG. 29 may be implemented as multiple, distributed devices. Additionally, or alternatively, a set of devices (e.g., one or more devices) of environment 2900 may perform one or more functions described as being performed by another set of devices of environment 2900.

According to embodiments, one or more operations of example embodiments described hereinabove may be implemented or be deployed in the server platform 2920 described above, in the form of virtualized network function (VNF), containerized and/or cloud-native function (CNF), and the like. In this regard, it is contemplated that the terms "virtual", "virtualized", or the like, described hereinabove are merely intended to specify the nature of the machine (and the elements and resources associated therewith) being provided in virtual or software form. The "virtual machine", "virtualized storage", and the like, described hereinabove should not be limited to any specific type of virtual machine or virtual element. Accordingly, it can be understood that one or more operations of example embodiments described hereinabove may be defined or presented in the form of a containerized network function, of which the one or more operations may be provided in the form of containers.

Various Aspects of Embodiments

The foregoing disclosure provides illustration and description, but is not intended to be exhaustive or to limit the implementations to the precise form disclosed. Modifications and variations are possible in light of the above disclosure or may be acquired from the practice of the implementations.

Some embodiments may relate to a system, a method, and/or a computer-readable medium at any possible technical detail level of integration. Further, one or more of the above components described above may be implemented as instructions stored on a computer-readable medium and executable by at least one processor (and/or may include at least one processor). The computer-readable medium may include a computer-readable non-transitory storage medium (or media) having computer-readable program instructions thereon for causing a processor to carry out operations.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a microservice(s) module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: An Open Radio Access Network (O-RAN) Radio Unit (O-RU) controller. The O-RU controller may be configured to: obtain a Media Access Control (MAC) address of an O-RU; determine, based on the MAC address of the O-RU, an authentication status of the O-RU; based on determining that the O-RU has been authenticated, establish a channel binding with the O-RU; and based on determining that the O-RU has not been authenticated, isolate the O-RU from further communication with the O-RU controller.

Item [2]: The O-RU controller according to item [1], wherein the authentication status of the O-RU may correspond to an Extensible Authentication Protocol-Transport Layer Security (EAP-TLS) authentication process for the O-RU.

Item [3]: The O-RU controller according to any one of items [1]-[2], wherein the O-RU controller may be configured to obtain the MAC address of the O-RU by: receiving a vendor certificate from the O-RU, wherein the vendor certificate may include the MAC address of the O-RU; and extracting the MAC address of the O-RU from the vendor certificate.

Item [4]: The O-RU controller according to item [3], wherein the O-RU controller may be configured to receive, from the O-RU during a Transport Layer Security (TLS) Session Establishment Phase, the vendor certificate and a first request for a TLS Client certificate.

Item [5]: The O-RU controller according to item [4], wherein the O-RU controller may be further configured to send the TLS Client certificate to the O-RU after the channel binding with the O-RU is established.

Item [6]: The O-RU controller according to any one of items [1]-[2], wherein the O-RU controller may be configured to obtain the MAC address of the O-RU by: sending a second request for O-RU information to the O-RU, wherein the O-RU information may include the MAC address of the O-RU; receiving the O-RU information from the O-RU; and extracting the MAC address from the O-RU information.

Item [7]: The O-RU controller according to item [6], wherein O-RU controller may be configured to send, to the O-RU during a Network Configuration Protocol (NETCONF) Session Establishment Phase, the second request for the O-RU information.

Item [8]: The O-RU controller according to item [7], wherein the O-RU controller may be further configured to: generate, based on the O-RU information, one or more NETCONF configuration information; and send the one or more NETCONF configuration information to the O-RU after the channel binding with the O-RU is established.

Item [9]: The O-RU controller according to any one of items [1]-[8], wherein the O-RU controller may be configured to determine the authentication status of the O-RU by: obtaining a trusted datastore associated with the O-RU; cross-referencing the MAC address of the O-RU with a plurality of MAC addresses included in the trusted datastore to determine whether or not the MAC address of the O-RU is included in the plurality of MAC addresses; based on determining that the MAC address of the O-RU is included in the plurality of MAC addresses, determining that the O-RU has been authenticated; and based on determining that the MAC address of the O-RU is not included in the plurality of MAC addresses, determining that the O-RU has not been authenticated.

Item [10]: The O-RU controller according to item [9], wherein the trusted datastore may include at least one of an authentication list associated with the O-RU and a trust list associated with the O-RU.

Item [11]: The O-RU controller according to any one of items [1]-[10], wherein the O-RU controller may include at least one of an O-RAN Distributed Unit (O-DU) and a Service Management and Orchestrator (SMO).

Item [12]: A method implemented by an Open Radio Access Network (O-RAN) Radio Unit (O-RU) controller. The method may include: obtaining a Media Access Control (MAC) address of an O-RU; determining, based on the MAC address of the O-RU, an authentication status of the O-RU; based on determining that the O-RU has been authenticated, establishing a channel binding with the O-RU; and based on determining that the O-RU has not been authenticated, isolating the O-RU from further communications with the O-RU controller.

Item [13]: The method according to item [12], wherein the authentication status of the O-RU may correspond to an Extensible Authentication Protocol-Transport Layer Security (EAP-TLS) authentication process for the O-RU.

Item [14]: The method according to any one of items [12]-[13], wherein the obtaining the MAC address of the O-RU may include: receiving a vendor certificate from the O-RU, wherein the vendor certificate may include the MAC address of the O-RU; and extracting the MAC address of the O-RU from the vendor certificate.

Item [15]: The method according to item [14], wherein the receiving the vendor certificate may include: receiving, from the O-RU during a Transport Layer Security (TLS) Session Establishment Phase, the vendor certificate and a first request for a TLS Client certificate.

Item [16]: The method according to item [15], wherein the method may further include: sending the TLS Client certificate to the O-RU after the channel binding with the O-RU is established.

Item [17]: The method according to any one of items [12]-[13], wherein the obtaining the MAC address of the O-RU may include: sending a second request for O-RU information to the O-RU, wherein the O-RU information may include a Serial Number of the O-RU and the MAC address of the O-RU; receiving the O-RU information from the O-RU; and extracting the MAC address from the O-RU information.

Item [18]: The method according to item [17], wherein the sending the second request for the O-RU information may include: sending, to the O-RU during a Network Configuration Protocol (NETCONF) Session Establishment Phase, the second request for the O-RU information.

Item [19]: The method according to item [18], wherein the method may further include: generating, based on the O-RU information, one or more NETCONF configuration information; and sending the one or more NETCONF configuration information to the O-RU after the channel binding with the O-RU is established.

Item [20]: A non-transitory computer-readable recording medium. The non-transitory computer-readable recording medium may have recorded thereon instructions executable by an Open Radio Access Network (O-RAN) Radio Unit (O-RU) controller to cause the O-RU controller to perform a method including: obtaining a Media Access Control (MAC) address of an O-RU; determining, based on the MAC address of the O-RU, an authentication status of the O-RU; based on determining that the O-RU has been authenticated, establishing a channel binding with the O-RU; and based on determining that the O-RU has not been authenticated, isolating the O-RU from further communications with the O-RU controller.

Item [21]: A network entity which may be configured to: create a first authentication list, wherein the first authentication list may specify one or more network entities that are authenticated with the network entity; receive a second authentication list from a second network entity, wherein the second authentication list may specify one or more network entities that are authenticated with the second network entity, and wherein the network entity and the second network entity may be authenticated with each other; and create a trust list based on the first authentication list and the second authentication list, wherein the trust list may specify a trust level between the network entity and one or more network entities in the first and second authentication lists.

Item [22]: The network entity according to item [21], wherein: the trust level may include one of direct trust and indirect trust; and the trust level may be between one or more ports of the network entity and one or more ports of the one or more network entities in the first and second authentication lists that has a role of a supplicant.

Item [23]: The network entity according to item [22], wherein the trust list may include one or more MAC addresses of the one or more ports of the network entity and one or more MAC addresses of the one or more ports of the one or more network entities in the first and second authentication lists that has the role of the supplicant.

Item [24]: The network entity according to any one of items [21]-[23], wherein the network entity may be configured to create the trust list based on the first authentication list and the second authentication list by: creating the trust list based on the first authentication list, such that the trust list specifies a trust level between the network entity and the one or more network entities in the first authentication list; in response to receiving the second authentication list, updating the first authentication list to include the second authentication list; and updating the trust list based on the updated first authentication list, such that the trust list further specifies a trust level between the network entity and the one or more network entities in the second authentication list.

Item [25]: The network entity according to item [24], wherein the network entity may be further configured to transmit the updated first authentication list to the one or more network entities that are authenticated with the network entity.

Item [26]: The network entity according to any one of items [21]-[25], wherein: the second authentication list may further specify one or more network entities that are authenticated with a third network entity; and the third network entity may be authenticated with the second network entity.

Item [27]: The network entity according to any one of items [21]-[26], wherein: the first authentication list may specify one or more first MAC addresses of one or more ports of the network entity, one or more third MAC addresses of one or more ports of one or more network entities authenticated with the one or more first MAC addresses, and a role of the one or more ports of the network entity; the second authentication list may specify one or more second MAC addresses of one or more ports of the second network entity, one or more fourth MAC addresses of one or more ports of one or more network entities authenticated with the one or more second MAC addresses, and a role of the one or more ports of the second network entity; and the role may include one of an authenticator and a supplicant.

Item [28]: The network entity according to any one of items [21]-[27], wherein an authentication between the network entity, the second network entity, and the one or more network entities may be based on an 802.1x process.

Item [29]: The network entity according to any one of items [21]-[28], wherein the network entity, the second network entity, and the one or more network entities may include at least one of: an O-RAN Centralized Unit (O-CU), an O-RAN Distributed Unit (O-DU), an O-RAN Radio Unit (O-RU), and a Transport Network Element (TNE).

Item [30]: A hub which may be configured to: receive a first authentication list from a first network entity, wherein the first authentication list may specify one or more network entities that are authenticated with the first network entity; receive a second authentication list from the second network entity, wherein the second authentication list may specify one or more network entities that are authenticated with the second network entity, and wherein the first network entity and the second network entity may be authenticated with each other; and create a trust list for the first network entity based on the first authentication list and the second authentication list, wherein the trust list for the first network entity may specify a trust level between the first network entity and one or more network entities in the first and second authentication lists.

Item [31]: A method that may include: creating a first authentication list for a first network entity, wherein the first authentication list may specify one or more network entities that are authenticated with the first network entity; receiving a second authentication list from a second network entity, wherein the second authentication list may specify one or more network entities that are authenticated with the second network entity, and wherein the first network entity and the second network entity may be authenticated with each other; and creating a trust list for the first network entity based on the first authentication list and the second authentication list, wherein the trust list for the first network entity may specify a trust level between the first network entity and one or more network entities in the first and second authentication lists.

Item [32]: The method according to item [31], wherein: the trust level may include one of direct trust and indirect trust; and the trust level may be between one or more ports of the first network entity and one or more ports of the one or more network entities in the first and second authentication lists that has a role of a supplicant.

Item [33]: The method according to item [32], wherein the trust list for the first network entity may include one or more MAC addresses of the one or more ports of the first network entity and one or more MAC addresses of the one or more ports of the one or more network entities in the first and second authentication lists that has the role of the supplicant.

Item [34]: The method according to any one of items [31]-[33], wherein the creating the trust list for the first network entity based on the first authentication list and the second authentication list may include: creating the trust list based on the first authentication list, such that the trust list specifies a trust level between the first network entity and the one or more network entities in the first authentication list; in response to receiving the second authentication list, updating the first authentication list to include the second authentication list; and updating the trust list based on the updated first authentication list, such that the trust list further specifies a trust level between the first network entity and the one or more network entities in the second authentication list.

Item [35]: The method according to item [34], the method may further include: transmitting the updated first authentication list to the one or more network entities that are authenticated with the first network entity.

Item [36]: The method according to any one of items [31]-[35], wherein: the second authentication list may further specify one or more network entities that are authenticated with a third network entity; and the third network entity may be authenticated with the second network entity.

Item [37]: The method according to any one of items [31]-[36], wherein: the first authentication list may specify one or more first MAC addresses of one or more ports of the first network entity, one or more third MAC addresses of one or more ports of one or more network entities authenticated with the one or more first MAC addresses, and a role of the one or more ports of the first network entity; the second authentication list may specify one or more second MAC addresses of one or more ports of the second network entity, one or more fourth MAC addresses of one or more ports of one or more network entities authenticated with the one or more second MAC addresses, and a role of the one or more ports of the second network entity; and the role may include one of an authenticator and a supplicant.

Item [38]: The method according to any one of items [31]-[37], wherein an authentication between the first network entity, the second network entity, and the one or more network entities may be based on an 802.1x process.

Item [39]: The method according to any one of items [31]-[38], wherein the first network entity, the second network entity, and the one or more network entities may include at least one of: an O-RAN Centralized Unit (O-CU), an O-RAN Distributed Unit (O-DU), an O-RAN Radio Unit (O-RU), and a Transport Network element (TNE).

Item [40]: A method that may include: receiving a first authentication list from a first network entity, wherein the first authentication list may specify one or more network entities that are authenticated with the first network entity; receiving a second authentication list from the second network entity, wherein the second authentication list may specify one or more network entities that are authenticated with the second network entity, and wherein the first network entity and the second network entity are authenticated with each other; and creating a trust list for the first network entity based on the first authentication list and the second authentication list, wherein the trust list for the first network entity may specify a trust level between the first network entity and one or more network entities in the first and second authentication lists.

Item [41]: A network entity which may be configured to: create a first authentication list, wherein the first authentication list may specify one or more network entities that are authenticated with the network entity; and advertise the first authentication list to a second agent deployed in a second network entity, wherein the second network entity may be authenticated with the network entity.

Item [42]: The network entity according to item [41], wherein the network entity may be configured to advertise the first authentication list by transmitting the first authentication list to the second agent.

Item [43]: The network entity according to item [42], wherein the network entity may be configured to: update the first authentication list to include one or more authentication lists received from one or more agents deployed in one or more network entities that are authenticated with the network entity; update the first authentication list to further specify one or more network entities that are newly authenticated with the network entity; and transmit the updated first authentication list to the one or more agents deployed in the one or more network entities that are authenticated with the network entity.

Item [44]: The network entity according to item [43], wherein the network entity may include a first agent; and the first agent may be configured to: create the first authentication list, transmit the first authentication list, update the first authentication list, and transmit the updated first authentication list.

Item [45]: The network entity according to item [44], wherein the first agent and the second agent may be mutually authenticated with each other via at least one of digital certificate and an application programming interface (API) key.

Item [46]: A hub which may be configured to: receive a first authentication list from a first agent deployed in a first network entity, wherein the first authentication list may specify one or more network entities that are authenticated with the first network entity; and advertise the first authentication list to a second agent deployed in a second network entity, wherein the second network entity may be authenticated with the first network entity.

Item [47]: The hub according to item [46], wherein the hub may be configured to receive a second authentication list from the second agent; and wherein the hub may be configured to advertise the first authentication list by: updating the second authentication list to include the first authentication list; and transmitting the updated second authentication list to the second agent.

Item [48]: The hub according to item [47], wherein the hub may be configured to: transmit a notification regarding the updated second authentication list to the second agent; receive a request to transmit the updated second authentication list from the second agent; and transmit the updated second authentication list in response to receiving the request.

Item [49]: The hub according to any one of items [47]-[48], wherein: the first agent may be configured to transmit the first authentication list periodically; and the hub may be configured to execute the instructions to transmit the updated second authentication list to the second agent periodically.

Item [50]: The hub according to any one of items [46]-[49], wherein the a hub may be communicatively coupled to the first agent and the second agent; and the first agent and the second agent may be mutually authenticated with the hub via a mutual TLS (mTLS) process.

Item [51]: A method that may include: creating a first authentication list for a first network entity, wherein the first authentication list may specify one or more network entities that are authenticated with the first network entity; and advertising the first authentication list to a second agent deployed in a second network entity, wherein the second network entity may be authenticated with the first network entity.

Item [52]: The method according to item [51], wherein the advertising the first authentication list may include transmitting the first authentication list to the second agent.

Item [53]: The method according to item [52], the method may further include: updating the first authentication list to include one or more authentication lists received from one or more agents deployed in one or more network entities that are authenticated with the first network entity; updating the first authentication list to further specify one or more network entities that are newly authenticated with the first network entity; and transmitting the updated first authentication list to the one or more agents deployed in the one or more network entities that are authenticated with the first network entity.

Item [54]: The method according to item [53], wherein: the first network entity may include a first agent; and the first agent may be configured to: create the first authentication list, transmit the first authentication list, update the first authentication list, and transmit the updated first authentication list.

Item [55]: The method according to item [54], wherein the first agent and the second agent may be mutually authenticated with each other via at least one of digital certificate and an application programming interface (API) key.

Item [56]: A method that may include: receiving a first authentication list from a first agent deployed in a first network entity, wherein the first authentication list may specify one or more network entities that are authenticated with the first network entity; and advertising the first authentication list to a second agent deployed in a second network entity, wherein the second network entity may be authenticated with the first network entity.

Item [57]: The method according to item [56], the method may further include: receiving a second authentication list from the second agent; wherein the advertising the first authentication list may include: updating the second authentication list to include the first authentication list; and transmitting the updated second authentication list to the second agent.

Item [58]: The method according to item [57], the method may further include: transmitting a notification regarding the updated second authentication list to the second agent; transmitting a notification regarding the updated second authentication list to the second agent; and transmitting the updated second authentication list in response to receiving the request.

Item [59]: The method according to any one of items [57]-[58], wherein: the first agent may be configured to transmit the first authentication list periodically; and the updated second authentication list may be transmitted to the second agent periodically.

Item [60]: The method according to any one of items [56]-[59], wherein: the receiving the first authentication list and the advertising the first authentication list may be performed by a hub communicatively coupled to the first agent and the second agent; and the first agent and the second agent may be mutually authenticated with the hub via a mutual TLS (mTLS) process.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. An Open Radio Access Network (O-RAN) Radio Unit (O-RU) controller, configured to:
   obtain a Media Access Control (MAC) address of an O-RU;
   determine, based on the MAC address of the O-RU, an authentication status of the O-RU;
   based on determining that the O-RU has been authenticated, establish a channel binding with the O-RU; and
   based on determining that the O-RU has not been authenticated, isolate the O-RU from further communications with the O-RU controller.

2. The O-RU controller according to claim 1, wherein the authentication status of the O-RU corresponds to an Extensible Authentication Protocol-Transport Layer Security (EAP-TLS) authentication process for the O-RU.

3. The O-RU controller according to claim 1, wherein the O-RU controller is configured to obtain the MAC address of the O-RU by:
   receiving a vendor certificate from the O-RU, wherein the vendor certificate comprises the MAC address of the O-RU; and
   extracting the MAC address of the O-RU from the vendor certificate.

4. The O-RU controller according to claim 3, wherein the O-RU controller is configured to receive, from the O-RU during a Transport Layer Security (TLS) Session Establishment Phase, the vendor certificate and a first request for a TLS Client certificate.

5. The O-RU controller according to claim 4, wherein the O-RU controller is further configured to send the TLS Client certificate to the O-RU after the channel binding with the O-RU is established.

6. The O-RU controller according to claim 1, wherein the O-RU controller is configured to obtain the MAC address of the O-RU by:
- sending a second request for O-RU information to the O-RU, wherein the O-RU information comprises the MAC address of the O-RU;
- receiving the O-RU information from the O-RU; and
- extracting the MAC address from the O-RU information.

7. The O-RU controller according to claim 6, wherein O-RU controller is configured to send, to the O-RU during a Network Configuration Protocol (NETCONF) Session Establishment Phase, the second request for the O-RU information.

8. The O-RU controller according to claim 7, wherein the O-RU controller is further configured to:
- generate, based on the O-RU information, one or more NETCONF configuration information; and
- send the one or more NETCONF configuration information to the O-RU after the channel binding with the O-RU is established.

9. The O-RU controller according to claim 1, wherein the O-RU controller is configured to determine the authentication status of the O-RU by:
- obtaining a trusted datastore associated with the O-RU;
- cross-referencing the MAC address of the O-RU with a plurality of MAC addresses included in the trusted datastore to determine whether or not the MAC address of the O-RU is included in the plurality of MAC addresses;
- based on determining that the MAC address of the O-RU is included in the plurality of MAC addresses, determining that the O-RU has been authenticated; and
- based on determining that the MAC address of the O-RU is not included in the plurality of MAC addresses, determining that the O-RU has not been authenticated.

10. The O-RU controller according to claim 9, wherein the trusted datastore comprises at least one of an authentication list associated with the O-RU and a trust list associated with the O-RU.

11. The O-RU controller according to claim 1, wherein the O-RU controller comprises at least one of an O-RAN Distributed Unit (O-DU) and a Service Management and Orchestrator (SMO).

12. A method implemented by an Open Radio Access Network (O-RAN) Radio Unit (O-RU) controller, wherein the method comprises:
- obtaining a Media Access Control (MAC) address of an O-RU;
- determining, based on the MAC address of the O-RU, an authentication status of the O-RU;
- based on determining that the O-RU has been authenticated, establishing a channel binding with the O-RU; and
- based on determining that the O-RU has not been authenticated, isolating the O-RU from further communications with the O-RU controller.

13. The method according to claim 12, wherein the authentication status of the O-RU corresponds to an Extensible Authentication Protocol-Transport Layer Security (EAP-TLS) authentication process for the O-RU.

14. The method according to claim 12, wherein the obtaining the MAC address of the O-RU comprises:
- receiving a vendor certificate from the O-RU, wherein the vendor certificate comprises the MAC address of the O-RU; and
- extracting the MAC address of the O-RU from the vendor certificate.

15. The method according to claim 14, wherein the receiving the vendor certificate comprises:
- receiving, from the O-RU during a Transport Layer Security (TLS) Session Establishment Phase, the vendor certificate and a first request for a TLS Client certificate.

16. The method according to claim 15, wherein the method further comprises:
- sending the TLS Client certificate to the O-RU after the channel binding with the O-RU is established.

17. The method according to claim 12, wherein the obtaining the MAC address of the O-RU comprises:
- sending a second request for O-RU information to the O-RU, wherein the O-RU information comprises a Serial Number of the O-RU and the MAC address of the O-RU;
- receiving the O-RU information from the O-RU; and
- extracting the MAC address from the O-RU information.

18. The method according to claim 17, wherein the sending the second request for the O-RU information comprises:
- sending, to the O-RU during a Network Configuration Protocol (NETCONF) Session Establishment Phase, the second request for the O-RU information.

19. The method according to claim 18, wherein the method further comprises:
- generating, based on the O-RU information, one or more NETCONF configuration information; and
- sending the one or more NETCONF configuration information to the O-RU after the channel binding with the O-RU is established.

20. A non-transitory computer-readable recording medium having recorded thereon instructions executable by an Open Radio Access Network (O-RAN) Radio Unit (O-RU) controller to cause the O-RU controller to perform a method comprising:
- obtaining a Media Access Control (MAC) address of an O-RU;
- determining, based on the MAC address of the O-RU, an authentication status of the O-RU;
- based on determining that the O-RU has been authenticated, establishing a channel binding with the O-RU; and
- based on determining that the O-RU has not been authenticated, isolating the O-RU from further communications with the O-RU controller.

\* \* \* \* \*